US012652582B2

(12) United States Patent
Kim et al.

(10) Patent No.: US 12,652,582 B2
(45) Date of Patent: *Jun. 9, 2026

(54) METHOD AND APPARATUS FOR COMMUNICATION IN WIRELESS MOBILE COMMUNICATION SYSTEM

(71) Applicant: Samsung Electronics Co., Ltd., Gyeonggi-do (KR)

(72) Inventors: Donggun Kim, Gyeonggi-do (KR); Soenghun Kim, Gyeonggi-do (KR); Sangbum Kim, Gyeonggi-do (KR); Alexander Sayenko, Gyeonggi-do (KR); Seungri Jin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/457,638

(22) Filed: Aug. 29, 2023

(65) Prior Publication Data

US 2023/0413128 A1      Dec. 21, 2023

Related U.S. Application Data

(63) Continuation of application No. 17/113,603, filed on Dec. 7, 2020, now Pat. No. 11,758,444, which is a (Continued)

(30) Foreign Application Priority Data

Jan. 16, 2017    (KR) ........................ 10-2017-0007142
Mar. 8, 2017    (KR) ........................ 10-2017-0029284

(51) Int. Cl.
H04W 36/00          (2009.01)
H04L 5/00          (2006.01)
(Continued)

(52) U.S. Cl.
CPC ....... H04W 36/0038 (2013.01); H04L 5/0007 (2013.01); H04L 5/0053 (2013.01);
(Continued)

(58) Field of Classification Search
None
See application file for complete search history.

(56) References Cited

U.S. PATENT DOCUMENTS 11,758,444 B2 *    9/2023    Kim ...................... H04W 76/27
                                                    370/310
2009/0111458 A1      4/2009    Fox et al.
(Continued)

FOREIGN PATENT DOCUMENTS

CN          105657861          6/2016
CN          105898894          8/2016
EP          3 454 623          3/2019

OTHER PUBLICATIONS

3GPP, 3rd Generation Partnership Project; Technical Specification Group Radio Access Network; Evolved Universal Terrestrial Radio Access (E-UTRA); Radio Resource Control (RRC); Protocol Specification (Release 14), 3GPP TS 36.331 V14.1.0, Dec. 2016, 654 pages.

(Continued)

*Primary Examiner* — Jutai Kao
(74) *Attorney, Agent, or Firm* — The Farell Law Firm, P.C.

(57)          ABSTRACT

Methods and devices are provided in a wireless communication system. A first radio resource control (RRC) connection release message is received that includes a resume identity. A random access preamble is transmitted. A random access response including timing alignment information and an uplink grant is received. A medium access control (MAC) protocol data unit (PDU) including the uplink data and an RRC connection resume request message is transmitted. The (Continued)

RRC connection resume request includes the resume identity. An RRC message is received. The random access preamble is selected from a preamble group for transmitting the uplink data associated with a data radio bearer (DRB).

20 Claims, 61 Drawing Sheets

Related U.S. Application Data continuation of application No. 15/872,754, filed on Jan. 16, 2018, now Pat. No. 10,863,394.

(51) Int. Cl.

| | |
|---|---|
| *H04W 52/02* | (2009.01) |
| *H04W 74/00* | (2009.01) |
| *H04W 76/27* | (2018.01) |
| *H04W 76/28* | (2018.01) |
| *H04W 76/30* | (2018.01) |

(52) U.S. Cl.
CPC ....... *H04L 5/0091* (2013.01); *H04W 36/0033* (2013.01); *H04W 36/0088* (2013.01); *H04W 74/002* (2013.01); *H04W 76/27* (2018.02); *H04W 76/28* (2018.02); *H04L 5/001* (2013.01); *H04L 5/0023* (2013.01); *H04W 36/0016* (2013.01); *H04W 52/0216* (2013.01); *H04W 76/30* (2018.02); *Y02D 30/70* (2020.08)

(56) References Cited

U.S. PATENT DOCUMENTS

| | | | |
|---|---|---|---|
| 2012/0250644 A1 | 10/2012 | Sambhwani | |
| 2013/0010641 A1 | 1/2013 | Dinan | |
| 2013/0329637 A1 | 12/2013 | Kodali et al. | |
| 2014/0079011 A1* | 3/2014 | Wiberg | H04W 72/52 |
| | | | 370/329 |
| 2014/0241297 A1* | 8/2014 | Park | H04W 74/0833 |
| | | | 370/329 |
| 2015/0004988 A1* | 1/2015 | Wu | H04W 76/10 |
| | | | 455/450 |
| 2015/0109918 A1 | 4/2015 | Sharma et al. | |
| 2015/0156793 A1* | 6/2015 | Dai | H04W 72/543 |
| | | | 370/329 |
| 2016/0374048 A1* | 12/2016 | Griot | H04W 68/005 |
| 2017/0099660 A1* | 4/2017 | Oh | H04L 5/0053 |
| 2017/0164325 A1 | 6/2017 | Ekemark | |
| 2017/0353902 A1 | 12/2017 | Chen | |
| 2018/0049244 A1 | 2/2018 | Lee | |
| 2018/0139778 A1* | 5/2018 | Chou | H04W 74/04 |
| 2018/0176834 A1 | 6/2018 | Wei | |
| 2018/0263012 A1 | 9/2018 | Ryu | |
| 2018/0302947 A1* | 10/2018 | Yan | H04W 76/38 |
| 2019/0052435 A1 | 2/2019 | Martin | |
| 2019/0052607 A1* | 2/2019 | Ohlsson | H04W 76/28 |
| 2019/0082490 A1 | 3/2019 | Zhang | |
| 2019/0150218 A1 | 5/2019 | Futaki | |
| 2019/0174366 A1* | 6/2019 | Susitaival | H04W 76/19 |
| 2019/0174571 A1* | 6/2019 | Deenoo | H04W 76/28 |
| 2019/0200410 A1 | 6/2019 | Hoglund | |
| 2019/0246318 A1 | 8/2019 | Kim | |
| 2019/0297661 A1 | 9/2019 | Lee et al. | |
| 2019/0387438 A1 | 12/2019 | Chang | |
| 2019/0387498 A1 | 12/2019 | Liu | |

OTHER PUBLICATIONS

Ericsson, "RRC State Machine and RRC Inactive Characteristics", R2-1700535, 3GPP TSG-RAN WG2 adhoc, Jan. 17-19, 2017, 11 pages.

Korean Office Action dated Jan. 12, 2021 issued in counterpart application No. 10-2017-0029284, 8 pages.

Intel Corporation, "Light Connection Signaling and UE's Modeling", R2-166687, 3GPP TSG RAN WG2 Meeting #95bis, Oct. 10-14, 2016, 8 pages.

Chinese Office Action dated Sep. 22, 2021 issued in counterpart application No. 201880006636.3, 14 pages.

Samsung, "NR RRC State Machine, Transitions and Signalling Procedures", R2-167494, 3GPP TSG-RAN WG2 Meeting #96, Nov. 14-18, 2016, 6 pages.

Nokia, Alcatel-Lucent Shanghai Bell, "Paging and Location Tracking in Rrc_Inactive", R2-167708, 3GPP TSG-RAN WG2 Meeting #96, Nov. 14-18, 2016, 4 pages.

ZTE Corporation, "Discussion on the Issue of Releasing UE", R2-168201, 3GPP TSG-RAN2 Meeting #96, Nov. 14-18, 2016, 3 pages.

Samsung, "Analysis of the Signalling Load for the Inactive State", R2-167697, 3GPP TSG-RAN WG2 Meeting #96, Nov. 14-18, 2016, 8 pages.

International Search Report dated Apr. 19, 2018 issued in counterpart application No. PCT/KR2018/000654, 3 pages.

Ericsson, "Signalling Flows for Paging and Resume for RRC_Inactive", R2-1700536, 3GPP TSG-RAN WG2-AH, Jan. 17-19, 2017, 7 pages.

Huawei, HiSilicon, "Inter-RAT Mobility for Inactive UE", R2-1700187, 3GPP TSG-RAN WG2 Ad-Hoc Meeting, Jan. 17-19, 2017, 3 pages.

Ericsson, "Responding the Questions on Small Data Tx in Rrc_Inactive", R2-168714, 3GPP TSG-RAN WG2 #96, Nov. 14-18, 2016, 5 pages.

European Search Report dated Oct. 17, 2019 issued in counterpart application No. 18738580.2-1215, 12 pages.

Chinese Office Action dated Oct. 14, 2022 issued in counterpart application No. 201880006636.3, 15 pages.

* cited by examiner

FIG. 1G 1g-05

| R | R | SN |
|---|---|-----|

CP header 1g-10

| D/C | R | SN |
|-----|---|-----|

UP header 0

1g-15

| D/C | R | R | R | R | R | SN |
|-----|---|---|---|---|---|-----|
| | | SN | | | | |

UP header 1

1g-20

| D/C | R | R | R | R | R | SN |
|-----|---|---|---|---|---|-----|
| | SN | | | | | |
| | SN | | | | | |

UP header 2

FIG. 2IA
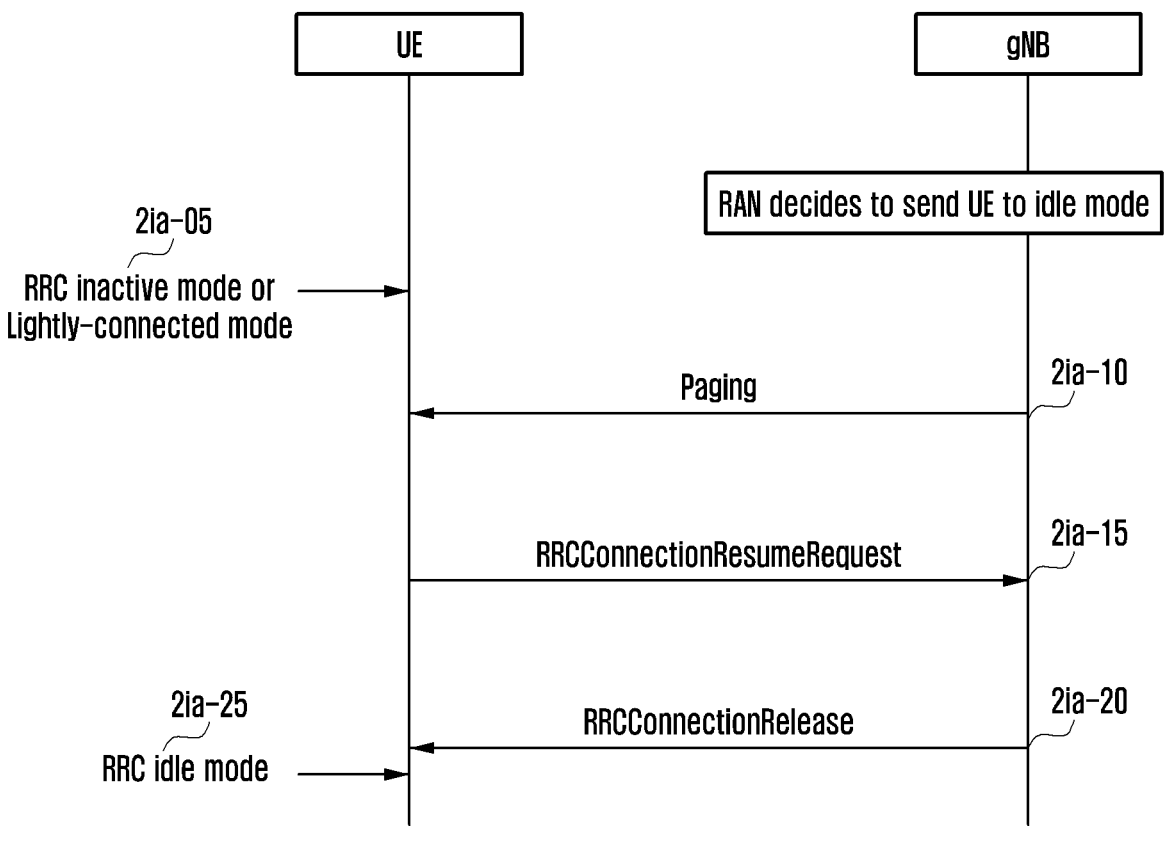
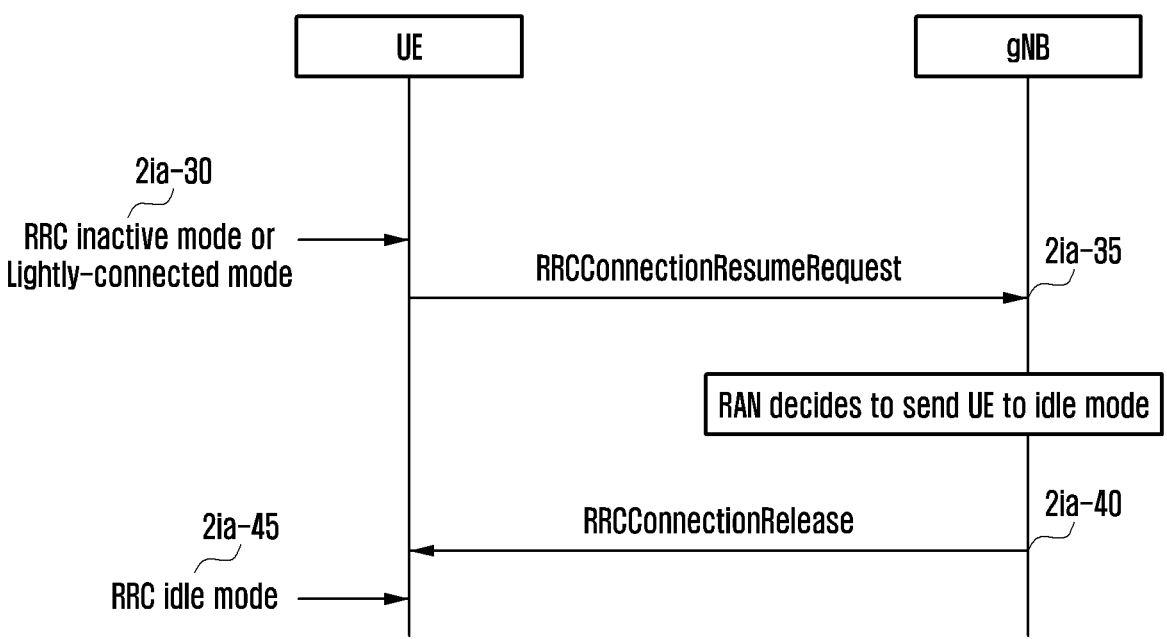

FIG. 2L

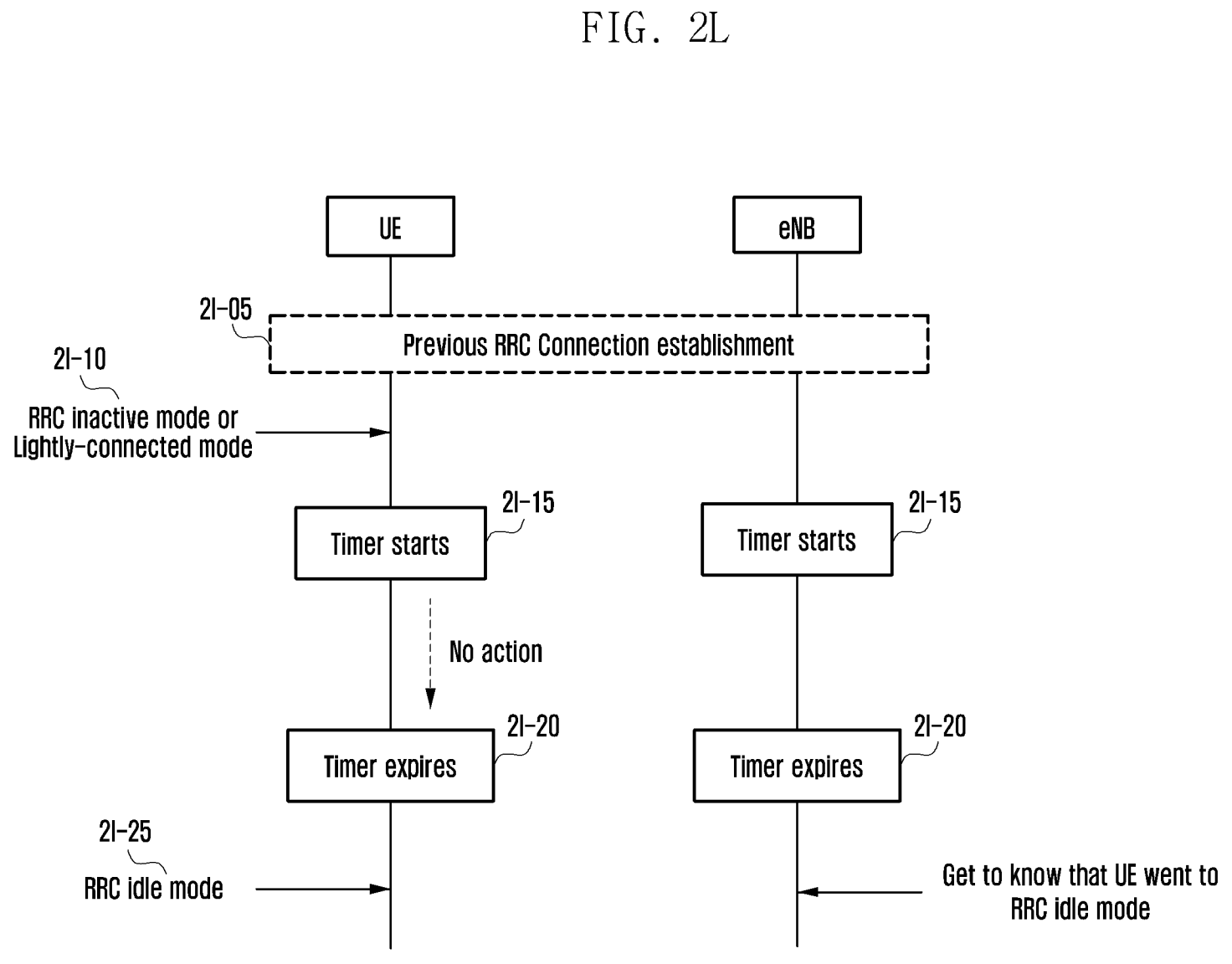

UE eNB 2l-05 Previous RRC Connection establishment 2l-10 RRC inactive mode or Lightly-connected mode 2l-15 Timer starts 2l-15 Timer starts No action 2l-20 Timer expires 2l-20 Timer expires 2l-25 RRC idle mode Get to know that UE went to RRC idle mode

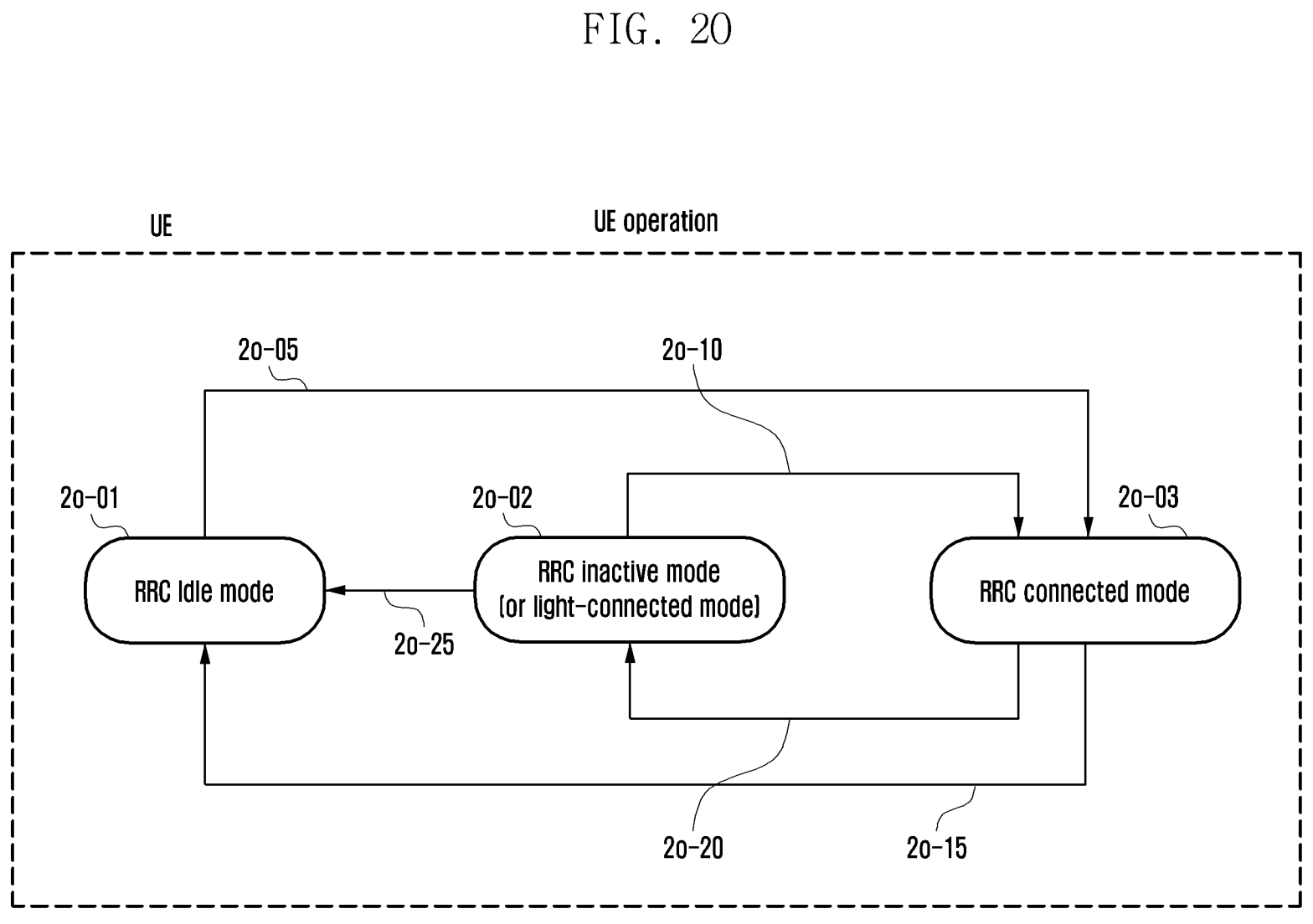

UE operation

UE

RRC Idle mode
20-01

RRC inactive mode
(or light-connected mode)
20-02

RRC connected mode
20-03

RF processor 4i-20 baseband processor 4i-40 controller 4i-42 multi-connection processor 4i-30 storage unit

METHOD AND APPARATUS FOR COMMUNICATION IN WIRELESS MOBILE COMMUNICATION SYSTEM

PRIORITY

This application is a Continuation Application of U.S. application Ser. No. 17/113,603, filed in the U.S. Patent and Trademark Office (USPTO) on Dec. 7, 2020, which is a Continuation Application of U.S. application Ser. No. 15/872,754, filed in the USPTO on Jan. 16, 2018, now U.S. Pat. No. 10,863,394, issued on Dec. 8, 2020, which claims priority under 35 U.S.C. § 119(a) to Korean Patent Application Serial No. 10-2017-0007142, which was filed in the Korean Intellectual Property Office on Jan. 16, 2017, and Korean Patent Application Serial No. 10-2017-0029284, which was filed in the Korean Intellectual Property Office on Mar. 8, 2017, the entire content of each of which is incorporated herein by reference.

BACKGROUND

1. Field of the Disclosure

The present disclosure relates, generally, to a method and an apparatus in a wireless mobile communication system, and more particularly, to a method and an apparatus for configuring a packet data convergence protocol (PDCP) and a radio link control (RLC) header format in a next-generation mobile communication system, for changing an operation mode of a terminal in a next-generation mobile communication system, for reducing a delay in relation to mobility of a terminal in a next-generation mobile communication system, and for reducing a delay during a handover in a next-generation mobile communication system.

2. Description of the Related Art

To meet the demand for wireless data traffic using 4G communication systems, efforts have been made to develop an improved 5G or pre-5G communication system. The 5G or pre-5G communication system is also referred to as a beyond 4G network or a post long term evolution (LTE) system. The 5G communication system uses higher frequency (mmWave) bands, e.g., 60 GHz bands, to accomplish higher data rates. To decrease propagation loss of the radio waves and increase the transmission distance, beamforming, massive multiple-input multiple-output (MIMO), full dimensional MIMO (FD-MIMO), array antenna, analog beam forming, and large scale antenna techniques have been proposed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G communication system, hybrid frequency-shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet is now evolving to the Internet of things (IoT) where distributed entities exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services by collecting and analyzing data generated among connected things. IoTs may be applied to a variety of fields including smart home, smart building, smart city, smart car or connected cars, smart grid, health care, smart appliances and advanced medical services through convergence and combination between existing information technology (IT) and various industrial applications.

Various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered as an example of convergence between the 5G technology and the IoT technology.

In order to secure a high data rate and to process data at a high speed in a next-generation mobile communication system, a new data processing structure that may be provided in a PDCP layer, an RLC layer, and a MAC layer may be needed.

If a terminal successively receives and identifies signals of a base station, terminal power is rapidly consumed. It is important to reduce such power consumption. Accordingly, the terminal may be switched (transition) from a radio resource control (RRC) connected mode to an RRC idle mode to be in a standby mode. However, many signaling procedures are necessary in order for the terminal in the standby mode to be switched to the RRC connected mode again.

In the next-generation mobile communication system, an RRC inactive mode or a lightly-connected mode may be defined, in which a rapid access becomes possible while reducing the signaling procedure, and the terminal power can be saved as in the standby mode. However, there is a need for an efficient method for transitioning from the RRC connected mode to the RRC inactive mode (or lightly-connected mode) and vice versa.

In the RRC inactive mode, a terminal battery power can be saved, and when the terminal accesses to a network, a rapid access can be configured with a small signaling overhead. However, the terminal in the RRC inactive mode performs a procedure for updating a RAN notification area more frequently than a procedure in which the terminal in the RRC idle mode periodically updates a tracking area.

If many terminals in the RRC inactive mode exist in the network, this may cause the signaling overhead due to the procedure for periodically updating the periodic RAN notification area, and thus it is necessary for the network to manage the terminals in the RRC inactive mode and, if needed, to switch (transition) the terminals in the RRC inactive mode to the RRC idle mode.

Further, if a terminal is currently performing a handover in an LTE system, synchronization is performed through a random access procedure to a target cell, and the handover procedure is completed through reception of an uplink grant. In a case of performing the above-described operation, time interference occurs in the handover procedure, and it becomes difficult to satisfy the requirements of the next-generation mobile communication system requiring a low latency.

SUMMARY

The present disclosure has been made to address at least the disadvantages described above and to provide at least the advantages described below.

According to the aspect of the present disclosure, in the next-generation mobile communication system, a high data rate can be secured, and data can be processed at a high speed.

According to the aspect of the present disclosure, the signaling overhead can be reduced and the terminal battery can be saved through a method for switching (transitioning) between the RRC connected mode, the RRC inactive mode (or lightly-connected mode), and the RRC idle mode based on the timer.

According to the aspect of the present disclosure, the terminal can suspend a discontinuous reception (DRX) operation in relation to a measurement report, and thus a delay due to the DRX operation can be reduced.

According to the aspect of the present disclosure, in the next-generation mobile communication system, the handover procedure using carrier aggregation technology can be used, and, thus, a terminal can transmit and receive data without time interference during the handover operation.

In accordance with an aspect of the present disclosure, a method performed by a terminal in a wireless communication system is provided. A first a first RRC connection release message associated with a suspension is received. The first RRC connection release message includes a resume identity. In case that uplink data occurs, a random access preamble is transmitted to a base station. A random access response including timing alignment information and an uplink grant is received from the base station. A medium access control (MAC) protocol data unit (PDU) including the uplink data and an RRC connection resume request message is transmitted to the base station. The RRC connection resume request message includes the resume identity. An RRC message is received from the base station as a response to the RRC connection resume request message. The random access preamble is selected from a preamble group for transmitting the uplink data associated with a data radio bearer (DRB).

In accordance with another aspect of the present disclosure, a method performed by a base station in a wireless communication system is provided. A random access preamble associated with uplink data for a terminal is received from the terminal which received a first RRC connection release message associated with a suspension. The first RRC connection release message includes a resume identity. A random access response including timing alignment information and an uplink grant is transmitted to the terminal. A MAC PDU including the uplink data and an RRC connection resume request message is received from the terminal. The RRC connection resume request message includes the resume identity. An RRC message is transmitted to the terminal as a response to the RRC connection resume request message. The random access preamble is selected from a preamble group for transmitting the uplink data associated with a DRB.

In accordance with another aspect of the present disclosure, a terminal in a wireless communication system is provided. The terminal includes a transceiver and a controller. The controller is configured to receive, via the transceiver, a first RRC connection release message associated with a suspension. The first RRC connection release message includes a resume identity. In case that uplink data occurs, the controller is also configured to transmit a random access preamble to a base station via the transceiver. The controller is also configured to receive a random access response including timing alignment information and an uplink grant from the base station via the transceiver, and transmit a MAC PDU including the uplink data and an RRC connection resume request message to the base station via the transceiver. The RRC connection resume request message includes the resume identity. The controller is further configured to receive an RRC message from the base station, via the transceiver, as a response to the RRC connection resume request message. The random access preamble is selected from a preamble group for transmitting the uplink data associated with a DRB.

In accordance with another aspect of the present disclosure, a base station in a wireless communication system is provided. The base station includes a transceiver and a controller. The controller is configured to receive, via the transceiver, a random access preamble associated with uplink data for a terminal, from the terminal which received a first RRC connection release message associated with a suspension. The first RRC connection release message includes a resume identity. The controller is also configured to transmit a random access response including timing alignment information and an uplink grant to the terminal via the transceiver, and receive a MAC PDU including the uplink data and an RRC connection resume request message from the terminal via the transceiver. The RRC connection resume request message includes the resume identity. The controller is further configured to transmit an RRC message to the terminal, via the transceiver, as a response to the RRC connection resume request message. The random access preamble is selected from a preamble group for transmitting the uplink data associated with a DRB.

BRIEF DESCRIPTION OF THE DRAWINGS

The above and other aspects, features, and advantages of embodiments of the present disclosure will be more apparent from the following detailed description taken in conjunction with the accompanying drawings, in which:

FIG. 1G is a diagram of header formats of a next-generation mobile communication system (NR) PDCP device, according to an embodiment of the present disclosure;

FIG. 1K is a flowchart of a method of a terminal for selecting a PDCP header and an RLC header of each bearer, according to an embodiment of the present disclosure;

FIG. 1M is a diagram of a base station in a wireless communication system, according to an embodiment of the present disclosure;

FIG. 2E is a of a terminal in a next-generation mobile communication system, according to an embodiment of the present disclosure;

FIG. 2IB is a flowchart of a method of a (2-1)-th embodiment for switching a terminal from an RRC inactive mode (or lightly-connected mode) to an RRC idle mode, according to an embodiment of the present disclosure;

FIG. 2IC is a flowchart of a method of a (2-2)-th embodiment for switching a terminal from an RRC inactive mode (or lightly-connected mode) to an RRC idle mode, according to an embodiment of the present disclosure;

FIG. 2ID is a flowchart of a method of a (2-3)-th embodiment for switching a terminal from an RRC inactive mode (or lightly-connected mode) to an RRC idle mode, according to an embodiment of the present disclosure;

FIG. 2L is a flowchart of a method for switching a terminal from an RRC inactive mode to an RRC idle mode, according to an embodiment of the present disclosure;

FIG. 2M is a flowchart of a method for switching a terminal from an RRC connected mode to an RRC inactive mode, according to an embodiment of the present disclosure;

FIG. 2N is a flowchart of a method for switching a terminal from an RRC inactive mode to an RRC idle mode, according to an embodiment of the present disclosure;

FIG. 2O is a diagram of a terminal, according to an embodiment of the present disclosure;

FIG. 3K is a diagram of a base station, according to an embodiment of the present disclosure;

FIG. 4E is a flowchart of a handover procedure of an LTE system, according to an embodiment of the present disclosure;

FIG. 4I is a diagram of a terminal, according to an embodiment of the present disclosure.

DETAILED DESCRIPTION

Figure 1A:
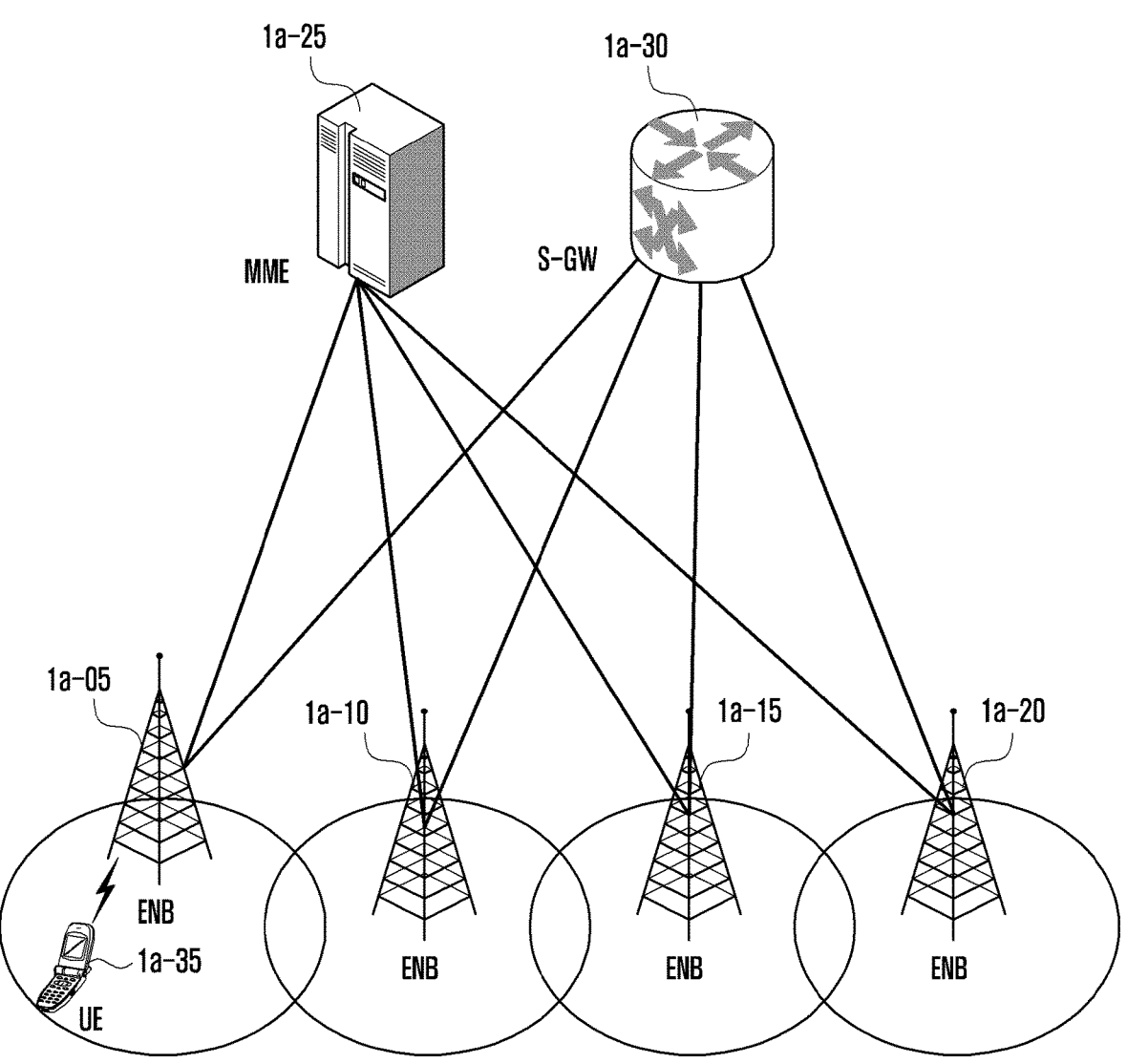
FIG. 1A is a diagram of a long-term evolution (LTE) system, according to an embodiment of the present disclosure.

In describing embodiments of the present disclosure, explanation of technical contents which are well known in the art to which the present disclosure pertains and are not directly related to the present disclosure will be omitted. This is to transfer the subject matter of the present disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The advantages and features of the present disclosure and the manner of achieving them will become apparent with reference to the embodiments described in detail below with reference to the accompanying drawings. The present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. To fully disclose the scope of the present disclosure to those skilled in the art, and the present disclosure is only defined by the scope of the claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Hereinafter, terms for identifying a connection node, terms for calling network entities, terms for calling messages, terms for calling an interface between network entities, and terms for calling various pieces of identification information, as used herein, are for convenience of explanation. Accordingly, the present disclosure is not limited to the terms to be described later, but other terms for calling subjects having equal technical meanings may be used.

Hereinafter, terms and titles that are defined in the $3^{rd}$ generation partnership project (3GPP) LTE standards are used in the present disclosure. However, the present disclosure is not limited by the terms and titles, but can be equally applied to systems following other standards. For convenience of explanation, evolved node B (eNB) may be used interchangeably with gateway node B (gNB). That is, a base station explained as eNB may be denoted as gNB. Further, the base station may include a transmission and reception point (TRP).

Embodiment 1

FIG. 1A is a diagram of an LTE system, according to an embodiment of the present disclosure.

Referring to FIG. 1A, a RAN of an LTE system includes evolved node Bs ("eNBs" "ENBs, "node Bs", or "base stations") 1a-05, 1a-10, 1a-15, and 1a-20, a mobility management entity (MME) 1a-25, and a serving-gateway (S-GW) 1a-30. User equipment ("UE" or "terminal") 1a-35 accesses to an external network through the ENBs 1a-05, 1a-10, 1a-15, and 1a-20 and the S-GW 1a-30.

The ENBs 1a-05, 1a-10, 1a-15, and 1a-20 correspond to an existing node B of a universal mobile telecommunications system (UMTS). The ENBs 1a-05, 1a-10, 1a-15, or 1a-20 are connected to the UE 1a-35 on a radio channel, and play or serve a more complicated role than that of the existing node B. In the LTE system, since all user traffics including a real-time service, such as a voice over internet protocol (VoIP) through an internet protocol, are serviced on shared channels, devices performing scheduling through summarization of state information, such as a buffer state, an available transmission power state, and a channel state of each UE, are necessary, and the ENBs 1a-05, 1a-10, 1a-15, and 1a-20 correspond to such scheduling devices. One ENB controls a plurality of cells. In order to implement a transmission speed of 100 Mbps, the LTE system uses orthogonal frequency division multiplexing (OFDM) in a bandwidth of 20 MHz as a radio access technology (RAT). The LTE system adopts an adaptive modulation & coding (AMC) scheme that determines a modulation scheme and a channel coding rate to match the channel state of the terminal. The S-GW 1a-30 provides a data bearer, and generates or removes the data bearer under the control of the MME 1a-25. The MME 1a-25 takes charge of or controls not only mobility management of the UE 1a-35, but also various kinds of control functions, and is connected to the plurality of ENBs 1a-05, 1a-10, 1a-15, and 1a-20.

Figure 1B:
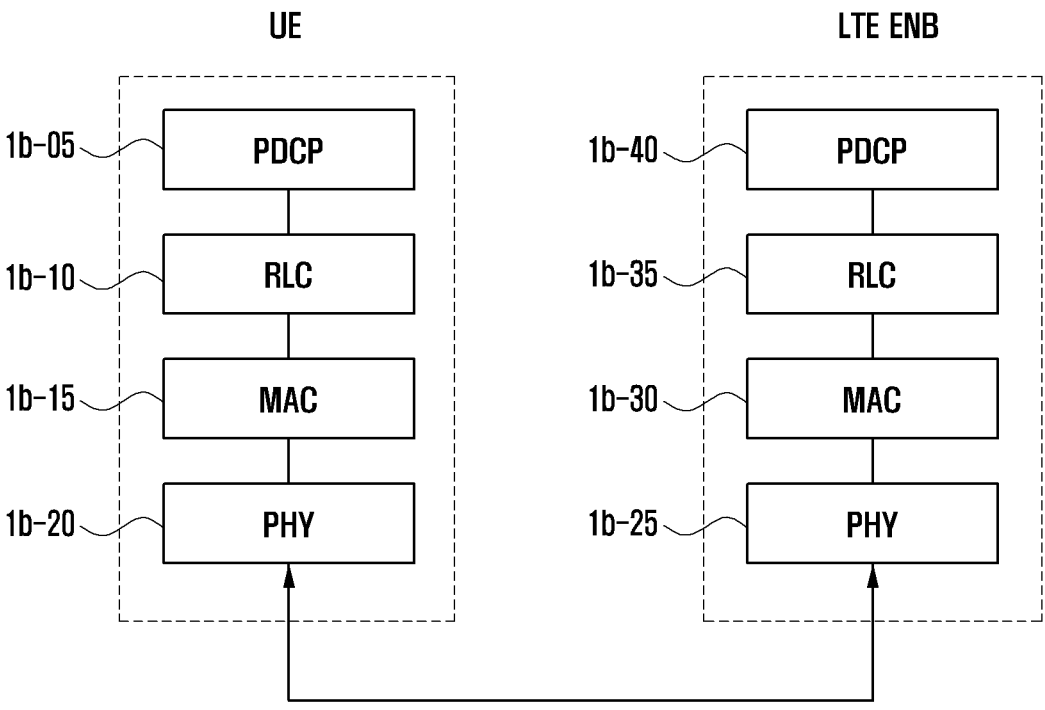
FIG. 1B is a diagram of a radio protocol structure in an LTE system, according to an embodiment of the present disclosure.

FIG. 1B is a diagram of a radio protocol structure in an LTE system, according to an embodiment of the present disclosure.

Referring to FIG. 1B, in a UE or an ENB, a radio protocol of an LTE system includes a PDCP 1b-05 or 1b-40, an RLC 1b-10 or 1b-35, and a MAC 1b-15 or 1b-30.

The PDCP 1b-05 or 1b-40 takes charge of IP header compression/decompression operations. The main functions of the PDCP are summarized as follows:

Header compression and decompression: robust header compression (ROHC) only;

Transfer of user data;

In-sequence delivery of upper layer physical data units (PDUs) at a PDCP reestablishment procedure for an RLC AM;

For split bearers in dual connectivity (DC) (only support for an RLC AM): PDCP PDU routing for transmission and PDCP PDU reordering for reception;

Duplicate detection of lower layer service data units (SDUs) at a PDCP reestablishment procedure for an RLC AM;

Retransmission of PDCP SDUs at handover and, for split bearers in DC, of PDCP PDUs at a PDCP data-recovery procedure, for an RLC AM;

Ciphering and deciphering; and

Timer-based SDU discard in an uplink;

The RLC 1b-10 or 1b-35 reconfigures a PDCP PDU with a proper size and performs an automatic repeat request (ARQ) operation and the like. The main functions of the RLC are summarized as follows.

Transfer of upper layer PDUs;

Error correction through an ARQ (only for AM data transfer);

Concatenation, segmentation, and reassembly of RLC SDUs (only for unacknowledged mode (UM) and AM data transfer);

Re-segmentation of RLC data PDUs (only for UM and AM data transfer);

Reordering of RLC data PDUs (only for UM and AM data transfer);

Duplicate detection (only for UM and AM data transfer);

Protocol error detection (only for AM data transfer);

RLC SDU discard (only for UM and AM transfer); and

RLC reestablishment.

The MAC 1b-15 or 1b-30 is connected to several RLC layer devices configured in one terminal, and performs multiplexing/demultiplexing of RLC PDUs into/from MAC PDU. The main functions of the MAC are summarized as follows:

Mapping between logical channels and transport channels;

Multiplexing/demultiplexing of MAC SDUs belonging to one or different logical channels into/from transport blocks (TB) transferred to/from the physical layer on transport channels;

Scheduling information reporting;

Hybrid ARQ (HARQ) function (error correction through HARQ);

Priority handling between logical channels of one UE;

Priority handling between UEs by means of dynamic scheduling;

MBMS service identification;

Transport format selection; and padding.

The physical layer 1b-20 or 1b-25 performs channel coding and modulation of upper layer data to configure and transmit OFDM symbols on a radio channel, or performs demodulation and channel decoding of the OFDM symbols received on the radio channel to transfer the demodulated and channel-decoded symbols to an upper layer.

Figure 1C:
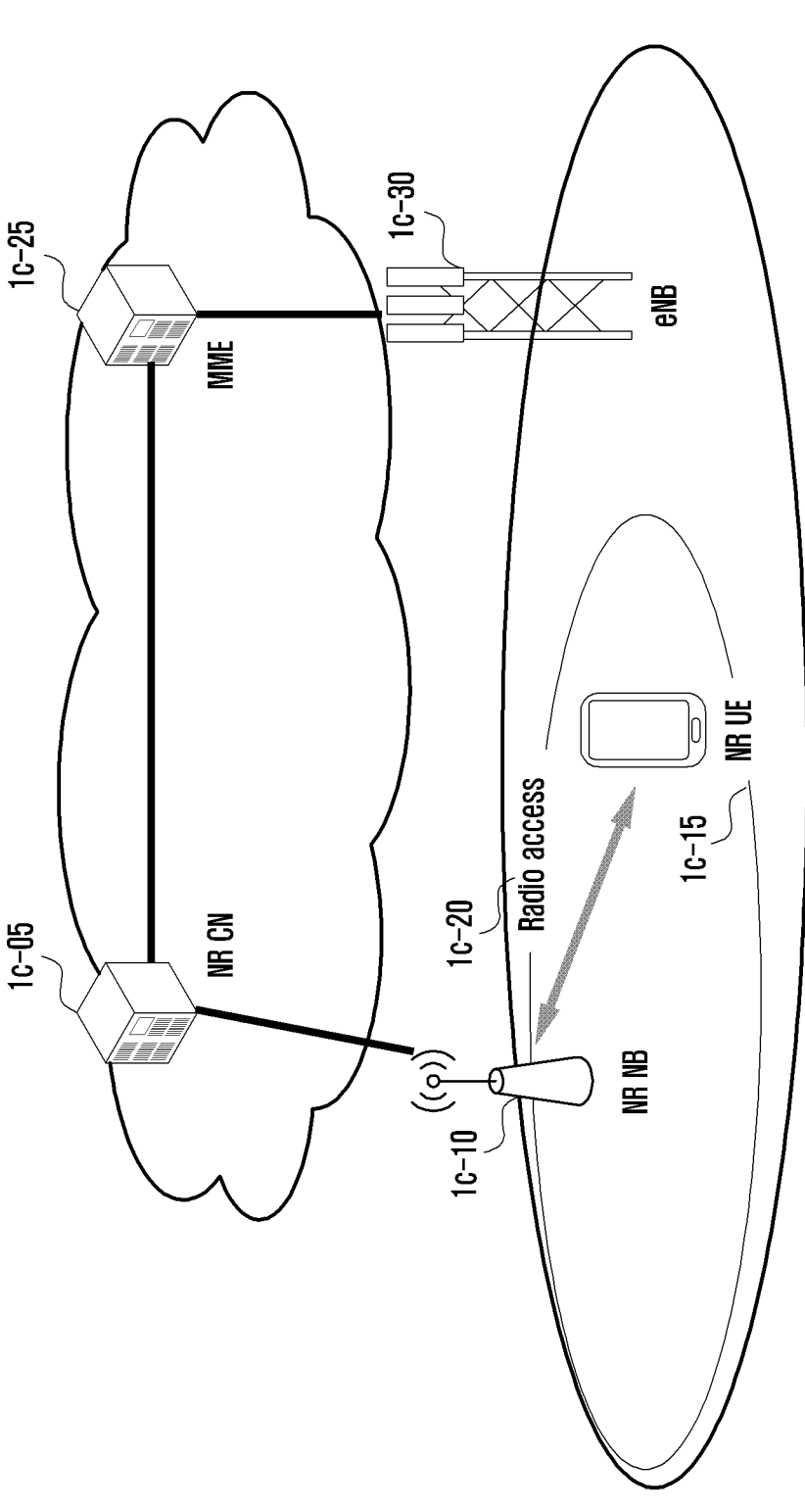
FIG. 1C is a diagram of a next-generation mobile communication system, according to an embodiment of the present disclosure.

FIG. 1C is a diagram of a next-generation mobile communication system, according to an embodiment of the present disclosure.

Referring to FIG. 1C, a RAN of a next-generation mobile communication system ("new radio (NR)" or "5G") is composed of a new radio node B ("NR gNB" or "NR ENB") 1c-10 and a new radio core network (NR CN) 1c-05. A new radio user equipment ("NR UE" or "terminal") 1c-15 accesses to an external network through the NR gNB 1c-10 and the NR CN 1c-05.

The NR gNB 1c-10 corresponds to an ENB of the existing LTE system. The NR gNB is connected to the NR UE 1c-15 on a radio channel, and, thus, it can provide a more superior service than the service of the existing node B. Since all user traffics are serviced on shared channels in the next-generation mobile communication system, a device that performs scheduling through consolidation of status information, such as a buffer state of UEs, an available transmission power state, and a channel state, is required, and the NR NB 1c-10 takes charge of this.

One NR gNB 1c-10 generally controls a plurality of cells. In order to implement ultrahigh-speed data transmission as compared with the existing LTE, the NR gNB may have a bandwidth that is equal to or higher than the existing maximum bandwidth, and a beamforming technology may be additionally grafted in consideration of OFDM) as a RAT. An AMC scheme determining a modulation scheme and a channel coding rate to match the channel state of the UE is adopted. The NR CN 1c-05 performs functions of mobility support, bearer setup, and quality of service (QoS) configuration. The NR CN 1c-05 is a device that takes charge of not only a mobility management function of the UE 1c-15 but also various kinds of control functions, and is connected to a plurality of ENBs. The next-generation mobile communication system may interlock with the existing LTE system, and the NR CN 1c-05 is connected to an MME 1c-25 through a network interface. The MME 1c-25 is connected to an ENB 1c-30 that is the existing ENB.

Figure 1D:
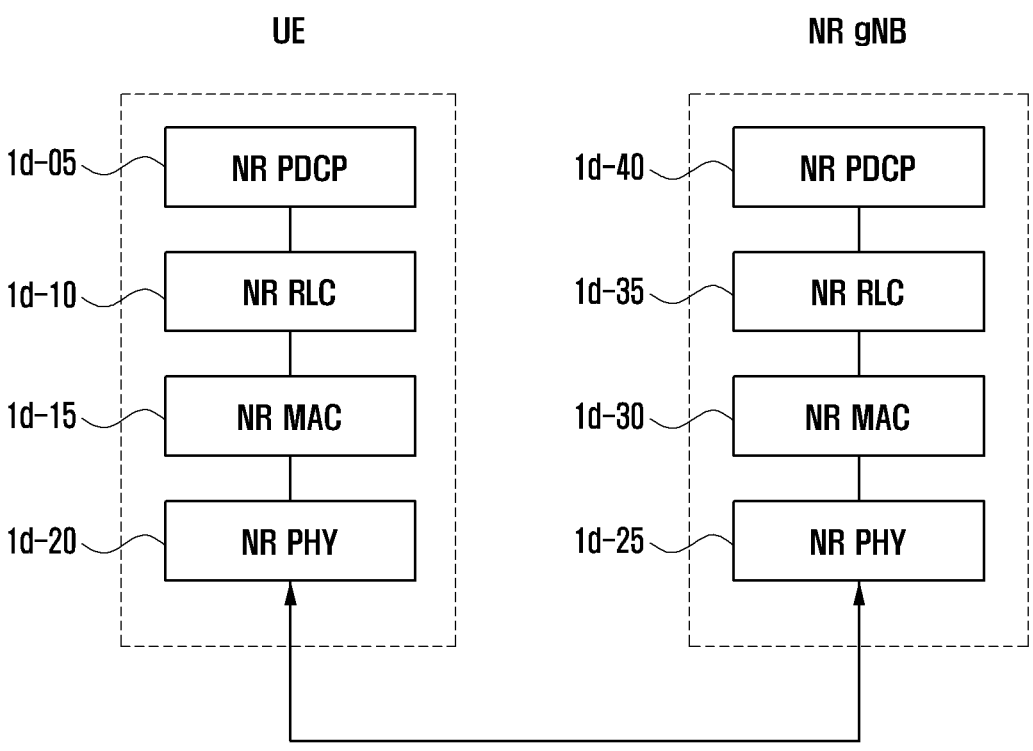
FIG. 1D is a diagram of a radio protocol structure of a next-generation mobile communication system, according to an embodiment of the present disclosure.

FIG. 1D is a diagram of a radio protocol structure of a next-generation mobile communication system, according to an embodiment of the present disclosure.

Referring to FIG. 1D, in a UE or an NR ENB, a radio protocol of the next-generation mobile communication system includes an NR PDCP 1d-05 or 1d-40, an NR RLC 1d-10 or 1d-35, and an NR MAC 1d-15 or 1d-30.

The main functions of the NR PDCP 1d-05 or 1d-40 may include parts of the following functions:

Header compression and decompression: ROHC only;
Transfer of user data;
In-sequence delivery of upper layer PDUs;
PDCP PDU reordering for reception;
Duplicate detection of lower layer SDUs;
Retransmission of PDCP SDUs;
Ciphering and deciphering; and
Timer-based SDU discard in an uplink.

Reordering of the NR PDCP devices may include reordering of PDCP PDUs received from a lower layer based on PDCP sequence numbers (SNs). The reordering may include transfer of data to an upper layer in the order of reordering, recording of lost PDCP PDUs through reordering, status report for the lost PDCP PDUs to a transmission side, and retransmission request for the lost PDCP PDUs.

The main functions of the NR RLC 1d-10 or 1d-35 may include parts of the following functions:

Transfer of upper layer PDUs;
In-sequence delivery of upper layer PDUs;
Out-of-sequence delivery of upper layer PDUs;
Error correction through an ARQ;
Concatenation, segmentation, and reassembly of RLC SDUs;
Re-segmentation of RLC data PDUs;
Reordering of RLC data PDUs;
Duplicate detection;
Protocol error detection;
RLC SDU discard; and
RLC reestablishment.

In-sequence delivery of NR RLC devices may include in-sequence delivery of RLC SDUs received from a lower layer to an upper layer. When one original RLC SDU is segmented into several RLC SDUs to be received, the delivery may include reassembly and delivery of the RLC SDUs, reordering of the received RLC PDUs based on an RLC SN or a PDCP SN, recording of lost RLC PDUs through reordering, status report for the lost RLC PDUs to a transmission side, retransmission request for the lost PDCP PDUs, in-sequence delivery of only RLC SDUs just before the lost RLC SDU to an upper layer if there is the lost RLC SDU, in-sequence delivery of all RLC SDUs received before a specific timer starts its operation to an upper layer if the timer has expired although there is the lost RLC SDU, or in-sequence delivery of all RLC SDUs received up to now to an upper layer if the timer has expired although there is the lost RLC SDU. The NR RLC layer may not include a concatenation function, and the function may be performed by an NR MAC layer or may be replaced by a multiplexing function of the NR MAC layer.

The out-of-sequence delivery of the NR RLC device includes transferring the RLC SDUs received from a lower layer directly to an upper layer in an out-of-sequence manner. If one original RLC SDU is segmented into several RLC SDUs to be received, the delivery may include reassembly and delivery of the RLC SDUs, and recording of the lost RLC PDUs through storing and ordering the RLC SNs or PDCP SNs of the received RLC PDUs.

The NR MAC 1d-15 or 1d-30 may be connected to several NR RLC layer devices configured in one UE, and the main functions of the NR MAC 1d-15 or 1d-30 may include parts of the following functions:

Mapping between logical channels and transport channels;
Multiplexing/demultiplexing of MAC SDUs;
Scheduling information reporting;
HARQ function (error correction through HARQ);
Priority handling between logical channels of one UE;
Priority handling between UEs by means of dynamic scheduling;
MBMS service identification;
Transport format selection;
padding.

The NR PHY layer 1d-20 or 1d-25 may perform channel coding and modulation of upper layer data to configure and transmit OFDM symbols to a radio channel, or may perform demodulation and channel decoding of the OFDM symbols received on the radio channel to transfer the demodulated and channel-decoded symbols to an upper layer.

Figure 1E:
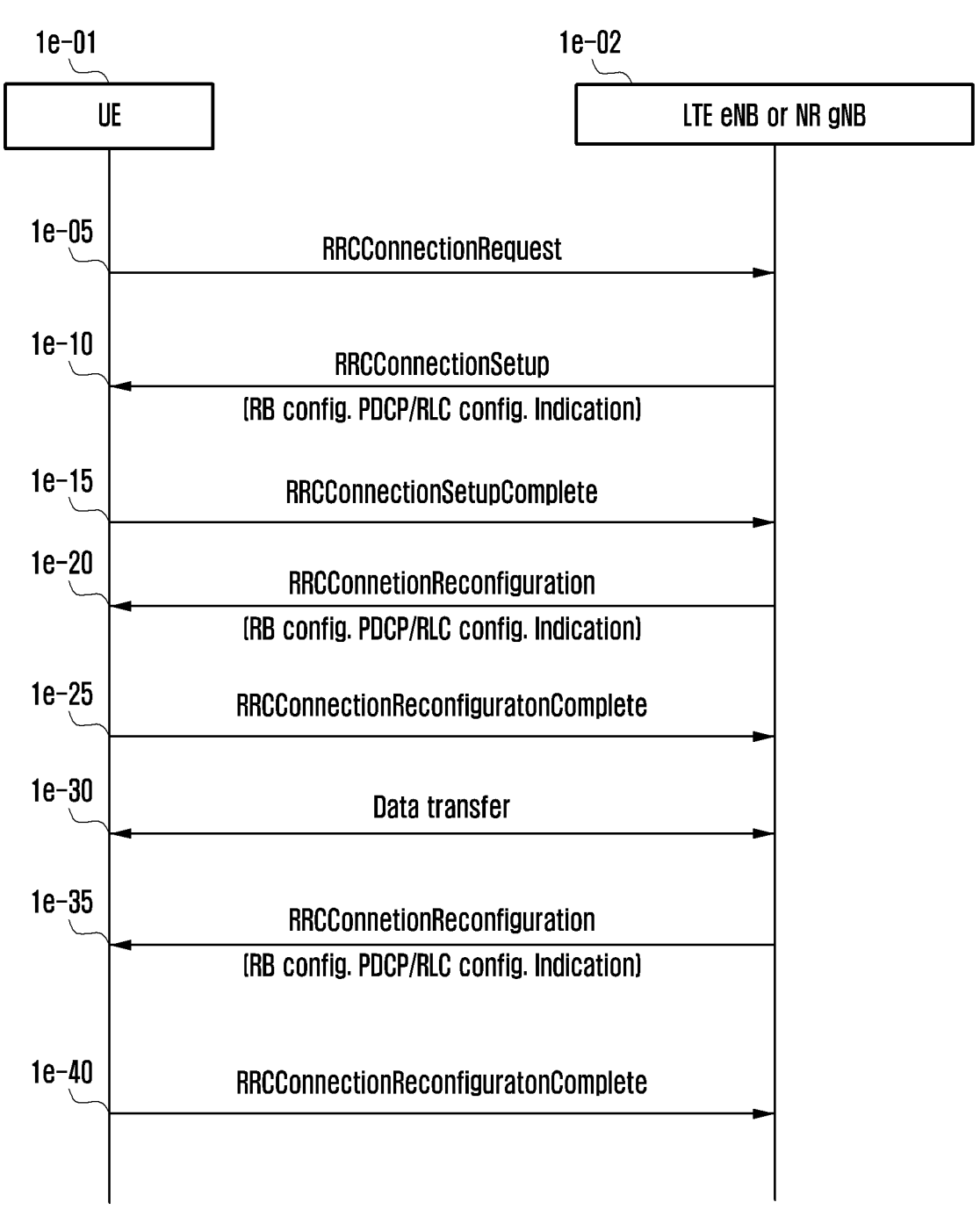
FIG. 1E is a flowchart of a method for a terminal that configures an access to a network and layer entities to transmit and receive data in a next-generation mobile communication system, according to an embodiment of the present disclosure.

FIG. 1E is a flowchart of a method for a terminal that configures an access to a network and layer entities to transmit and receive data in a next-generation mobile communication system, according to an embodiment of the present disclosure.

If data to be transmitted is generated, a UE (idle mode UE) 1e-01, of which connection is not currently set, performs an RRC connection establishment process with an LTE ENB or NR ENB 1e-02. The UE 1e-01 establishes backward transfer synchronization with the ENB 1e-02 through a RAP, and transmits an RRCConnectionRequest message to the ENB 1e-02 (at step 1e-05). The message contains an identifier of the UE 1e-01 and a cause for connection setup.

The ENB 1e-02 transmits an RRCConnectionSetup message to the UE 1e-01 so that the UE 1e-01 sets the RRC connection (at step 1e-10). The message may contain RRC connection setup information and setup information of respective layers. That is, the message may include setup information about a PHY or NR PHY device, a MAC or NR MAC device, an RLC or NR RLC device, and a PDCP or NR PDCP device, and may include information indicating setup for a specific one of functions supported by the layer entities (layer functions as described above with reference to FIG. 1B or 1D). The message may include setup information to be applied by the PDCP device and the RLC device through a bearer setup, and may include information (or indication) indicating the length of a SN and information on what PDCP header format and what RLC header format are to be applied.

The UE 1e-01 having set an RRC connection transmits an RRCConnectionSetupComplete message to the ENB 1e-02 (at step 1e-15). In order to set a DRB, the ENB 1e-02 transmits an RRCConnectionReconfiguration message to the UE 1e-01 (at step 1e-20). The message may contain setup information of respective layers. That is, the message may include setup information about the PHY or NR PHY device, the MAC or NR MAC device, the RLC or NR RLC device, and the PDCP or NR PDCP device, and may include information indicating the setup for a specific one of functions supported by the layer entities (layer functions as described above with reference to FIG. 1B or 1D). The message may include the setup information to be applied by the PDCP device and the RLC device through the bearer setup, and may include information (or indication) indicating the length of the SN and information on what PDCP header format and what RLC header format are to be applied. The message includes setup information of the DRB through which user data is to be processed, and the UE 1e-01 sets the DRB by applying the information, sets respective layer functions, and transmits an RRCConnectionRecon-figurationComplete message to the ENB 1e-02 (at step 1e-25).

If the above-described processes are all completed, the UE 1e-01 transmits/receives data to/from the ENB 1e-02 (at step 1e-30). During transmission/reception of the data, if needed, the ENB 1e-02 may resend the RRCConnectionRe-configuration message to the UE 1e-01 (at step 1e-35) to reconfigure the setup information of the respective layers of the UE. That is, the message may include the setup information about the PHY or NR PHY device, the MAC or NR MAC device, the RLC or NR RLC device, and the PDCP or NR PDCP device, and may include the information indicating the setup for a specific one of functions supported by the layer entities (layer functions as described above with reference to FIG. 1B or 1D). The message may include the setup information to be applied by the PDCP device and the RLC device through the bearer setup, and may include information (or indication) indicating the length of the SN and information on what PDCP header format and what RLC header format are to be applied. If the setup of the respective layer entities is completed in accordance with the message, the UE 1e-01 transmits the RRCConnectionRe-configurationComplete message to the ENB 1e-02 (at step 1e-40).

Figure 1F:
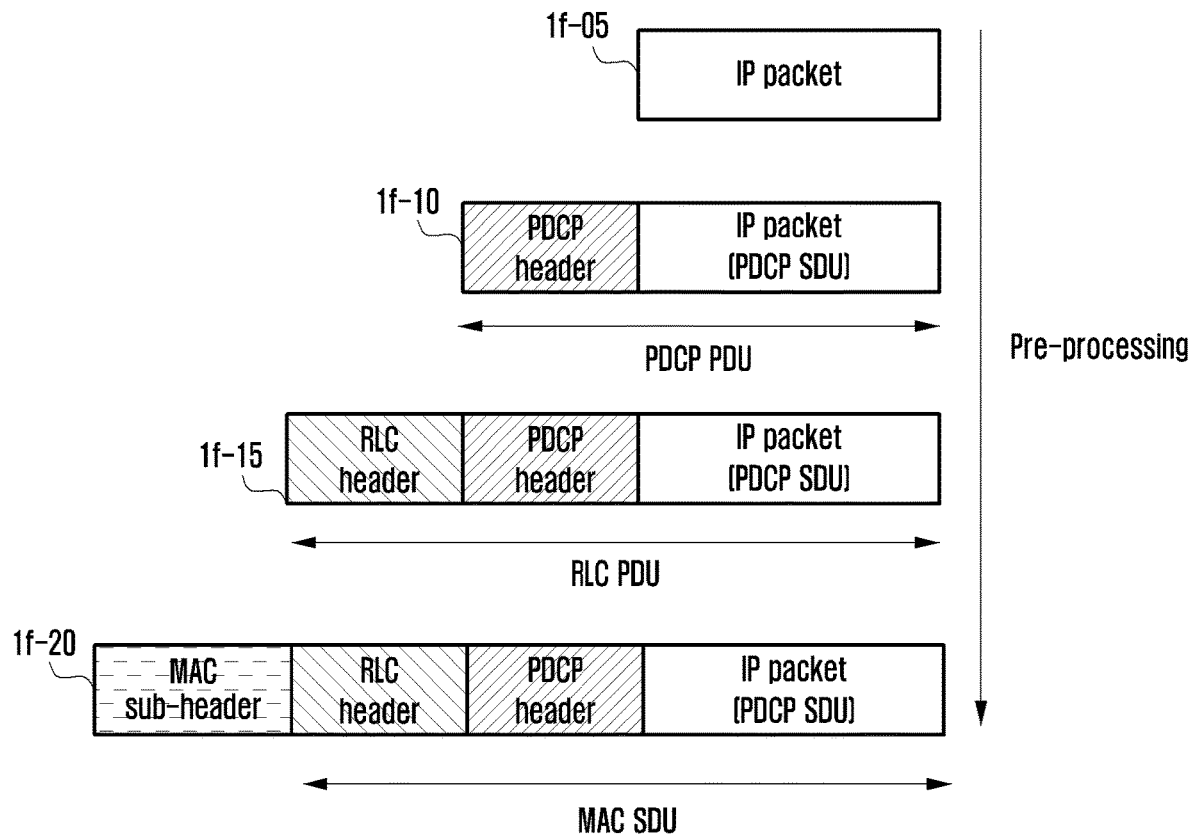
FIG. 1F is a diagram of a method for preprocessing data, according to an embodiment of the present disclosure.

FIG. 1F is a diagram of a method for preprocessing data, according to an embodiment of the present disclosure.

In the next-generation mobile communication system, if an NR ENB or a UE on a user plane receives a data packet 1f-05 from an upper layer, it may preprocess the received packet. The data preprocessing includes preprocessing an IP packet to a PDCP PDU 1f-10 of a PDCP layer, an RLC PDU 1f-15 of an RLC layer, or a MAC SDU 1f-20 of a MAC layer together with a MAC sub-header.

Figure 1G:
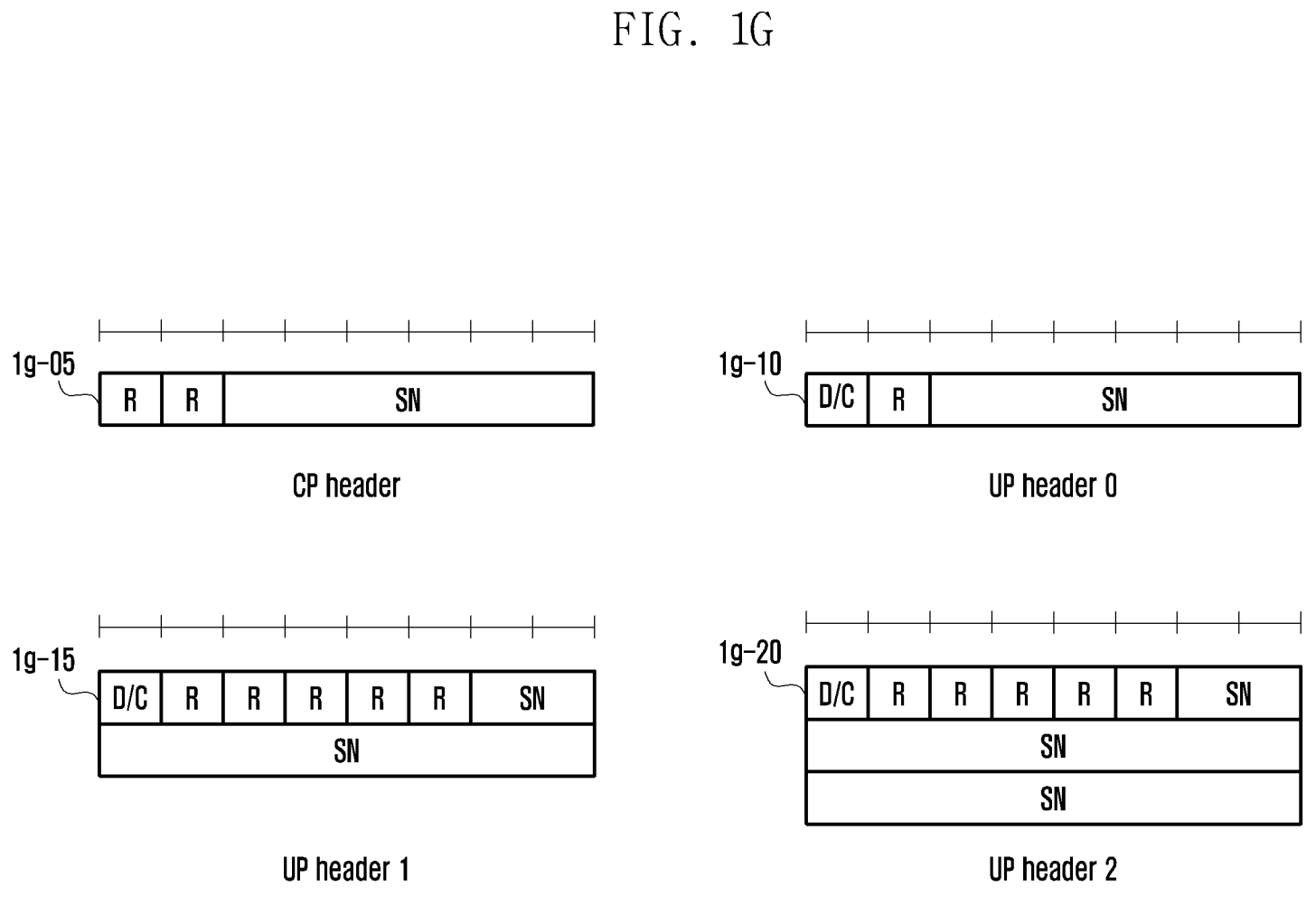

FIG. 1G is a diagram of header formats of an NR PDCP device, according to an embodiment of the present disclosure.

In FIG. 1G, 1g-05 representing the first PDCP header format for a control plane of a PDCP device may support an SN having a length of 6 bits, and may have a reservation field of 2 bits. 1g-10 representing the (2-1)-th PDCP header format for a user plane of the PDCP device may support an SN of 6 bits, and may have a reservation field of 1 bit and a D/C field of 1 bit. The D/C field is a field for discrimination between a PDCP control PDU sending/receiving a control command between PDCP devices and a PDCP data PDU received from an upper layer. 1g-15 representing the (2-2)-th PDCP header format for the user plane of the PDCP device may support an SN of 8 bits, and may have a reservation field of 5 bits and a D/C field of 1 bit. The D/C field is a field for discrimination between the PDCP control PDU sending/receiving the control command between the PDCP devices and a PDCP data PDU received from the upper layer. 1g-20 representing the (2-3)-th PDCP header format for the user plane of the PDCP device may support an SN of 18 bits, and may have a reservation field of 5 bits and a D/C field of 1 bit. The D/C field is a field for discrimination between the PDCP control PDU sending/receiving the control command between the PDCP devices and a PDCP data PDU received from the upper layer.

When defining the PDCP header as described above, one header for the control plane has been defined as the first PDCP header format, and three headers for the user plane have been defined as the (2-1)-th, (2-2)-th, and (2-3)-th PDCP header formats. However, using the above-described fields, x PDCP headers for the control plane may be defined, and y PDCP headers for the user plane may be defined. Although the PDCP SNs respectively support 6 bits, 10 bits, and 18 bits as described above, a PDCP SN having specific k bits may be additionally supported.

Figure 1H:
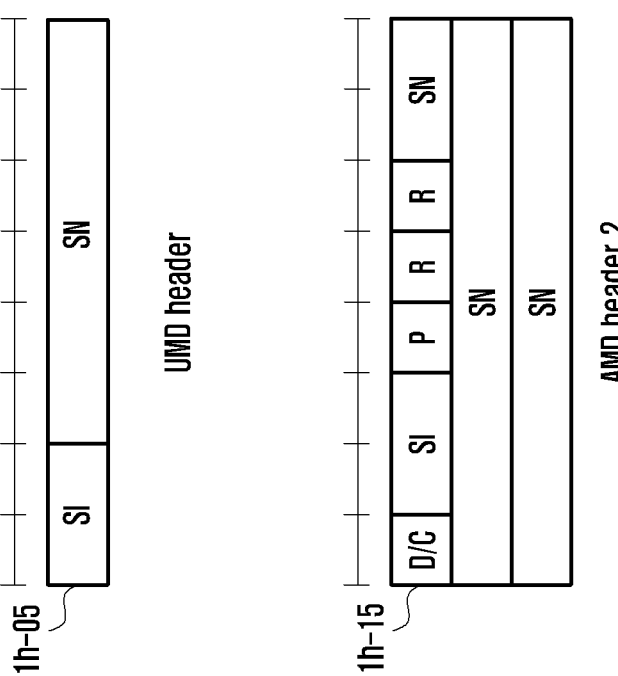
FIG. 1H is a diagram of header formats of an NR RLC device, according to an embodiment of the present disclosure.

FIG. 1H is a diagram of header formats of an NR RLC device, according to an embodiment of the present disclosure.

In FIG. 1H, 1h-05 representing the first RLC header format for an RLC unacknowledged mode (UM) of an RLC device may support an SN having a length of 6 bits, and may have a segmentation information (SI) field of 2 bits. The SI field may be defined as follows, and the field name SI may be named another name, such as frame information (FI) or segmentation control (SC).

TABLE 1

| Value | Description |
|-------|-------------|
| 00 | A complete RLC PDU |
| 01 | First segment of a RLC PDU |
| 10 | Last segment of a RLC PDU |
| 11 | Middle segment of a RLC PDU |

If the SI field is 00, it represents a complete RLC PDU that is not segmented, and in this case, the RLC header does not require a segment offset (SO) field. If the SI field is 01, it represents the foremost RLC PDU segment that is segmented, and in this case, the RLC header does not require the SO field. If the SI field is 10, it represents the last RLC PDU segment that is segmented, and in this case, the RLC header requires the SO field. If the SI field is 11, it represents the middle RLC PDU segment that is segmented, and in this case, the RLC header requires SO field. The number of mapping relations between the 2 bits and the four kinds of information (complete RLC PDU, foremost segment, last segment, and middle segment) is 24 (=4×3×2×1) in total, and the above-described example indicates one of them. 24 kinds of mappings are included. The SO fields are 15 or 16 fields, and are used to indicate at what position on the original PDU the PDU segment exists.

The SI field of 2 bits may be replaced by a segment flag (SF) field of 1 bit and a last segment flag (LSF) field of 1 bit. The SF field of 1 bit may indicate existence/nonexistence of the segment in the RLC PDU, and the LSF field of 1 bit may be a field indicating whether the segment is the last segment of the original RLC PDU. That is, if the SF field is 0, the segment does not exist, whereas if the SF field is 1, the segment exists. This may also be defined through changing of 0 and 1 with each other. If the LSF field is 0, it may be indicated that the segment is the first or middle segment, or it may be indicated that the segment is only the first segment or only the middle segment. If the LSF field is 1, it may be indicated that the segment is the last segment. Further, this may also be defined through changing 0 and 1 with each other. The SF field of 1 bit and the LSF field of 1 bit as defined above may always exist in the RLC header.

The SI field of 2 bits may be replaced by the SF field of 1 bit and the LSF field of 1 bit. The SF field of 1 bit indicates existence/nonexistence of the segment in the RLC PDU, and if it is indicated that the segment exists, the LSF field also exists at the same time. Accordingly, if the SF field indicates nonexistence of the segment, even the LSF field may not exist. That is, if the SF field is 0, it may indicate that the segment does not exist and the LSF field does not exist at the same time. Accordingly, only when the SF field is 1, that is, the segment exists, the LSF field may also exist, and if the LSF field is 0, it may indicate that the segment is not the last segment, whereas if the LSF field is 1, it may indicate that the segment is the last segment. Accordingly, the SF field always exists in the RLC header, but the LSF field may exist only when the segment exists in the SF field.

Further, 1*h*-10 representing the (2-1)-th RLC header format for an RLC AM of the RLC device may support an SN of 10 bits, and may have a D/C field of 1 bit, an SI field of 2 bits, a polling field of 1 bit, and a reservation field of 2 bits. The D/C field is a field for discrimination between an RLC control PDU sending/receiving a control command between RLC devices and an RLC data PDU received from an upper layer. The polling field is a field for requesting an RLC buffer status report.

1*h*-15 representing the (2-2)-th RLC header format for the RLC AM of the RLC device may support an SN of 18 bits, and may have a D/C field of 1 bit, an SI field of 2 bits, a polling field of 1 bit, and a reservation field of 2 bits. The D/C field is a field for discrimination between an RLC control PDU sending/receiving a control command between RLC devices and an RLC data PDU received from an upper layer. The polling field is a field for requesting an RLC buffer status report.

When defining the RLC header as described above, one header for the RLC UM has been defined as the first RLC header format, and two headers for the RLC AM have been defined as the (2-1)-th and (2-2)-th RLC header formats. However, using the above-described fields, m RLC headers for the RLC UM mode may be defined, and n RLC headers for the RLC AM mode may be defined. Although the PDCP SN s respectively support 6 bits, 10 bits, and 18 bits as described above, an RLC SN having specific x bits may be additionally supported.

In the next-generation mobile communication system, the RLC layer does not have a concatenation function, and, thus, it is characteristic of the next-generation mobile communication system that the RLC header does not have an E field. In a legacy mobile communication system, the E field is an information field that indicates whether a data field comes just behind an anchor RLC header part of the header or the E field, or whether the E field, an L field, or another header field comes just behind the anchor RLC header part or the E field. If the E field is 0, it indicates whether the data field comes just behind the anchor RLC header part or the E field, whereas if the E field is 1, it indicates whether another E field, the L field, or another header field comes just behind the anchor RLC header part or the E field. In the next-generation mobile communication system, when indicating segments, the RLC layer can use an integrated segmentation method based on the SO field, and, thus, it may not be necessary to discriminate between segmentation and re-segmentation, and it may not be necessary to particularly indicate the segment. Accordingly, the RLC header may be featured not to have a re-segmentation flag field. The re-segmentation flag field is composed of 1 bit, and is used to indicate whether the configured RLC PDU is a PDU or a PDU segment.

Figure 1I:
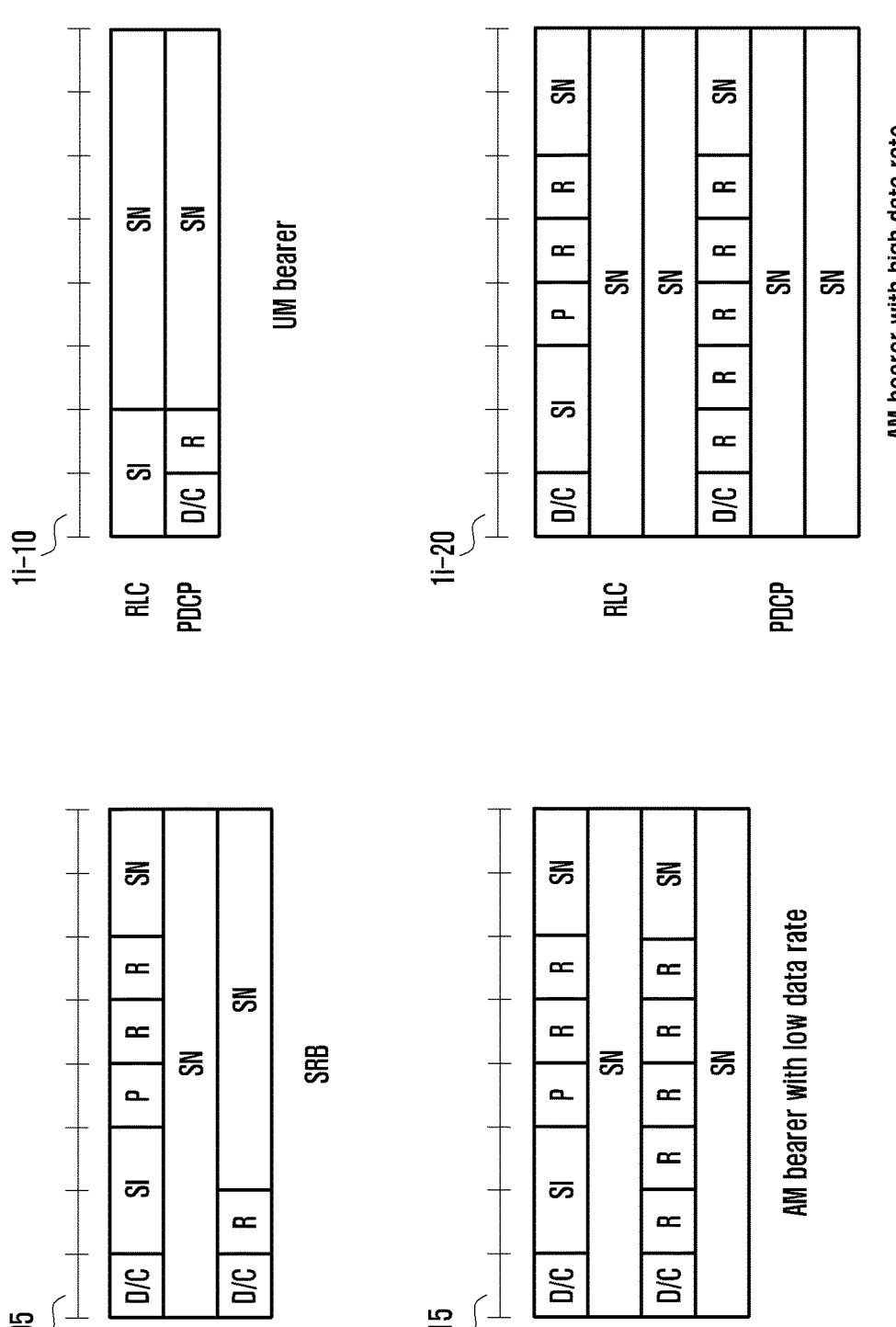
FIG. 1I is a diagram of header structures of bearers to which PDCP headers and RLC headers are applied, according to an embodiment of the present disclosure.

FIG. 1I is a diagram of bearers of PDCP headers and RLC headers are applied, according to an embodiment of the present disclosure.

Referring to FIG. 1I, when a signaling radio bearer (SRB) in the next-generation mobile communication system (1*i*-05), since it is possible to transmit/receive data on a control plane and to apply the RLC AM mode, the first PDCP header and the (2-1)-th RLC header can be used. When a UM bearer for VoIP or audio or video streaming (1*i*-10), the (2-1)-the PDCP header and the first RLC header can be applied. When a general AM bearer (1*i*-15 or 1*i*-20), the (2-2)-th PDCP header and the (2-1)-the RLC header may be applied (1*i*-15), or the (2-3)-th PDCP header and the (2-2)-th RLC header may be applied (1*i*-20).

In the next-generation mobile communication system, the RLC header and the PDCP header may use a SN having the same length when they are applied to a certain bearer, a DRB or an SRB. The SRB bearer may use a SN having a different length.

When using the PDCP headers and the RLC headers of FIGS. 1G and 1H, only one combination of the PDCP header and the RLC header exists in the SRB bearer and the UM bearer. Accordingly, it may be directly applied to the PDCP device and the RLC device. However, when the AM bearer, two combinations of the PDCP header and the RLC header exist, a method for selecting one of them is required.

A first embodiment for selecting the PDCP header and the RLC header of the AM bearer is as follows.

If the AM bearer receives an RRC message (e.g., 1*e*-10, 1*e*-20, or 1*e*-35 of FIG. 1E), and if a first condition is satisfied, a first method is applied, whereas if a second condition is satisfied, a second method is applied.

The first condition corresponds to a case where information (indication) indicating the SN is included in information for configuring the PDCP device and the RLC device of the bearer (the information for configuring the PDCP device and the RLC device may be included and indicated in the RRC message 1*e*-10, 1*e*-20, or 1*e*-35 in FIG. 1E).

The second condition corresponds to a case where the information (indication) indicating the SN is not included in the information for configuring the PDCP device and the RLC device of the bearer.

The first method includes an application of the (2-2)-th PDCP header and the (2-1)-th RLC header in the AM bearer (1*i*-15), and the second method includes an application of the (2-3)-th PDCP header and the (2-2)-th RLC header in the AM bearer (1*i*-20).

Figure 1J:
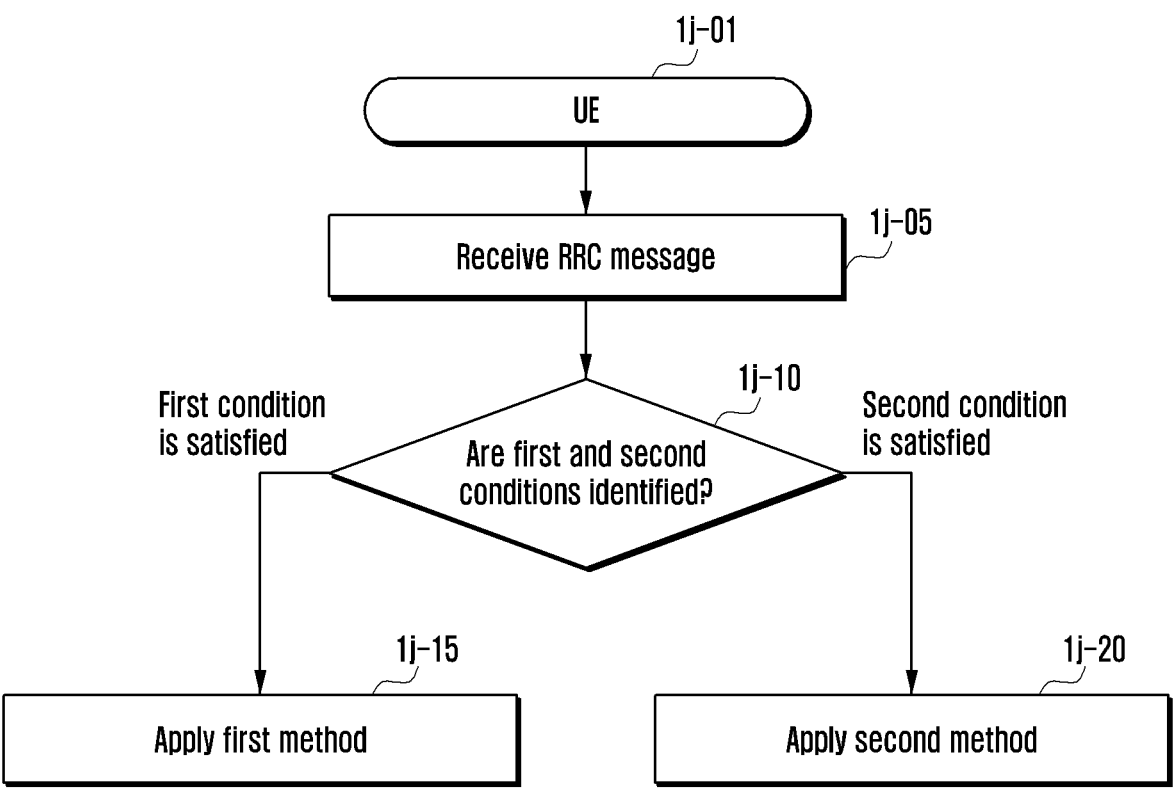
FIG. 1J is a flowchart of a method of a terminal for selecting a PDCP header and an RLC header of an acknowledged mode (AM) bearer, according to an embodiment of the present disclosure.

FIG. 1J is a flowchart of a method of a terminal for selecting a PDCP header and an RLC header of an AM bearer when using the PDCP headers and the RLC headers proposed of FIGS. 1G and 1H, according to an embodiment of the present disclosure.

A terminal 1*j*-01 receives an RRC message at step 1*j*-05 (e.g., 1*e*-10, 1*e*-20, or 1*e*-35 of FIG. 1E), and if a first condition is satisfied at step 1*j*-10, a first method is applied (at step 1*j*-15), whereas if a second condition is satisfied, a second method is applied (at step 1*j*-20).

In contrast with the PDCP headers and the RLC headers proposed in FIGS. 1G and 1H, various PDCP headers and RLC headers can be defined using respective PDCP header fields and RLC header fields. In this case, since two or more combinations of the PDCP header and the RLC header may exist in an SRB bearer, a UM bearer, and an AM bearer, a procedure of selecting header formats of the respective PDCP devices and RLC devices is necessary. A second embodiment for selecting the PDCP header and the RLC header of the PDCP device and the RLC device is as follows.

A base station may send a radio bearer (RB) setup message to a terminal. The message may be included and indicated in an RRC message (1*e*-10, 1*e*-20, or 1*e*-35 of FIG. 1E). The terminal receives the message, sets up a bearer, and determines a format of packets to be transmitted and received through the bearer. The terminal and the base station transmit/receive data packets to/from each other in the determined format. In this case, a second embodiment for determining header formats of the PDCP device and the RLC device of the packets to be transmitted and received of the bearer is as follows.

The terminal may receive an RRC message, e.g., 1*e*-10, 1*e*-20, or 1*e*-35 of FIG. 1E, and if a first condition and a second condition are satisfied, a first method may be applied, whereas if the first condition and a third condition are satisfied, a second method may be applied. If a fourth condition is satisfied, a third method may be applied, and if a fifth condition is satisfied, a fourth method may be applied. If a sixth condition is satisfied, a fifth method may be applied, and if a seventh condition is satisfied, a sixth method may be applied. If an eighth condition is satisfied, a seventh method may be applied, and if a ninth condition is satisfied, an eighth method may be applied.

The first condition as described above corresponds to a case where the RB is a DRB and the RB setup message does not include information indicating the length of a SN, and the second condition corresponds to a case where the RB is an RLC AM bearer (or an RLC AM mode is applied). The third condition corresponds to a case where the RB is an RLC UM bearer (or an RLC UM mode is applied), and the fourth condition corresponds to a case where the RB is a DRB and the RB setup message includes only information indicating the length of a PDCP sequence number. The fifth condition corresponds to a case where the RB is a DRB and the RB setup message includes both information indicating the length of a PDCP SN and information indicating the length of an RLC SN, and the sixth condition corresponds to a case where the RB is a control bearer (e.g., SRB), and the RB setup message does not include information indicating the length of a SN. The seventh condition corresponds to a case where the RB is a control bearer and the RB setup message includes information indicating the length of an RLC SN, and the eighth condition corresponds to a case where the RB is a control bearer and the RB setup message includes information indicating the length of a PDCP SN. The ninth condition corresponds to a case where the RB is a control bearer and the RB setup message includes information indicating the length of a PDCP SN and the length of an RLC SN.

The first method as described above is to configure the length of the PDCP SN and the length of the RLC SN with specific n bits, and the second method is to configure the length of the PDCP SN and the length of the RLC SN with specific m bits. The third method is to configure the length of the RLC SN to be equal to the length of the PDCP SN, and the fourth method is to configure the length of the PDCP SN and the length of the RLC SN with indicated values. The fifth method is to configure the length of the PDCP SN with specific k bits and to configure the length of the RLC SN with specific j bits (where, k and j may be different from each other), and the sixth method is to use specific k bits for the length of the PDCP SN and to use an indicated size for the length of the RLC SN. The seventh method is to use an indicated size for the length of the PDCP SN and to use the same length as the length of the PDCP SN for the RLC SN, and the eighth method is to use an indicated size for the length of the PDCP SN and to use an indicated size also for the length of the RLC SN.

The information for configuring the PDCP device and the RLC device in the RB setup message may be included and indicated in the RRC message (e.g., 1*e*-10, 1*e*-20, or 1*e*-35 of FIG. 1E).

The second embodiment for selecting the header formats of the PDCP device and the RLC device as described above may be summarized as follows:

When the radio bearer is a DRB, and the RB setup message does not include the information indicating the length of the SN, if the RB is the RLC AM bearer, the length of the PDCP SN and the length of the RLC SN are configured with specific n bits, and if the RB is the RLC UM bearer, the length of the PDCP SN and the length of the RLC SN are configured with specific m bits.

When the RB is a DRB, and the RB setup message includes only the information indicating the length of the PDCP SN, the length of the RLC SN is configured to be equal to the length of the PDCP SN.

When the RB is a DRB, and the RB setup message includes both the information indicating the length of the PDCP SN and the information indicating the length of the RLC SN, the length of the RLC SN is configured to be an indicated value.

When the RB is an SRB, and the RB setup message does not include the information indicating the length of the SN, the length of the PDCP SN is composed of specific k bits, and the length of the RLC SN is composed of specific j bits (where, k and j may be different from each other).

When the RB is an SRB, and the RB setup message includes the information indicating the length of the RLC SN, the length of the PDCP SN is composed of specific k bits, and the length of the RLC SN is configured to have an indicated size.

When the RB is an SRB, and the RB setup message includes the information indicating the length of the PDCP SN, the length of the PDCP SN has an indicated size, and the RLC SN uses the length of the SN equal to that of the PDCP.

When the RB is an SRB, and the RB setup message includes the information indicating the length of the PDCP SN and the length of the RLC SN, the length of the PDCP SN has an indicated size, and the RLC SN has an indicated size.

Figure 1K:
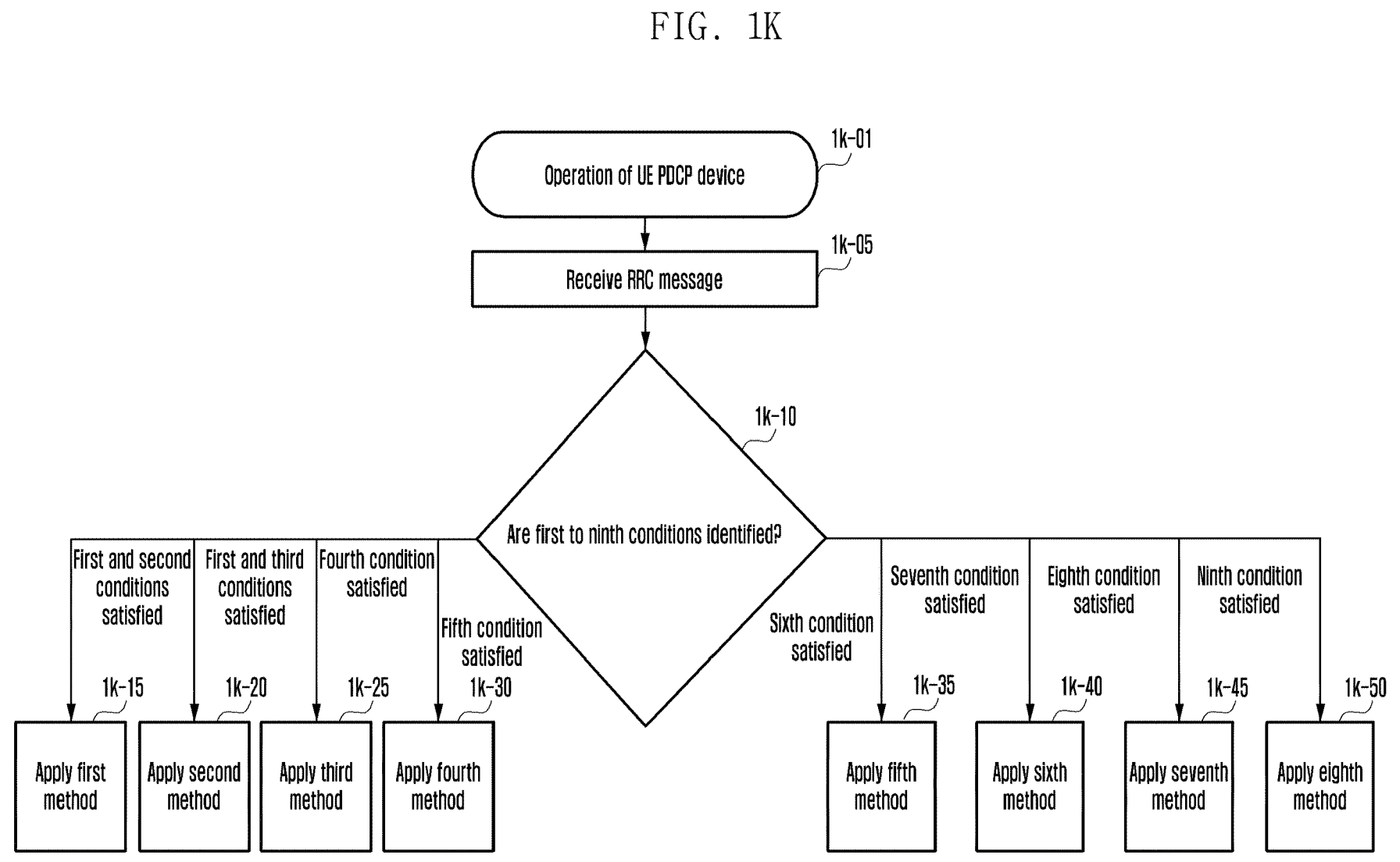

FIG. 1K is a flowchart of a method of a terminal for selecting a PDCP header and an RLC header of each bearer using various PDCP headers and RLC headers, according to an embodiment of the present disclosure.

Referring to FIG. 1K, a terminal at step 1*k*-01 receives an RB setup message at step 1*k*-05 (RRC message, e.g., 1*e*-10, 1*e*-20, or 1*e*-35 of FIG. 1E). The terminal may identify respective conditions (at step 1*k*-10). If a first condition and a second condition are satisfied, a second method is applied (at step 1*k*-15), and if the first condition and a third condition are satisfied, a second method is applied (at step 1*k*-20). If a fourth condition is satisfied, a third method is applied (at step 1k-25), and if a fifth condition is satisfied, a fourth method is applied (at step 1k-30). If a sixth condition is satisfied, a fifth method is applied (at step 1k-35), and if a seventh condition is satisfied, a sixth method is applied (at step 1k-40). If an eighth condition is satisfied, a seventh method is applied (at step 1k-45), and if a ninth condition is satisfied, an eighth method is applied (at step 1k-50).

Figure 1L:
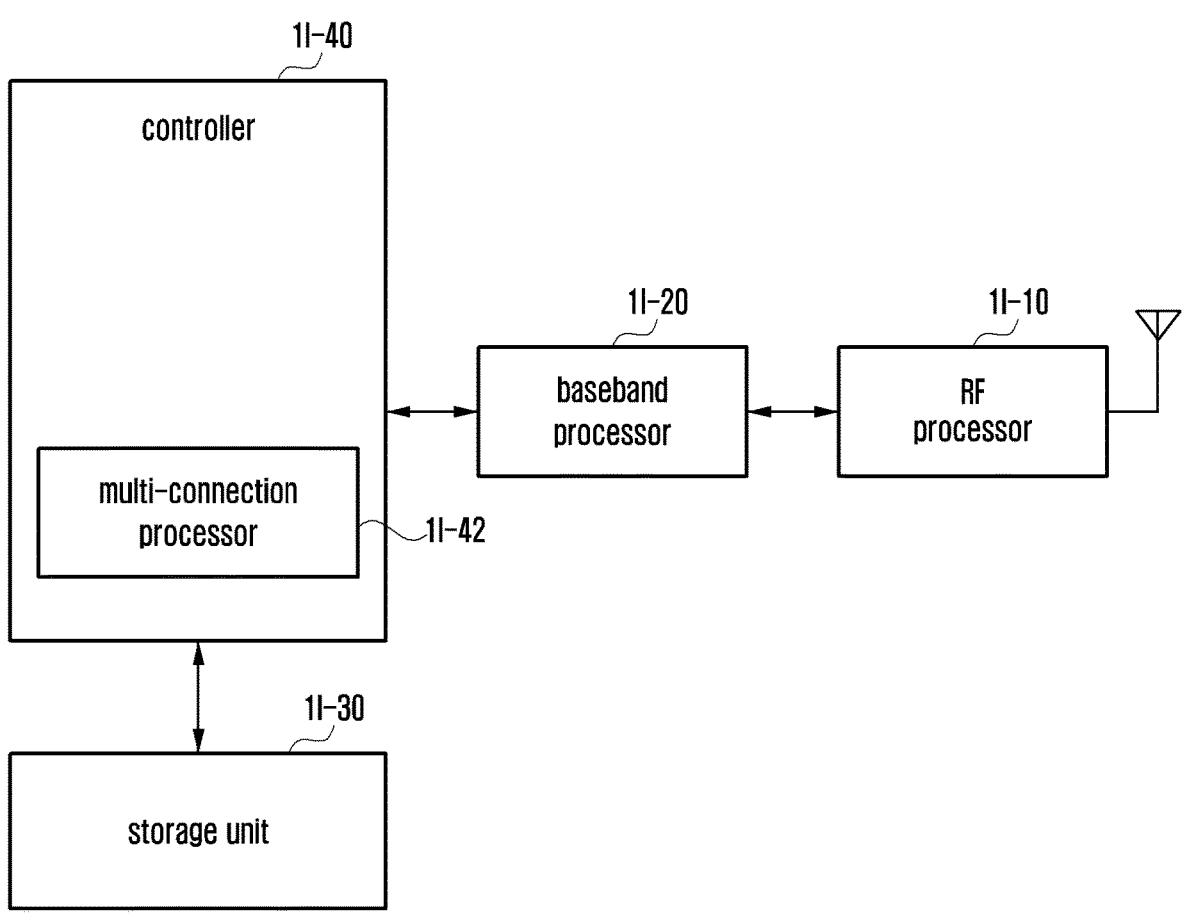
FIG. 1L is a diagram of a terminal, according to an embodiment of the present disclosure.

FIG. 1L is a diagram of a terminal, according to an embodiment of the present disclosure.

The terminal includes a radio frequency (RF) processor 1l-10, a baseband processor 1l-20, a storage unit 1l-30, and a controller 1l-40.

The RF processor 1l-10 performs transmitting and receiving a signal through a radio channel, such as signal band conversion and amplification. The RF processor 1l-10 performs up-conversion of a baseband signal provided from the baseband processor 1l-20 into an RF-band signal to transmit the converted signal to an antenna, and performs down-conversion of the RF-band signal received through the antenna into a baseband signal. The RF processor 1l-10 may include a transmission filter, a reception filter, an amplifier, a mixer, an oscillator, a digital-to-analog converter (DAC), and an analog-to-digital converter (ADC). Although only one antenna is illustrated in the drawing, the terminal may be provided with a plurality of antennas. The RF processor 1l-10 may include a plurality of RF chains. The RF processor 1l-10 may perform beamforming, and for the beamforming, the RF processor 1l-10 may adjust phases and sizes of signals transmitted or received through the plurality of antennas or antenna elements. The RF processor may perform MIMO, and may receive several layers during performing of a MIMO operation. The RF processor 1l-10 may perform reception beam sweeping through proper configuration of the plurality of antennas or antenna elements under the control of the controller, or may control the direction and the beam width of the reception beam so that the reception beam is synchronized with the transmission beam.

The baseband processor 1l-20 performs conversion between a baseband signal and a bit string in accordance with the physical layer standard of the system. For example, during data transmission, the baseband processor 1l-20 generates complex symbols by encoding and modulating a transmitted bit string. During data reception, the baseband processor 1l-20 restores a received bit string by demodulating and decoding the baseband signal provided from the RF processor 1l-10. When following an OFDM method, during data transmission, the baseband processor 1l-20 generates complex symbols by encoding and modulating a transmitted bit string, performs mapping of the complex symbols on subcarriers, and then configures OFDM symbols through the inverse fast Fourier transform (IFFT) operation and cyclic prefix (CP) insertion. During data reception, the baseband processor 1l-20 divides the baseband signal provided from the RF processor 1l-10 in the unit of OFDM symbols, restores the signals mapped on the subcarriers through the fast Fourier transform (FFT) operation, and then restores the received bit string through demodulation and decoding.

The baseband processor 1l-20 and the RF processor 1l-10 transmit and receive the signals as described above. Accordingly, the baseband processor 1l-20 and the RF processor 1l-10 may be called a transmitter, a receiver, a transceiver, or a communication unit. In order to support different radio connection technologies, at least one of the baseband processor 1l-20 and the RF processor 1l-10 may include a plurality of communication modules. In order to process signals of different frequency bands, at least one of the baseband processor 1l-20 and the RF processor 1l-10 may include different communication modules. The different radio connection technologies may include an LTE network and an NR network. Further, the different frequency bands may include super high frequency (SHF) (e.g., 2.5 GHz or 5 GHz) band and millimeter wave (mmWave) (e.g., 60 GHz) band.

The storage unit 1l-30 stores a basic program for an operation of the terminal, application programs, and data of setup information. The storage unit 1l-30 provides stored data in accordance with a request from the controller 1l-40.

The controller 1l-40 controls the terminal. The controller 1l-40 transmits and receives signals through the baseband processor 1l-20 and the RF processor 1l-10. The controller 1l-40 records or reads data in or from the storage unit 1l-30. The controller 1l-40 may include at least one processor, and may include a communication processor for communication and an AP for controlling an upper layer, such as an application program.

Figure 1M:
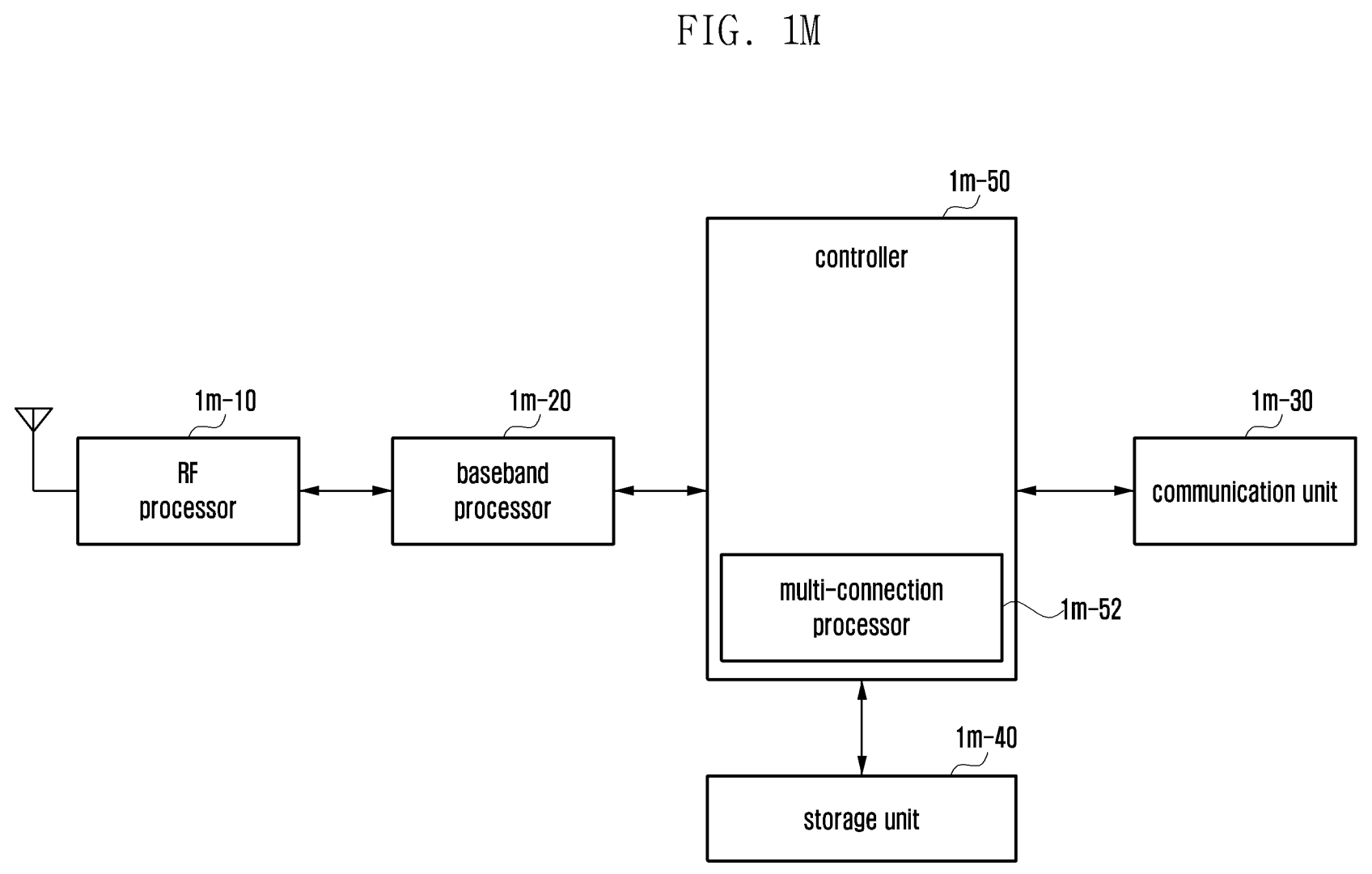

FIG. 1M is a diagram of a base station in a wireless communication system, according to an embodiment of the present disclosure.

The base station includes an RF processor 1m-10, a baseband processor 1m-20, a backhaul communication unit (communication unit) 1m-30, a storage unit 1m-40, and a controller 1m-50.

The RF processor 1m-10 performs transmitting and receiving a signal through a radio channel, such as signal band conversion and amplification. That is, the RF processor 1m-10 performs up-conversion of a baseband signal provided from the baseband processor 1m-20 into an RF-band signal to transmit the converted signal to an antenna, and performs down-conversion of the RF-band signal received through the antenna into a baseband signal. The RF processor 1m-10 may include a transmission filter, a reception filter, an amplifier, a mixer, an oscillator, a DAC, and an ADC. Although only one antenna is illustrated in the drawing, the first connection node may be provided with a plurality of antennas. The RF processor 1m-10 may include a plurality of RF chains. The RF processor 1m-10 may perform beamforming, and for the beamforming, the RF processor 1m-10 may adjust phases and sizes of signals transmitted or received through the plurality of antennas or antenna elements. The RF processor may perform down MIMO operation through transmission of one or more layers.

The baseband processor 1m-20 performs conversion between a baseband signal and a bit string in accordance with the physical layer standard of the first radio connection technology. During data transmission, the baseband processor 1m-20 generates complex symbols by encoding and modulating a transmitted bit string. During data reception, the baseband processor 1m-20 restores a received bit string by demodulating and decoding the baseband signal provided from the RF processor 1m-10. When following an OFDM method, during data transmission, the baseband processor 1m-20 generates complex symbols by encoding and modulating a transmitted bit string, performs mapping of the complex symbols on subcarriers, and then configures OFDM symbols through the IFFT operation and CP insertion. During data reception, the baseband processor 1m-20 divides the baseband signal provided from the RF processor 1m-10 in the unit of OFDM symbols, restores the signals mapped on the subcarriers through the FFT operation, and then restores the received bit string through demodulation and decoding. The baseband processor 1m-20 and the RF processor 1m-10 transmit and receive the signals as described above. Accordingly, the baseband processor 1m-20 and the RF processor 1m-10 may be called a transmitter, a receiver, a transceiver, or a wireless communication unit.

The communication unit 1m-30 provides an interface for performing communication with other nodes in the network.

The storage unit 1m-40 stores a basic program for an operation of the main base station, application programs, and data of setup information. In particular, the storage unit 1m-40 may store information on a bearer allocated to the connected terminal and the measurement result reported from the connected terminal. The storage unit 1m-40 may store information that becomes a basis of determination whether to provide or suspend a multi-connection to the terminal. The storage unit 1m-40 provides stored data in accordance with a request from the controller 1m-50.

The controller 1m-50 controls the main base station. The controller 1m-50 transmits and receives signals through the baseband processor 1m-20 and the RF processor 1m-10 or through the backhaul communication unit 1m-30. The controller 1m-50 records or reads data in or from the storage unit 1m-40. For this, the controller 1m-50 may include at least one processor.

Embodiment 2

Figure 2A:
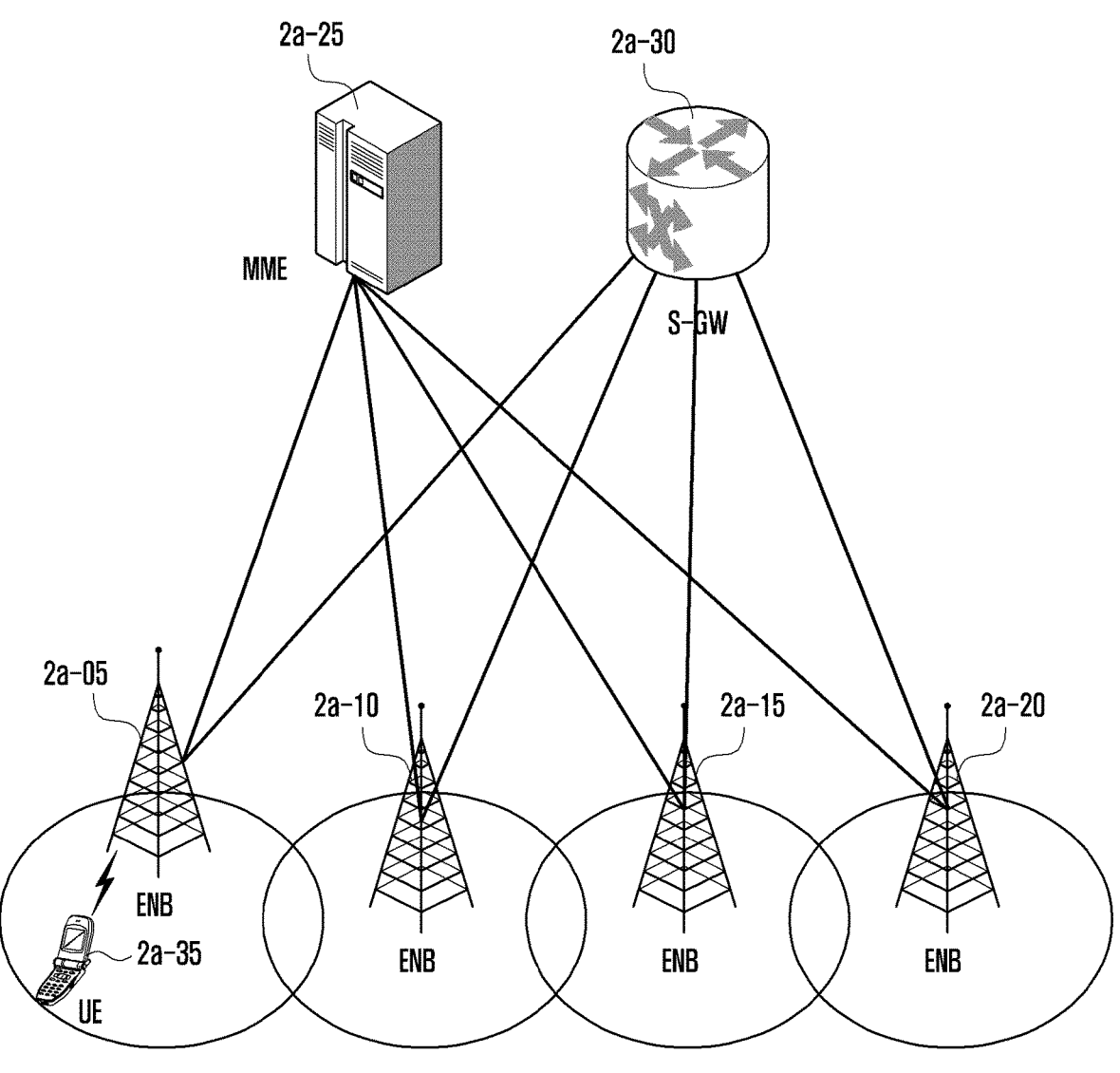
FIG. 2A is a diagram of an LTE system, according to an embodiment of the present disclosure.

FIG. 2A is a diagram of an LTE system, according to an embodiment of the present disclosure.

Referring to FIG. 2A, as illustrated, a RAN of an LTE system includes ENBs 2a-2a-10, 2a-15, and 2a-20, an MME 2a-25, and an S-GW 2a-30. "UE 2a-35 accesses to an external network through the ENBs 2a-05, 2a-10, 2a-15, and 2a-20 and the S-GW 2a-30.

In FIG. 2A, the ENB 2a-05, 2a-10, 2a-15, and 2a-20 correspond to an existing node B of a UMTS system. The ENBs 2a-05, 2a-10, 2a-15, or 2a-20 are connected to the UE 2a-35 on a radio channel, and plays a more complicated role than that of the existing node B. In the LTE system, since all user traffics including a real-time service, such as a VoIP through an internet protocol, are serviced on shared channels, devices performing scheduling through consolidation of state information, such as a buffer state, an available transmission power state, and a channel state of each UE, are necessary, and the ENBs 2a-05, 2a-10, 2a-15, and 2a-20 correspond to such scheduling devices. In general, one ENB controls a plurality of cells. In order to implement a transmission speed of 100 Mbps, the LTE system uses, OFDM in a bandwidth of 20 MHz as a RAT. Further, the LTE system adopts an AMC scheme that determines a modulation scheme and a channel coding rate to match the channel state of the terminal. The S-GW 2a-30 provides a data bearer, and generates or removes the data bearer under the control of the MME 2a-25. The MME 2a-25 takes charge of not only mobility management of the UE 2a-35 but also various kinds of control functions, and is connected to the plurality of ENBs 2a-05, 2a-10, 2a-15, and 2a-20.

Figure 2B:
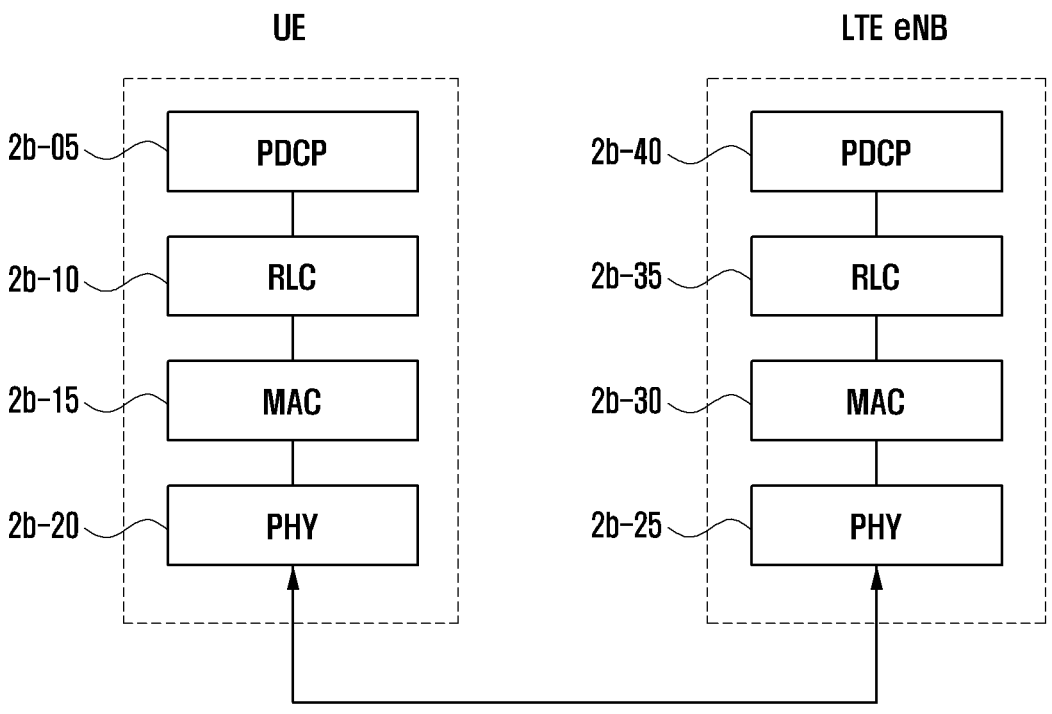
FIG. 2B is a diagram of a radio protocol structure in an LTE system, according to an embodiment of the present disclosure.

FIG. 2B is a diagram of a radio protocol structure in an LTE system, according to an embodiment of the present disclosure.

Referring to FIG. 2B, in a UE or an ENB, a radio protocol of an LTE system includes a PDCP 2b-05 or 2b-40, an RLC 2b-10 or 2b-35, and a MAC 2b-15 or 2b-30. The PDCP 2b-05 or 2b-40 takes charge of IP header compression/decompression operations. The main functions of the PDCP are summarized as follows:

Header compression and decompression: ROHC only;
Transfer of user data;

In-sequence delivery of upper layer PDUs at a PDCP reestablishment procedure for an RLC AM;
For split bearers in DC (only support for an RLC AM): PDCP PDU routing for transmission and PDCP PDU reordering for reception;
Duplicate detection of lower layer SDUs at a PDCP reestablishment procedure for an RLC AM;
Retransmission of PDCP SDUs at handover and, for split bearers in DC, of PDCP PDUs at a PDCP data-recovery procedure, for an RLC AM;
Ciphering and deciphering; and
Timer-based SDU discard in an uplink.

The RLC 2b-10 or 2b-35 reconfigures a PDCP PDU with a proper size and performs an ARQ operation and the like. The main functions of the RLC 2b-10 or 2b-summarized as follows.

Transfer of upper layer PDUs;
Error correction through an ARQ (only for AM data transfer);
Concatenation, segmentation, and reassembly of RLC SDUs (only for UM and AM data transfer);
Re-segmentation of RLC data PDUs (only for UM and AM data transfer);
Reordering of RLC data PDUs (only for UM and AM data transfer);
Duplicate detection (only for UM and AM data transfer);
Protocol error detection (only for AM data transfer);
RLC SDU discard (only for UM and AM transfer); and
RLC reestablishment.

The MAC 2b-15 or 2b-30 is connected to several RLC layer devices configured in one terminal, and performs multiplexing/demultiplexing of RLC PDUs into/from MAC PDU. The main functions of the MAC2b-15 or 2b-30 are summarized as follows:

Mapping between logical channels and transport channels;
Multiplexing/demultiplexing of MAC SDUs belonging to one or different logical channels into/from TB transferred to/from the physical layer on transport channels;
Scheduling information reporting;
HARQ function (error correction through HARQ);
Priority handling between logical channels of one UE;
Priority handling between UEs by means of dynamic scheduling;
MBMS service identification;
Transport format selection; and
padding.

The physical layer 2b-20 or 2b-25 performs channel coding and modulation of upper layer data to configure and transmit OFDM symbols on a radio channel, or performs demodulation and channel decoding of the OFDM symbols received on the radio channel to transfer the demodulated and channel-decoded symbols to an upper layer.

Figure 2C:
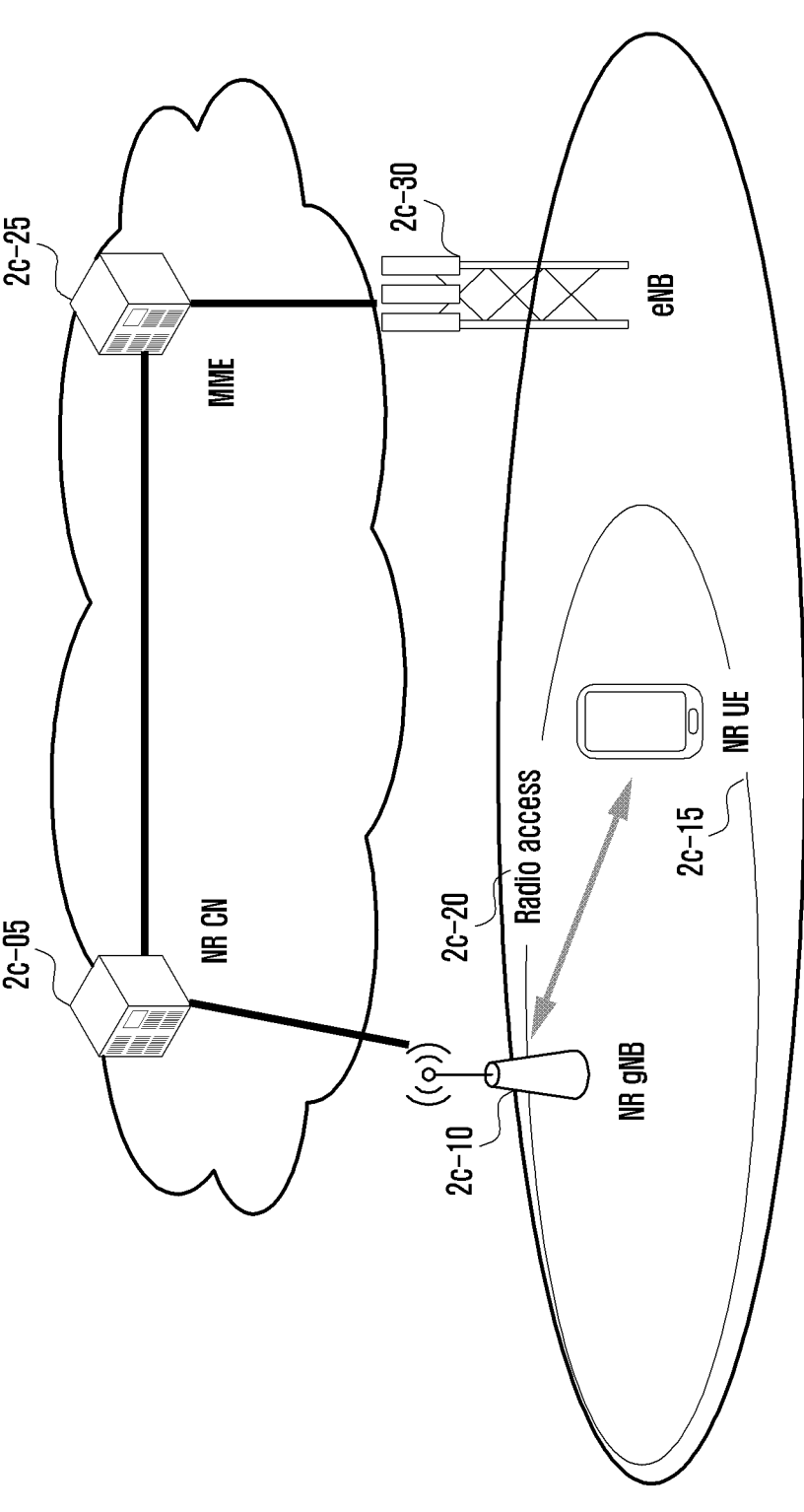
FIG. 2C is a diagram of a next-generation mobile communication system, according to an embodiment of the present disclosure.

FIG. 2C is a diagram of a next-generation mobile communication system, according to an embodiment of the present disclosure.

Referring to FIG. 2C, a RAN of a next-generation mobile communication system includes an NR gNB 2c-10 and an NR CN 2c-05. An NR UE 2c-15 accesses to an external network through the NR gNB 2c-10 and the NR CN 2c-05.

The NR gNB 2c-10 corresponds to an ENB of the existing LTE system. The NR gNB 2c-10 is connected to the NR UE 2c-15 on a radio channel, and, thus, it can provide a more superior service than the service of the existing node B. Since all user traffics are serviced on shared channels in the next-generation mobile communication system, a device that performs scheduling through consolidation of status information, such as a buffer state of UEs 2c-15, an available transmission power state, and a channel state, is required, and the NR NB 2c-10 takes charge of this. One NR gNB generally controls a plurality of cells. In order to implement ultrahigh-speed data transmission as compared with the existing LTE, the NR gNB may have a bandwidth that is equal to or higher than the existing maximum bandwidth, and a beamforming technology may be additionally grafted in consideration of OFDM as an RAT. An AMC scheme determining a modulation scheme and a channel coding rate to match the channel state of the UE 2c-15 is adopted. The NR CN 2c-05 performs mobility support, bearer setup, and QoS configuration. The NR CN 2c-05 is a device that takes charge of not only a mobility management function of the UE 2c-15 but also various kinds of control functions, and is connected to a plurality of ENBs. Further, the next-generation mobile communication system may interlock with the existing LTE system, and the NR CN 2c-05 is connected to an MME 2c-25 through a network interface. The MME 2c-25 is connected to an ENB 2c-30 that is the existing ENB.

Figure 2D:
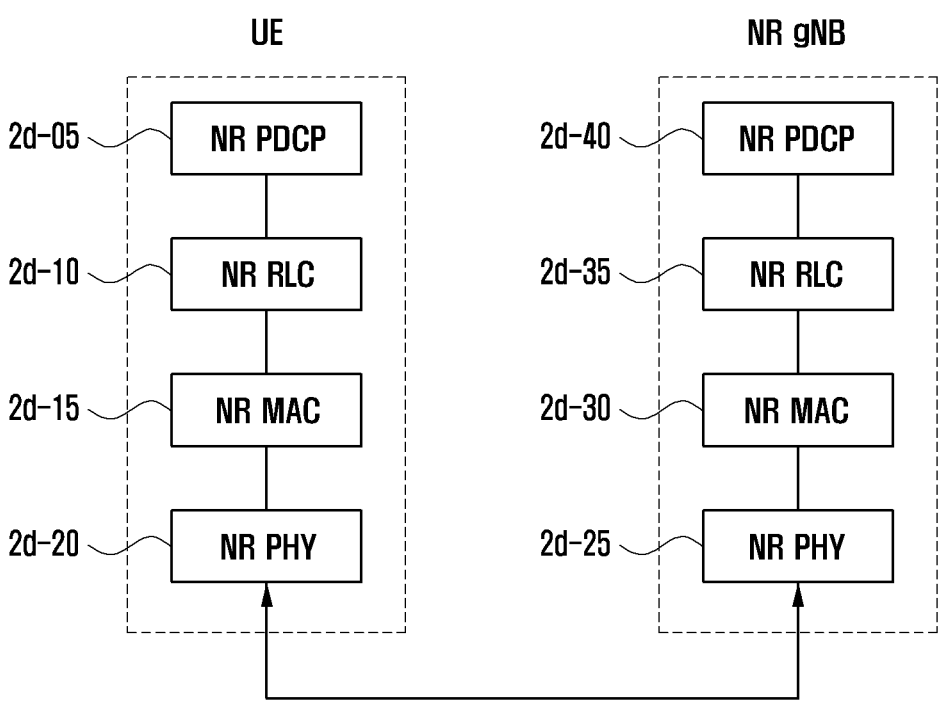
FIG. 2D is a diagram of a radio protocol structure of a next-generation mobile communication system, according to an embodiment of the present disclosure.

FIG. 2D is a diagram of a radio protocol structure of a next-generation mobile communication system, according to an embodiment of the present disclosure.

In a UE or an NR ENB, a radio protocol of the next-generation mobile communication system includes an NR PDCP 2d-05 or 2d-40, an NR RLC 2d-10 or 2d-35, and an NR MAC 2d-15 or 2d-30. The main functions of the NR PDCP 2d-05 or 2d-40 may include parts of the following functions:

Header compression and decompression: ROHC only;
Transfer of user data;
In-sequence delivery of upper layer PDUs;
PDCP PDU reordering for reception;
Duplicate detection of lower layer SDUs;
Retransmission of PDCP SDUs;
Ciphering and deciphering; and
Timer-based SDU discard in an uplink.

As described above, reordering of the NR PDCP devices may include reordering of PDCP PDUs received from a lower layer based on PDCP SNs. The reordering may include transfer of data to an upper layer in the order of reordering, recording of lost PDCP PDUs through reordering, status report for the lost PDCP PDUs to a transmission side, and retransmission request for the lost PDCP PDUs.

The main functions of the NR RLC 2d-10 or 2d-35 may include parts of the following functions:

Transfer of upper layer PDUs;
In-sequence delivery of upper layer PDUs;
Out-of-sequence delivery of upper layer PDUs;
Error correction through an ARQ;
Concatenation, segmentation, and reassembly of RLC SDUs;
Re-segmentation of RLC data PDUs;
Reordering of RLC data PDUs;
Duplicate detection;
Protocol error detection;
RLC SDU discard; and
RLC reestablishment.

As described above, in-sequence delivery of NR RLC devices may include in-sequence delivery of RLC SDUs received from a lower layer to an upper layer. When one original RLC SDU is segmented into several RLC SDUs to be received, the delivery may include reassembly and delivery of the RLC SDUs, reordering of the received RLC PDUs based on an RLC SN or a PDCP SN, recording of lost RLC PDUs through reordering, status report for the lost RLC PDUs to a transmission side, retransmission request for the lost PDCP PDUs, in-sequence delivery of only RLC SDUs just before the lost RLC SDU to an upper layer if there is the lost RLC SDU, in-sequence delivery of all RLC SDUs received before a specific timer starts its operation to an upper layer if the timer has expired although there is the lost RLC SDU, or in-sequence delivery of all RLC SDUs received up to now to an upper layer if the timer has expired although there is the lost RLC SDU. As described above, the RLC PDUs may be processed in the order of their reception (regardless of the order of the SNs, in the order of their arrival), and may be transferred to the PDCP device in an out-of-sequence manner. In a case of segments, such segments stored in the buffer or to be received later may be received and reconfigured to one complete RLC PDU, and then may be transferred to the PDCP device. The NR RLC layer may not include a concatenation function, and the function may be performed by an NR MAC layer or may be replaced by a multiplexing function of the NR MAC layer.

The out-of-sequence delivery of the NR RLC device 2d-10 includes a function of transferring the RLC SDUs received from a lower layer directly to an upper layer in an out-of-sequence manner. If one original RLC SDU is segmented into several RLC SDUs to be received, the delivery may include reassembly and delivery of the RLC SDUs, and recording of the lost RLC PDUs through storing and ordering the RLC SNs or PDCP SNs of the received RLC PDUs.

The NR MAC 2d-15 or 2d-30 may be connected to several NR RLC layer devices configured in one UE, and the main functions of the NR MAC may include parts of the following functions:

Mapping between logical channels and transport channels;
Multiplexing/demultiplexing of MAC SDUs;
Scheduling information reporting;
HARQ function (error correction through HARQ);
Priority handling between logical channels of one UE;
Priority handling between UEs by means of dynamic scheduling;
MBMS service identification;
Transport format selection; and
padding.

The NR PHY layer 2d-20 or 2d-25 may perform channel coding and modulation of upper layer data to configure and transmit OFDM symbols to a radio channel, or may perform demodulation and channel decoding of the OFDM symbols received on the radio channel to transfer the demodulated and channel-decoded symbols to an upper layer.

Figure 2E:
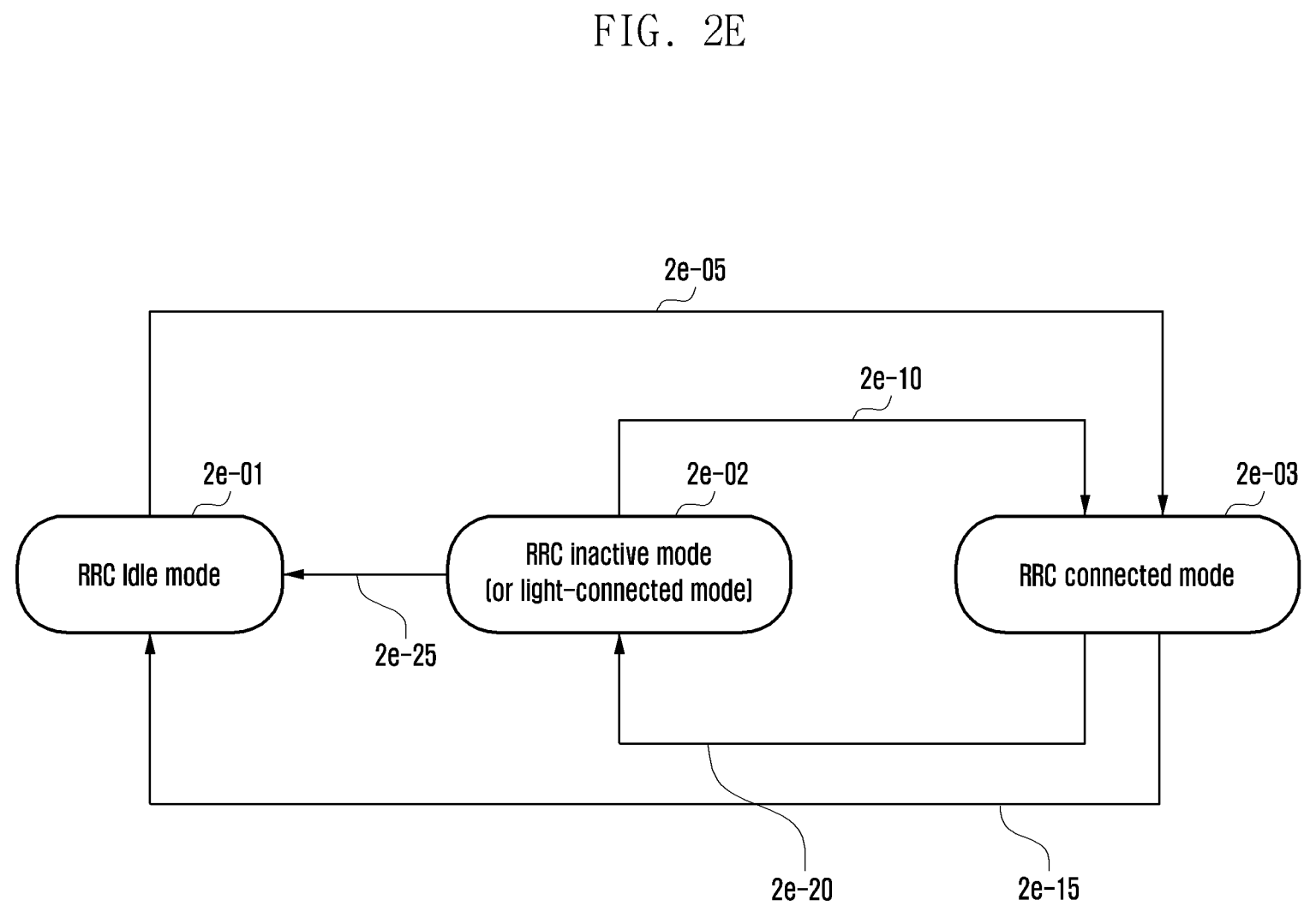

FIG. 2E is a diagram of modes in which a terminal can stay in a next-generation mobile communication system, according to an embodiment of the present disclosure.

A terminal (UE) may stay in an RRC connected mode 2e-03, an RRC inactive mode 2e-02 (or a lightly-connected mode 2e-02), and an RRC idle mode 2e-01, and may pass through processes of switching over to different modes 2e-05, 2e-10, 2e-15, 2e-20, and 2e-25. That is, the UE in the RRC idle mode 2e-01 may be switched to the RRC connected mode 2e-03 (via 2e-05) to transmit/receive data if data to be transmitted to an uplink is generated, if a paging message is received through arrival of downlink data, or if an access to the network is configured to update a tracking area.

If data is not generated for a predetermined time after the data is transmitted or received, the UE in the RRC connected mode 2e-03 may be switched to the RRC idle mode 2e-01 by the network (via 2e-15). Further, if data is not generated for a predetermined time, the UE in the RRC connected mode 2e-03 may be switched to the RRC inactive mode 2e-02 by the network or by itself for the purpose of battery saving and rapid access support (via 2e-20).

If data to be transmitted to an uplink is generated, if a paging message is received through arrival of downlink data, or if an access to the network is configured to update a tracking area (or RAN notification area) (periodically or if the UE deviates from the tracking area (or RAN notification area), the UE in the RRC inactive mode 2e-02 may be switched to the RRC connected mode 2e-03 (via 2e-10). The UE in the RRC inactive mode 2e-02 may be shifted to the RRC idle mode 2e-01 by indication of the network, by pre-engaged configuration, or by itself (via 2e-25).

If many UEs in the RRC inactive mode exist in the network, this may cause signaling overhead of the network to be increased due to frequent procedures of updating a RAN notification area, and, thus, shifting of the UEs in the RRC inactive mode to the RRC idle mode should be supported. When the UE has a specific purpose, it may transmit data even in the RRC inactive mode 2e-02 without being shifted to the RRC connected mode 2e-03, repeat shifting in accordance with the indication of the network between the RRC inactive mode 2e-02 and the RRC idle mode 2e-01, and may proceed to be shifted to the RRC connected mode only in case of need.

In the above-described procedure, since the UE in the RRC inactive mode transmits data in the RRC inactive mode, it has the advantages that it has a very short transmission delay and very small signaling overhead. When transmitting only a small amount of data, the UE may correspond to the UE transmitting data intermittently or for a very long period. The UE in the RRC idle mode 2e-01 may be directly shifted to the RRC inactive mode 2e-02 by the network, or may be shifted to the RRC connected mode 2e-03 and then may be shifted to the RRC inactive mode 2e-02 (via 2e-20).

In order to solve the state mismatch problem between the mode of the UE that performs shifting between the modes and the mode of the UE that is recognized by the network, an inactive timer may be additionally configured to be driven in the UE. Further, such an inactive timer may also be driven in the ENB.

The RRC inactive mode and the lightly-connected mode may be analyzed as the same state modes, and it may be assumed that the UE performs the same operation. The RRC inactive mode and the lightly-connected mode may be analyzed as the same state modes, but it may be assumed that the UE performs different operations in the respective modes. The RRC inactive mode and the lightly-connected mode may be analyzed as different state modes, and it may be assumed that the UE performs different operations in the respective modes. Although the RRC inactive mode and the lightly-connected mode have the same purpose on the point that a rapid re-access becomes possible with small signaling and the battery can be saved, they may be the same modes or different modes depending on implementation of the UE and the network and their definition. The UE operation in the RRC inactive mode and the lightly-connected mode may be the same as the operation in the RRC idle mode, may have an additional function, or may have only a partial function of the operation in the RRC idle mode.

As described above, in the RRC inactive mode, a UE battery can be saved, and when the UE accesses to the network, a rapid access can be configured with a small signaling overhead. However, the UE in the RRC inactive mode should perform a procedure for updating a RAN notification area more frequently than a procedure in which the UE in the RRC idle mode periodically updates a tracking area. Accordingly, if many UEs in the RRC inactive mode exist in the network, this may cause the signaling overhead due to the procedure for periodically updating the periodic RAN notification area, and, thus, it is necessary for the network to manage the UEs in the RRC inactive mode and, if needed, to switch the UEs in the RRC inactive mode to the RRC idle mode.

Figure 2F:
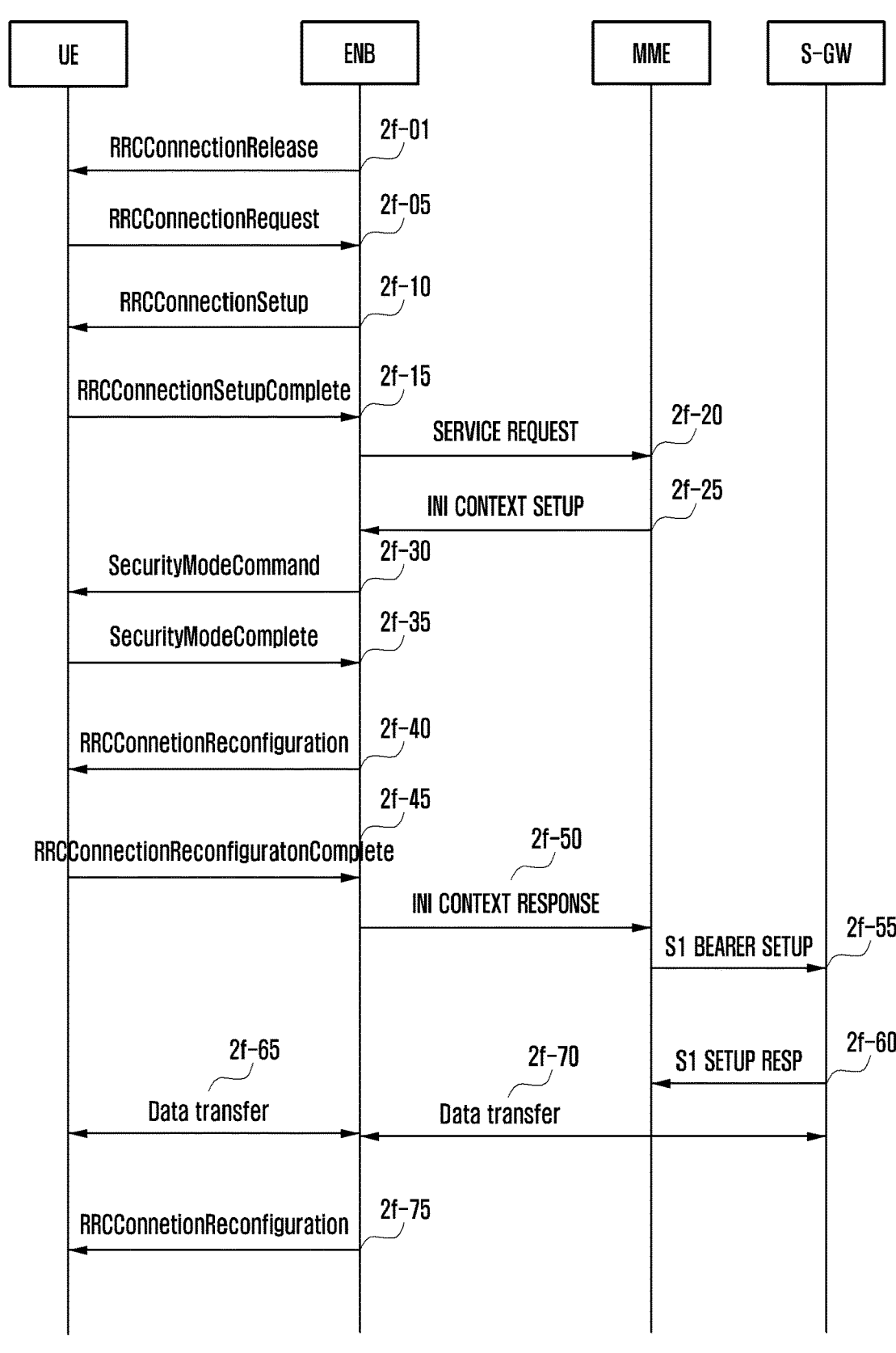
FIG. 2F is a flowchart of method of a terminal switched from an RRC connected mode to an RRC idle mode and a method of the terminal switched from the RRC idle mode to the RRC connected mode, according to an embodiment of the present disclosure.

FIG. 2F is a flowchart of a method for a terminal switched from an RRC connected mode to an RRC idle mode and a terminal switched from the RRC idle mode to the RRC connected mode, according to an embodiment of the present disclosure.

Referring to FIG. 2F, if a terminal (UE) transmitting/receiving data in the RRC connected mode does not transmit/receive the data for a specific cause/reason or for a predetermined time, an ENB may transmit an RRCConnectionRelease message to the UE causing the UE to be switched to the RRC idle mode (at step 2f-01). Thereafter, if data to be transmitted is generated, the UE ("idle mode UE"), of which connection is not currently set, performs an RRC connection establishment process with the ENB. The UE establishes backward transfer synchronization with the ENB through a random access procedure, and transmits an RRCConnectionRequest message to the ENB (at step 2f-05). The message contains an identifier of the UE and a connection establishment cause. The ENB transmits an RRCConnectionSetup message to the UE so that the UE sets the RRC connection (at step 2f-10). The message may contain RRC connection setup information and etc. The RRC connection is also called an SRB, and is used to transmit/receive an RRC message that is a control message between the UE and the ENB.

The UE having set the RRC connection transmits an RRCConnectionSetupComplete message to the ENB (at step 2f-15). The message contains a control message SERVICE REQUEST for the UE to request a bearer setup for a specific service from an MME. The ENB transmits the SERVICE REQUEST message contained in the RRCConnectionSetupComplete message to the MME (at step 2f-20), and the MME determines whether to provide the service requested by the UE. If it is determined to provide the service requested by the UE as the result of the determination, the MME transmits an INITIAL CONTEXT SETUP REQUEST message to the ENB (at step 2f-25). The message includes QoS information to be applied during DRB setup and security related information (e.g., security key or security algorithm) to be applied to the ERB. In order to set the security with the UE, the ENB exchanges a SecurityModeCommand message at step 2f-30 and a SecurityModeComplete message at step 2f-35 with the UE. If the security setup is completed, the ENB transmits an RRCConnectionReconfiguration message to the UE (at step 2f-40). The message includes setup information of the DRB whereby user data is to be processed, and the UE sets the DRB by applying the information, and transmits an RRCConnectionReconfigurationComplete message to the ENB (at step 2f-45).

The ENB that has completed the DRB setup with the UE transmits an INITIAL CONTEXT SETUP COMPLETE message to the MME (at step 2f-50), and the MME that has received this exchanges an S1 BEARER SETUP message and an S1 BEARER SETUP RESPONSE message with an S-GW in order to set the S1 bearer (at steps 2f-055 and 2f-60). The S1 bearer is a connection for transmitting data set between the S-GW and the ENB, and corresponds to the DRB in a one-to-one manner. If the above-described steps are completed, the terminal transmits/receives data to/from the ENB through the S-GW (at steps 2f-65 and 2f-70). As described above, a general data transmission process is briefly composed of three stages of RRC connection setup, security setup, and DRB setup. Further, the ENB may transmit the RRCConnectionReconfiguration message to the UE in order to renew, add, or change the setup for a specific cause (at step 2*f*-75).

As described above, in order to switch from the RRC idle mode to the RRC connected mode, many signaling procedures are required. Accordingly, in the next-generation mobile communication system, the RRC inactive mode or the lightly-connected mode may be newly defined, and in such a new mode, the UE and the ENB store a UE context. If needed, the S1 bearer can be maintained, and, thus, the access can be made more rapidly with a small number of signaling procedures.

Figure 2G:
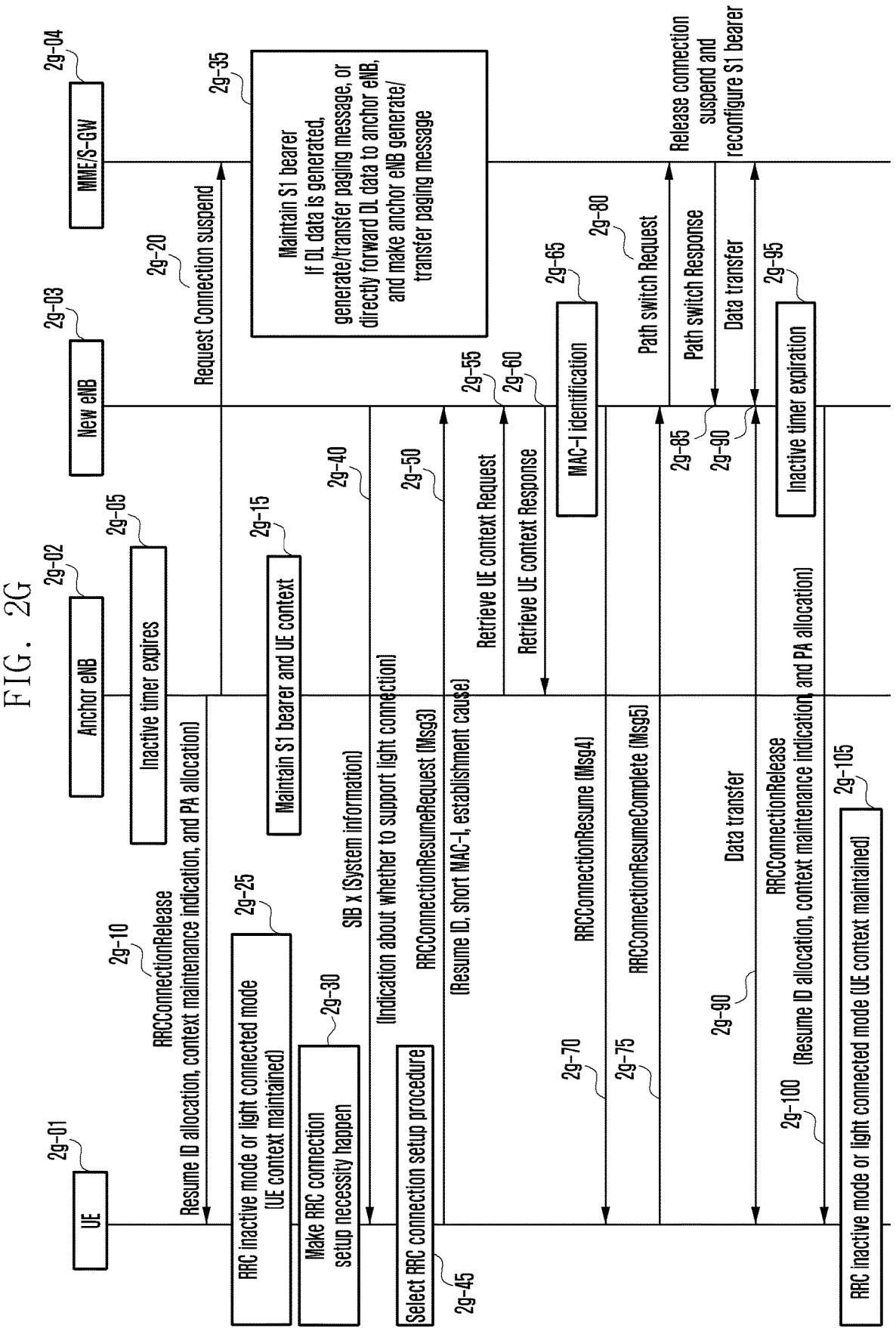
FIG. 2G is a flowchart of method of a terminal switched from an RRC connected mode to an RRC inactive mode or a lightly-connected mode and a method of the terminal switched from the RRC inactive mode or the lightly-connected mode to the RRC connected mode, according to an embodiment of the present disclosure.

FIG. 2G is a flowchart of a method a terminal switched from an RRC connected mode to an RRC inactive mode or a lightly-connected mode and a terminal switched from the RRC inactive mode or the lightly-connected mode to the RRC connected mode, according to an embodiment of the present disclosure.

An overall flow among a UE 2*g*-01, an anchor eNB 2*g*-02, a new eNB 2*g*-03, and an MME 2*g*-04 in order to perform a procedure of reusing a UE context and an S1 bearer between a UE and an eNB. The UE 2*g*-01 in an RRC connection state transmits/receives data to/from the eNB 2*g*-02. If the data transmission/reception is interrupted, the eNB 2*g*-02 operates a specific timer, and if the data transmission/reception is not resumed until the timer expires (at step 2*g*-05), the eNB 2*g*-02 considers release of the RRC connection of the UE 2*g*-01. At step 2*g*-10, in order to shift the UE 2*g*-01 to an RRC inactive state or a light connected state, the eNB 2*g*-02 may transmit an RRCConnectionSuspend message, a newly defined RRC message, or another existing reused RRC message instead of an RRCConnectionRelease message. At step 2*g*-10, the eNB 2*g*-02 may store a UE context after releasing the RRC connection of the UE 2*g*-01 in accordance with a specific rule, may allocate a resume ID while transmitting a control message indicating to release the RRC connection to the UE 2*g*-01, and may configure a paging area (PA) in which the UE 2*g*-01 is to report mobility during the light connected mode. In this case, through the resume ID allocation, the UE 2*g*-01 stores the UE context, or the eNB 2*g*-02 may include a separate context maintenance indication for indicating that the UE 2*g*-01 operates in the light connected mode and the UE context is stored in the message to be transmitted (at step 2*g*-10). The message may include security information for updating the security setup that is necessary when the UE 2*g*-01 performs an RRC connection resume procedure. For example, a NextHopChainingCount (NCC) may be pre-allocated, and using this, a new security key KeNB may be calculated and configured. The control message may include a list of cells to which a procedure of using the stored context can be applied in a period in which the eNB 2*g*-02 maintains the context or when the UE 2*g*-01 intends to reconfigure the RRC connection in an effective period.

After releasing the RRC connection of the UE 2*g*-01, the eNB 2*g*-02 maintains the UE context of the UE 2*g*-01 and the S1 bearer as they are (at step 2*g*-15). The S1 bearer calls an S1-control bearer used to transmit/receive a control message between the eNB 2*g*-02 and the MME 2*g*-04 and an S1-user plane bearer used to transmit/receive user data between the eNB 2*g*-02 and the S-GW. By maintaining the S1 bearer, a procedure for S1 bearer setup can be omitted when the UE 2*g*-01 intends to set the RRC connection in the same cell or in the same eNB 2*g*-02. If the effective period expires, the eNB 2*g*-02 may delete the UE context and may release the S1 bearer. The UE 2*g*-01 that has received the RRCConnectionRelease message at step 2*g*-10 switches to the light connected mode.

The eNB 2*g*-02 transmits a control message for requesting a connection suspend from the MME 2*g*-04 (at step 2*g*-20). If downlink data for the UE 2*g*-01 is generated, the MME 2*g*-04 that has received the control message may instruct the S-GW to request the MME 2*g*-04 to start a paging procedure without transferring the downlink data to the eNB 2*g*-02, and the S-GW may operate accordingly. If downlink data for the UE 2*g*-01 is generated, the S-GW may directly transfer the downlink data to the eNB 2*g*-02, and the eNB 2*g*-02 may generate and transfer a paging message to a neighboring eNB (at step 2*g*-35). That is, the eNB 2*g*-02 that has received the downlink data stores the data in a buffer and proceeds with a paging procedure. The eNB 2*g*-02 calls an eNB that maintains the UE context of the UE and an S1-U bearer.

The UE 2*g*-01 that has received the RRCConnectionRelease message at step 2*g*-10 including information indicating context maintenance and a resume ID may release the RRC connection, but may operate the timer corresponding to an effective period, record an effective cell list in a memory, maintain the current UE context in the memory without deleting the same (at step 2*g*-25), and be shifted to the light connected mode. The UE context as described above includes various kinds of information related to the RRC setup of the UE 2*g*-01, and includes SRB setup information, DRB setup information, and security key information. Thereafter, the RRC connection is set (at step 2*g*-30). The UE 2*g*-01 to which the resume ID was not allocated in the previous RRC connection release process or for which context maintenance has not been indicated may perform the general RRC connection setup process, as described above with reference to FIG. 2F, whereas the light-connected mode UE 2*g*-01 to which the resume ID was allocated in the previous RRC connection release process may attempt an RRC connection resume process using the stored UE context. The light-connected mode UE 2*g*-01 may perform the general RRC connection setup process (FIG. 2F) or may perform the RRC connection resume process using the stored UE context depending on whether the light connection of the network is supported.

Each eNB 2*g*-02 or the new eNB 2*g*-03 or each cell may include an indication indicating whether the eNB 2*g*-02 or the new eNB 2*g*-03 or the cell supports the light connection in system information to be transmitted. The indication may be included in the second block Systeminformation of the system information, and may be included in blocks Systeminformation of other system information. Support of the light connection as described above may include the corresponding eNB or corresponding cell that can set and support the steps 2*g*-50, 2*g*-55, 2*g*-60, 2*g*-65, 2*g*-70, 2*g*-75, 2*g*-80, 2*g*-85, and 2*g*-90. If RRC connection needs to be set, the light-connected mode UE 2*g*-01 acquires the system information of the cell that is currently in a camp-on state. If the system information does not include the indication indicating that the new eNB 2*g*-03 or cell supports the light connection, the UE 2*g*-01 may perform the general RRC connection setup process as described above with reference to FIG. 2F (at step 2*g*-45). However, if the system information includes the indication indicating that the new eNB 2*g*-03 or cell supports the light connection, the UE 2*g*-01 may perform the RRC connection resume process using the stored UE context (at step 2*g*-45). The RRC connection resume process using the stored UE context is as follows.

First, the UE 2g-01 transmits a preamble on message 1 in order to perform a random access procedure. If resource allocation is possible in accordance with the preamble received on message 1, the new eNB 2g-03 allocates a corresponding uplink resource to the UE 2g-01 on a message 2. The UE 2g-01 transmits a resume request message including a resume ID received at step 2g-10 based on the received uplink resource information (at step 2g-50). The message may be a modified message of the RRCConnectionRequest message or a newly defined message (e.g., RRCConnectionResumeRequest message). If the UE 2g-01 that is in the light-connected mode through connection release by the eNB 2g-02 moves to be in the camp-on state in the cell of another eNB, the new eNB 2g-03 may know from what eNB the corresponding UE 2g-01 previously received the service through reception and identification of the resume ID of the UE 2g-01.

If the new eNB 2g-03 has successfully received and identified the resume ID, it performs a context retrieve procedure for retrieving the UE context from the eNB 2g-02 (at steps 2g-55 and 2g-60). If the UE context retrieve procedure has failed, for example, if an anchor/source eNB cannot be found or if the UE context does not exist, the new eNB 2g-03 may transmit the RRCConnectionSetup message of FIG. 2F instead of the RRCConnectionResume message, and may fall back on the RRC connection setup procedure of FIG. 2F instead of the subsequent bearer setup procedure/security setup procedure. The new eNB 2g-03 may bring the UE context from the eNB 2g-02 through an S1 or X2 interface. When the new eNB has received the resume ID, but has not successfully discriminated the UE 2g-01 for a specific cause, it may transmit the RRCConnectionSetup message to the UE 2g-01 to fall back on the general RRC connection setup procedure of FIG. 2F. That is, the eNB 2g-02 may transmit the RRCConnectionSetup message to the UE 2g-01, and the UE 2g-01 that has received the RRCConnectionSetup message may transmit an RRCConnectionSetupComplete message to the new eNB 2g-03 to perform the connection setup. Further, if the new eNB 2g-03 has received the resume ID, but has not successfully discriminated the UE 2g-01 (e.g., retrieval of the UE context from the eNB 2g-02 has failed), it may transmit an RRCConnectionRelease message or an RRCConnectionReject message to the UE 2g-01 to reject the connection of the UE 2g-01, and may again attempt to start the general RRC connection setup procedure of FIG. 2F.

The new eNB 2g-03 identifies MAC-I based on the retrieved UE context (at step 2g-65). The MAC-I is a message authentication code calculated by the UE 2g-01 with respect to the control message through application of the security information of the restored UE context, that is, through application of a security key and a security counter. The new eNB 2g-03 identifies integrity of the message using the MAC-I of the message and the security key and the security counter stored in the UE context. Further, the new eNB 2g-03 determines the setup to be applied to the RRC connection of the UE 2g-01, and transmits the RRCConnectionResume message containing the setup information to the UE 2g-01 (at step 2g-70). The new eNB 2g-03 may identify the resume ID of the UE 2g-01 and may cipher the RRCConnectionResume message using a new security key KeNB to transmit the ciphered RRCConnectionResume message, and the UE 2g-01 may normally receive the RRCConnectionResume message through ciphering of the RRCConnectionResume message using the new security key KeNB calculated using the NCC pre-allocated at step 2g-10. After transmitting the RRCConnectionResume message, the RRC message and data may be ciphered by the new security key, and may be transmitted and received by the UE 2g-01 and the new eNB 2g-03. The RRCConnectionResume message may be a control message obtained by including information (REUSE INDICATOR) indicating RRC context reuse in the general RRC connection request message. The RRCConnectionResume message includes various kinds of information related to the RRC connection setup of the UE in the same manner as the RRCConnectionSetup message.

If the UE 2g-01 receives the general RRCConnectionSetup message, it sets the RRC connection based on the setup information indicated in the RRCConnectionSetup message, whereas if the UE 2g-01 receives the RRCConnectionResume message, it sets the RRC connection (delta configuration) in consideration of both the stored setup information and the setup information indicated in the control message. The UE 2g-01 may determine the setup information to be applied by determining the indicated setup information as delta information for the stored setup information, and may update the setup information or the UE context. If SRB setup information is included in the RRCConnectionResume message, the UE 2g-01 configures the SRB through application of the indicated SRB setup information, whereas if the SRB setup information is not included in the RRCConnectionResume message, the UE configures the SRB through application of the SRB setup information stored in the UE context.

The UE 2g-01 configures the RRC connection by applying the updated UE context and setup information, and transmit an RRCConnectionResumeComplete message to the new eNB 2g-03 (at step 2g-75). Further, the new eNB 2g-03 transmits a control message for requesting a connection suspend release to the MME 2g-04, and requests the MME 2g-04 to reconfigure the S1 bearer to the new eNB 2g-03 (at steps 2g-80 and 2g-85). If the above-described message is received, the MME 2g-04 requests the S-GW to reconfigure the S1 bearer to the new eNB 2g-03, and indicates to normally process the data for the UE 2g-01. If the above-described process is completed, the UE 2g-01 resumes data transmission/reception in the cell of the new eNB 2g-03 (at step 2g-90).

In the above-described procedure, if the existing anchor eNB 2g-02 releases the connection and the UE 2g-01 that is in the light-connected mode does not move greatly to be again in the camp-on state in the cell of the existing eNB 2g-02, the eNB 2g-02 may perform only the connection suspend release of the S1 bearer instead of the procedures at steps 2g-80 and 2g-85 without performing steps 2g-55 and 2g-60, search for the UE context of the UE 2g-01 with reference to the resume ID indicated in message3, and based on this, reconfigure the connection in a method similar to the above-described procedures.

If the data transmission/reception is interrupted, the new eNB 2g-03 operates a specific timer, and if the data transmission/reception is not resumed until the timer expires (at step 2g-95), the new eNB 2g-03 considers release of the RRC connection of the UE 2g-01. At step 2g-100, in order to shift the UE 2g-01 to the RRC inactive state or the light connected state, the eNB 2g-02 may transmit an RRCConnectionSuspend message, a newly defined RRC message, or another existing reused RRC message instead of the RRCConnectionRelease message. At step 2g-100, the new eNB 2g-03 may store the UE context after releasing the RRC connection of the UE 2g-01 in accordance with a specific rule, may allocate the resume ID while transmitting the control message indicating to release the RRC connection to the UE 2g-01, and may configure a PA in which the UE 2g-01 is to report mobility during the light-connected mode (at step 2g-100). If the UE 2g-01 in the light-connected mode (at step 2g-105) deviates from the configured paging area, it perform a paging area updating procedure.

Figure 2H:
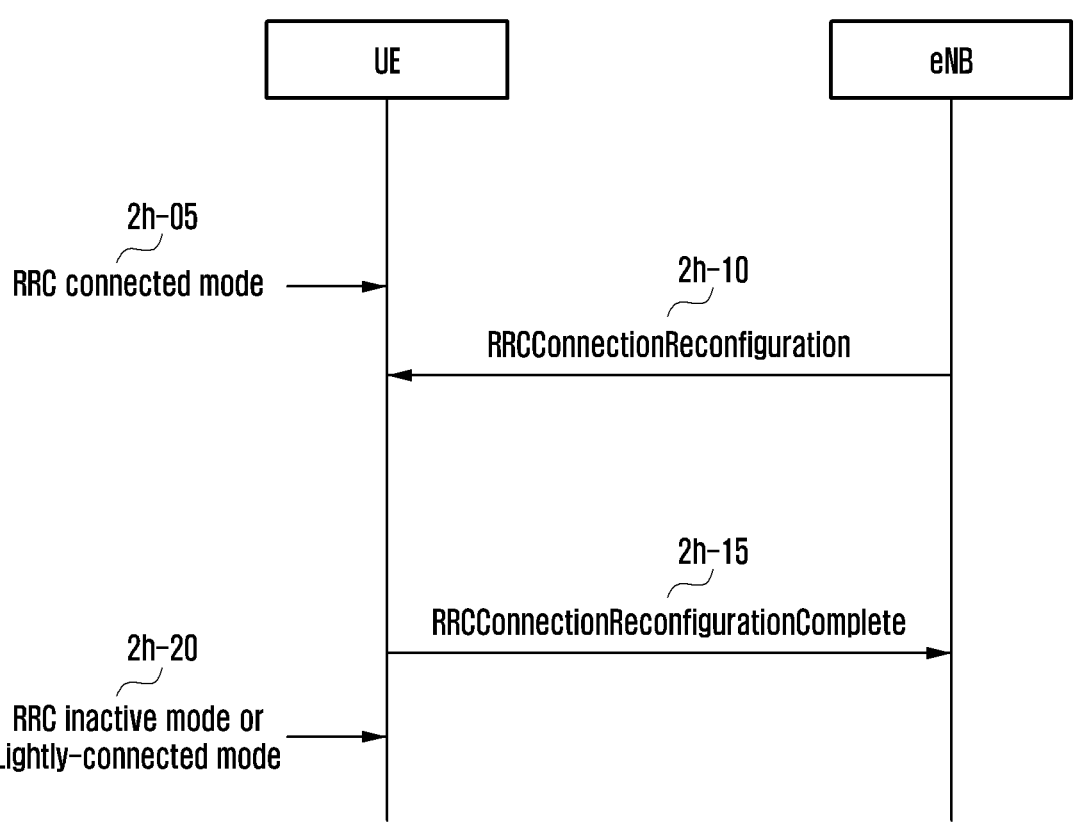
FIG. 2H is a flowchart of a method for switching a terminal from an RRC connected mode to an RRC inactive mode (or lightly-connected mode), according to an embodiment of the present disclosure.

FIG. 2H is a flowchart of a method for switching a terminal from an RRC connected mode to an RRC inactive mode (or lightly-connected mode), according to an embodiment of the present disclosure.

Referring to FIG. 2H, it may be necessary for an eNB to shift the UE in an RRC connected mode (at step 2h-05) to an RRC inactive mode e.g., expiration of a specific timer. That is, data transmission/reception may not be performed for a specific time. In order to shift the UE from the RRC connected mode to the RRC inactive mode, the eNB may transmit an RRCConnectionReconfiguration message (at step 2h-10). The message may contain information (or indication) for shifting the UE from the RRC connected mode to the RRC inactive mode. If the message is received, the UE may transmit an RRCConnectionReconfiguration-Complete message in response to the received message (at step 2h-15), and may be switched to the RRC inactive mode.

Figure 2I:
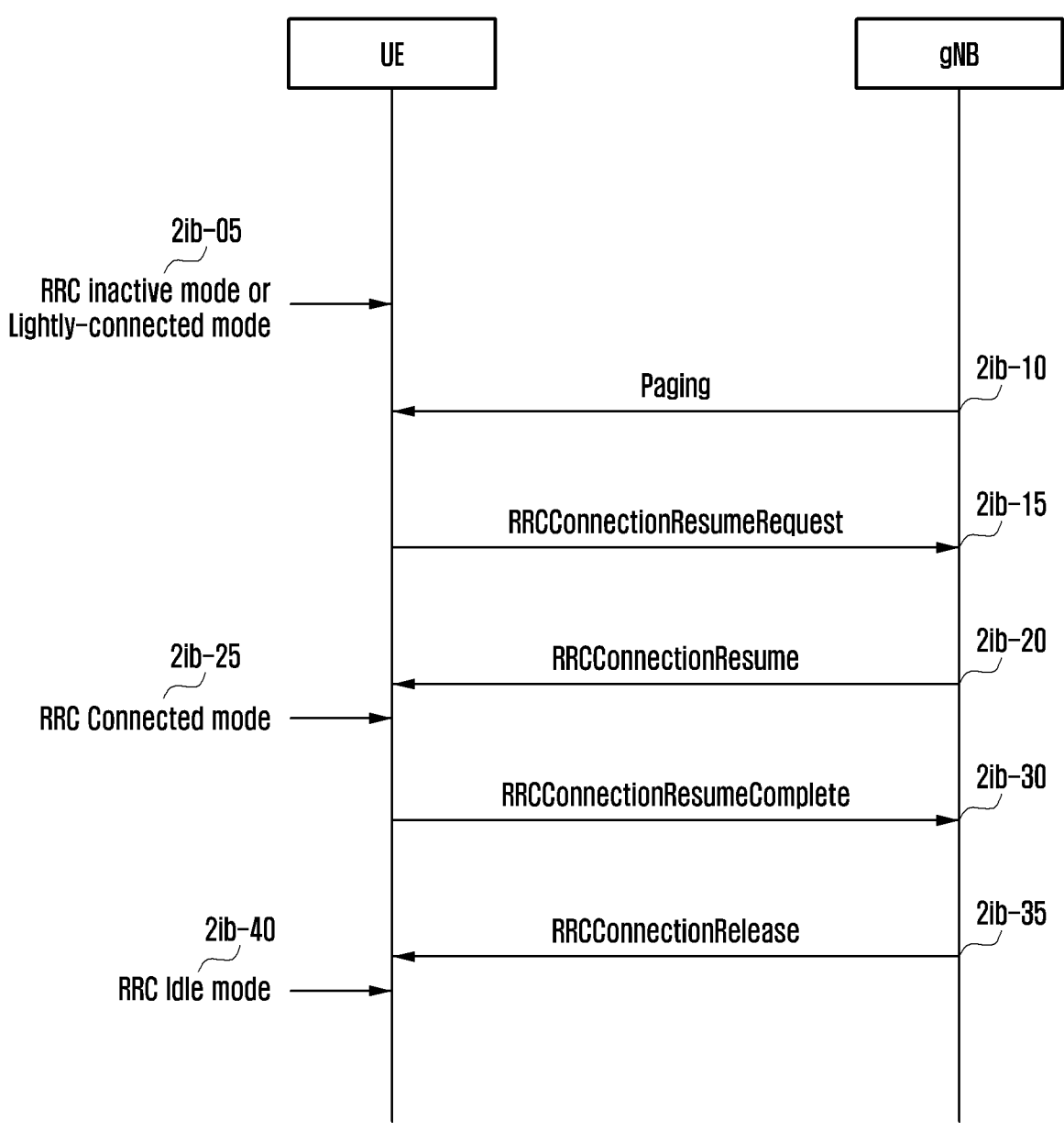
FIG. 2IA is a flowchart of a method for switching a terminal from an RRC inactive mode (or lightly-connected mode) to an RRC idle mode, according to an embodiment of the present disclosure.
Figure 2I:
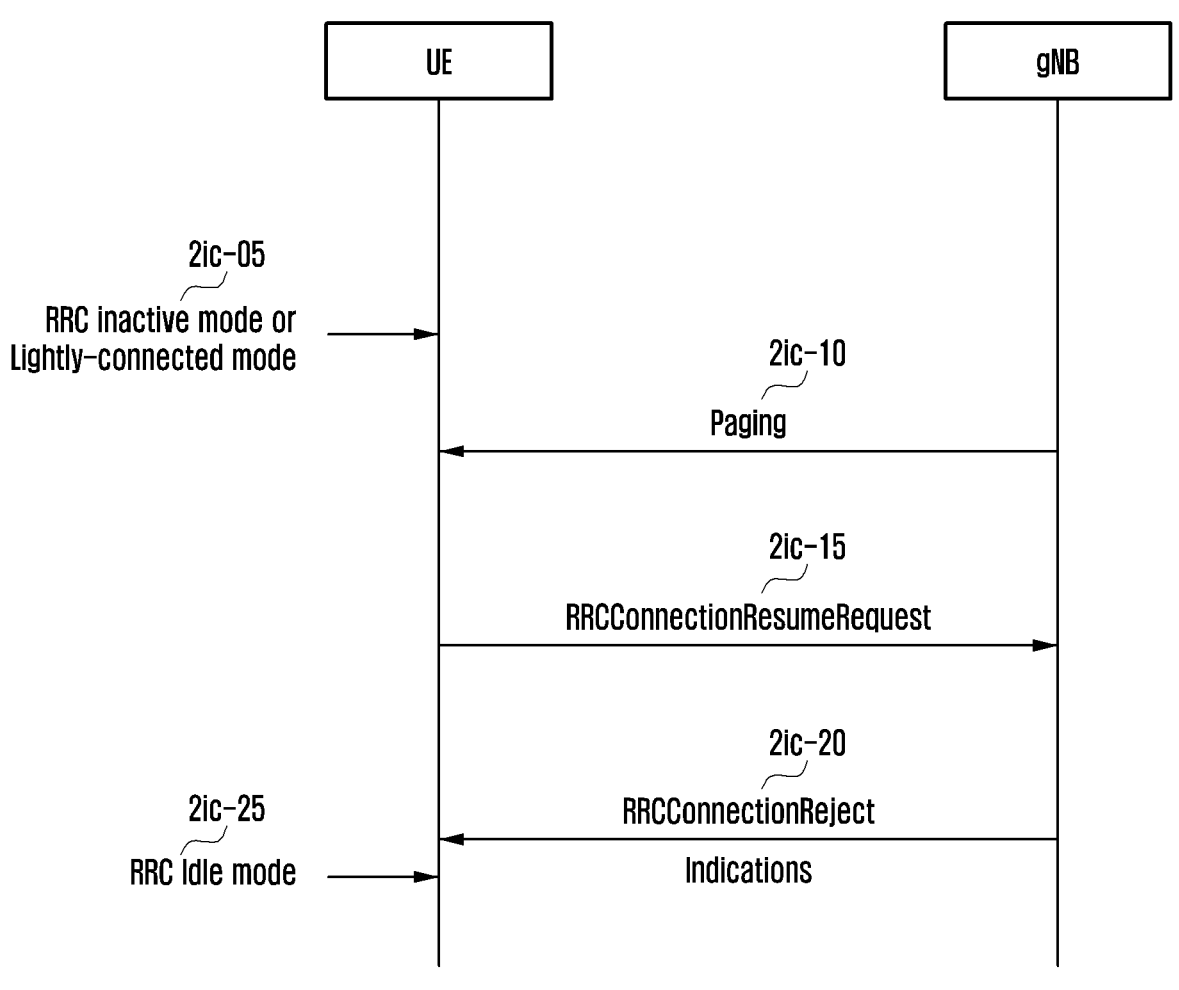
Figure 2I:
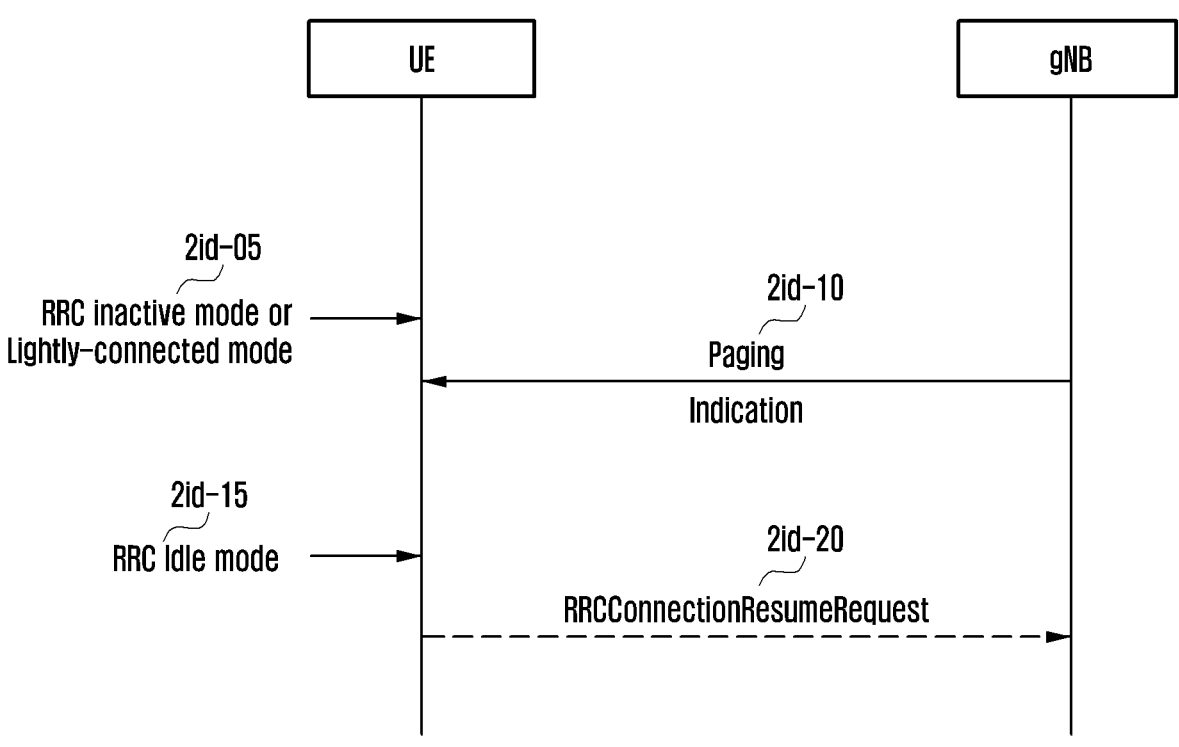

FIG. 2IA is a flowchart of a method for switching a terminal from an RRC inactive mode (or lightly-connected mode) to an RRC idle mode, according to the present disclosure.

Referring to FIG. 2IA, it may be necessary for an eNB to shift the UE in an RRC inactive mode (at step 2ia-05) to an RRC idle mode, e.g., expiration of a specific timer, or may be to reduce a signaling overhead of a network or to discard a UE context without storing the same any more in the network. In order to shift the UE from the RRC inactive mode to the RRC idle mode, the eNB may first transmit a newly defined message or a paging message for switching the mode to the UE (at step 2ia-10). The message may be transmitted from an anchor eNB or a CN. If the message is transmitted from the eNB, it may be featured to include a UE identification (e.g., resume ID) capable of discriminating the UE in the RRC inactive mode, whereas if the message is transmitted from the CN, it may be featured to include a system architecture evolution—temporary mobile subscriber identity S-TMSI or international mobile subscriber identity (IMSI). If the message is transmitted from the eNB, the UE that has received the message may transmit an RRCConnectionResumeRequest message to the eNB in response to the received message, whereas if the message is transmitted from the CN, the UE may transmit an RRCConnectionRequest message (at step 2ia-15). The eNB that has received the message may transmit an RRCConnectionRelease message to the UE in order to shift the UE to an idle state (at step 2ia-20). If the message is received, the UE is switched to the RRC idle mode (at step 2ia-25).

If it is unable to directly switch the UE in the RRC inactive mode (at step 2ia-30) from the RRC inactive mode to the RRC idle mode in the network, the eNB may identify the UE identification (resume ID) of the UE when the UE intends to perform the RRC connection resume setup procedure (at step 2ia-35), and may transmit the RRCConnectionRelease message at step 2ia-40 in order to shift the UE to the RRC idle mode. The UE that has received the message is switched to the RRC idle mode (at step 2ia-45).

FIG. 2IB is a flowchart of a method of a (2-1)-th embodiment for switching a terminal from an RRC inactive mode (or lightly-connected mode) to an RRC idle mode, according to the present disclosure.

Referring to FIG. 2IB, it may be necessary for an eNB to shift the UE in an RRC inactive mode (at step 2ib-05) to an RRC idle mode, e.g., be expiration of a specific timer, or may be to reduce a signaling overhead of a network or to discard a UE context without storing the same any more in the network. In order to shift the UE from the RRC inactive mode to the RRC idle mode, the eNB may first transmit a newly defined message or a paging message for switching the mode to the UE (at step 2ib-10). The message may be transmitted from the eNB or a CN. If the message is transmitted from the eNB, it may be featured to include a UE identification (e.g., resume ID) capable of discriminating the UE in the RRC inactive mode, whereas if the message is transmitted from the CN, it may be featured to include S-TMSI or IMSI. If the message is transmitted from the eNB, the UE that has received the message may transmit an RRCConnectionResumeRequest message to the eNB in response to the received message, whereas if the message is transmitted from the CN, the UE may transmit an RRCConnectionRequest message, and may be once shifted to the RRC connected mode (at step 2ib-15). The eNB may receive the message, and in order to switch the UE to the idle state, it may transmit an RRCConnectionResume message to the UE so as to first switch the UE to the RRC connected mode (at step 2ib-20). If the UE that has received the message is first shifted to the RRC connected mode (at step 2ib-25), and transmits an RRCConnectionResumeComplete message to the eNB (at step 2ib-30). If the eNB receives the message, it transmits the RRCConnectionRelease message to the UE (at step 2ib-35) to switch the UE to the RRC idle mode (at step 2ib-40).

FIG. 2IC is a flowchart of a method of a (2-2)-th embodiment for switching a terminal from an RRC inactive mode (or lightly-connected mode) to an RRC idle mode, according to an embodiment of the present disclosure.

Referring to FIG. 2IC, it may be necessary for an eNB to shift the UE in an RRC inactive mode (at step 2ic-05) to an RRC idle mode, e.g., expiration of a specific timer, or may be to reduce a signaling overhead of a network or to discard a UE context without storing the same any more in the network. In order to shift the UE from the RRC inactive mode to the RRC idle mode, the eNB may first transmit a newly defined message or a paging message for switching the mode to the UE (at step 2ic-10). The message may be transmitted from the eNB or a CN. If the message is transmitted from the eNB, it may be featured to include a UE identification (e.g., resume ID) capable of discriminating the UE in the RRC inactive mode, whereas if the message is transmitted from the CN, it may be featured to include S-TMSI or IMSI. If the message is transmitted from the eNB, the UE that has received the message may transmit an RRCConnectionResumeRequest message to the eNB in response to the received message (at step 2ic-15). The eNB may receive the message, and in order to switch the UE to the idle state, it may transmit an RRCConnectionReject message to the UE in order to first switch the UE to the idle state (at step 2ic-20). The message may include an indication indicating whether the UE continuously maintains the RRC inactive mode or suspends the RRC inactive mode and is shifted to the RRC idle state. If the message is received, the UE is switched to the RRC idle mode (at step 2ic-25).

FIG. 2ID is a flowchart of a method of a (2-3)-th embodiment for switching a terminal from an RRC inactive mode (or lightly-connected mode) to an RRC idle mode, according to the present disclosure.

Referring to FIG. 2ID, it may be necessary for an eNB to shift the UE in an RRC inactive mode (at step 2id-05) to an RRC idle mode for a specific cause. The specific cause may be expiration of a specific timer, or may be to reduce a signaling overhead of a network or to discard a UE context without storing the same any more in the network. In order to shift the UE from the RRC inactive mode to the RRC idle mode, the eNB may first transmit a newly defined message or a paging message for switching the mode to the UE (at step 2id-10). The message may be transmitted from an anchor eNB or a CN. If the message is transmitted from the eNB, it may be featured to include a UE identification (e.g., resume ID) capable of discriminating the UE in the RRC inactive mode, whereas if the message is transmitted from the CN, it may be featured to include S-TMSI or IMSI. Further, the messages may be featured to include an indication indicating that the UE mode is to be shifted from the RRC inactive mode to the RRC idle mode. If the indication indicating that the UE mode is to be shifted to the RRC idle mode is included in the messages, the UE that has received the message may be shifted to the RRC idle mode state (at step 2id-15). If the paging message is transmitted from the eNB, the UE may transmit an RRCConnectionResumeRequest message to the eNB in response to the paging message, whereas if the paging message is transmitted from the CN, the UE may transmit an RRCConnectionRequest message (at step 2id-20). In order to reduce the signaling overhead as described above, the procedure at step 2id-20 may be omitted.

When a UE is switched from an RRC inactive mode to an RRC idle mode, before being switched to the RRC inactive mode, the UE may select a public land mobile network (PLMN) through cell selection. When performing cell reselection in the selected PLMN, that is, if the UE is in a camped normally state (to search for a suitable cell), the UE maintains the RRC inactive mode, and if the UE goes to an any cell selection state (to search for an acceptable cell or to reselect the PLMN), the UE may be automatically switched to the RRC idle mode.

Methods for efficiently switching a UE mode based on a timer are now herein described. Prior to description of the above-described methods, a DRX of a UE will be first described.

Figure 2J:
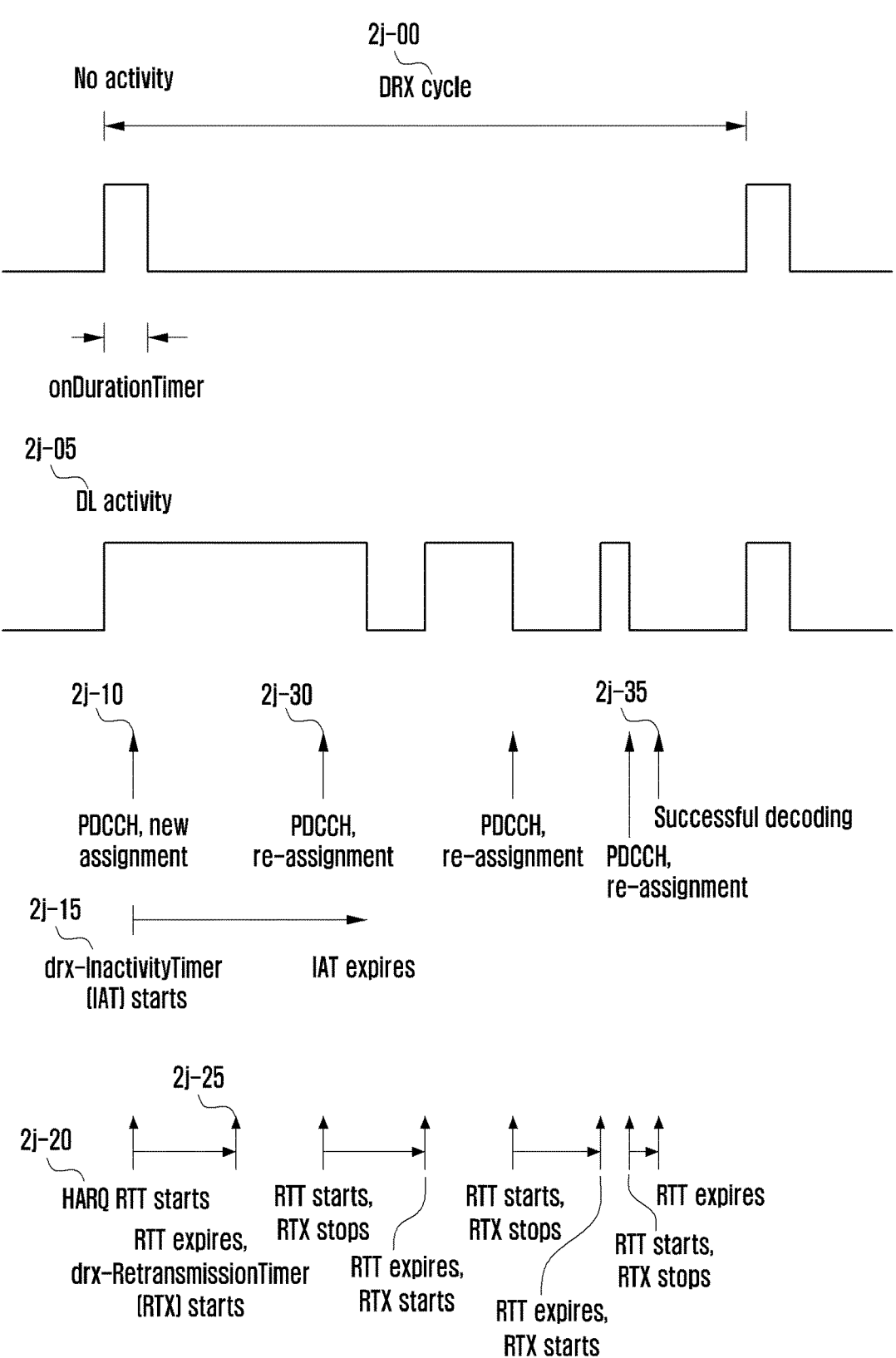
FIG. 2J is a diagram of a DRX operation of the terminal, according to an embodiment of the present disclosure.

FIG. 2J is a diagram of a DRX operation of the terminal, according to an embodiment of the present disclosure.

The DRX is applied to minimize power consumption of a UE, and is a monitoring technology only in a predetermined physical downlink control channel (PDCCH) in order to obtain scheduling information. The DRX operation can be performed in both an RRC idle mode and an RRC connected mode, and which are somewhat different from each other. In the RRC idle mode, the UE identifies existence/nonexistence of paging from an eNB through calculation of when the UE is awaken in a specific method. That is, the UE calculates a paging occasion, and goes back to an active state to identify a signal from the eNB whenever the paging occasion becomes possible. If there is no signal from the eNB, the UE goes back to the idle state again. The DRX operation of the UE in the RRC connected mode is as follows. If the UE continuously monitors a PDCCH to acquire the scheduling information, it may cause great power consumption. The basic DRX operation has a DRX period at 2j-00, and the PDCCH is monitored only for an on-duration time at 2j-05. In the connected mode, the DRX period is configured to have two values, e.g., a long DRX and a short DRX. The long DRX period is applied, and if needed, the eNB may trigger the short DRX period using a MAC CE. After a predetermined time elapses, the UE is changed from the short DRX period to the long DRX period. Initial scheduling information of a specific UE is provided only on the PDCCH. Accordingly, the UE periodically monitors only the PDCCH, and, thus, power consumption can be minimized.

If scheduling information on a new packet is received on the PDCCH for the on-duration time at 2j-05 (or at 2j-10), the UE starts a DRX inactivity timer at 2j-15. The UE maintains in an active state for the DRX inactivity timer. That is, the UE continues the PDCCH monitoring. The UE also starts an HARQ RTT timer at 2j-20. The HARQ RTT timer is applied to prevent the UE from unnecessarily monitoring the PDCCH for the HARQ round trip time (RTT), and during the timer operating time, the UE is not required to perform the PDCCH monitoring. However, while the PRX inactivity timer and the HARQ RTT timer operate simultaneously, the UE continues the PDCCH monitoring based on the DRX inactivity timer. If the HARQ RTT timer expires, a DRX retransmission timer at 2j-25 starts. While the DRX retransmission timer operates, the UE should perform the PDCCH monitoring. In general, during the DRX retransmission timer operating time, the scheduling information for the HARQ retransmission is received (at 2j-30). If the scheduling information is received, the UE immediately suspends the DRX retransmission timer, and starts the HARQ RTT timer again. The above-described operation continues until the packet is successfully received (at 2j-35).

Setup information related to the DRX operation in the RRC connected mode is transferred to the UE through the RRCConnectionReconfiguration message of FIG. 2F. The on-duration timer, the DRX inactivity timer, and the DRX retransmission timer are defined by the number of PDCCH subframes. If a predetermined number of subframes that are defined as PDCCH subframes have passed after the timer starts, the timer expires. In frequency-division duplexing (FDD), all downlink subframes belong to PDCCH subframes, and in time-division duplexing TDD, downlink subframes and special subframes correspond to them. In the TDD, downlink subframes, uplink subframes, and special subframes exist in the same frequency band. Among them, the downlink subframes and the special subframes are considered as the PDCCH subframes.

The eNB may configure two kinds of states longDRX and shortDRX. The eNB may use one of two states in consideration of power preference indication information and UE mobility record information typically reported from the UE, and the characteristic of the configured DRB. Shifting between the two states is performed by transmitting whether a specific timer has expired or a specific MAC CE to the UE. Further, if needed, the eNB may make the UE immediately bring the inactive timer to an end using the MAC CE.

Figure 2K:
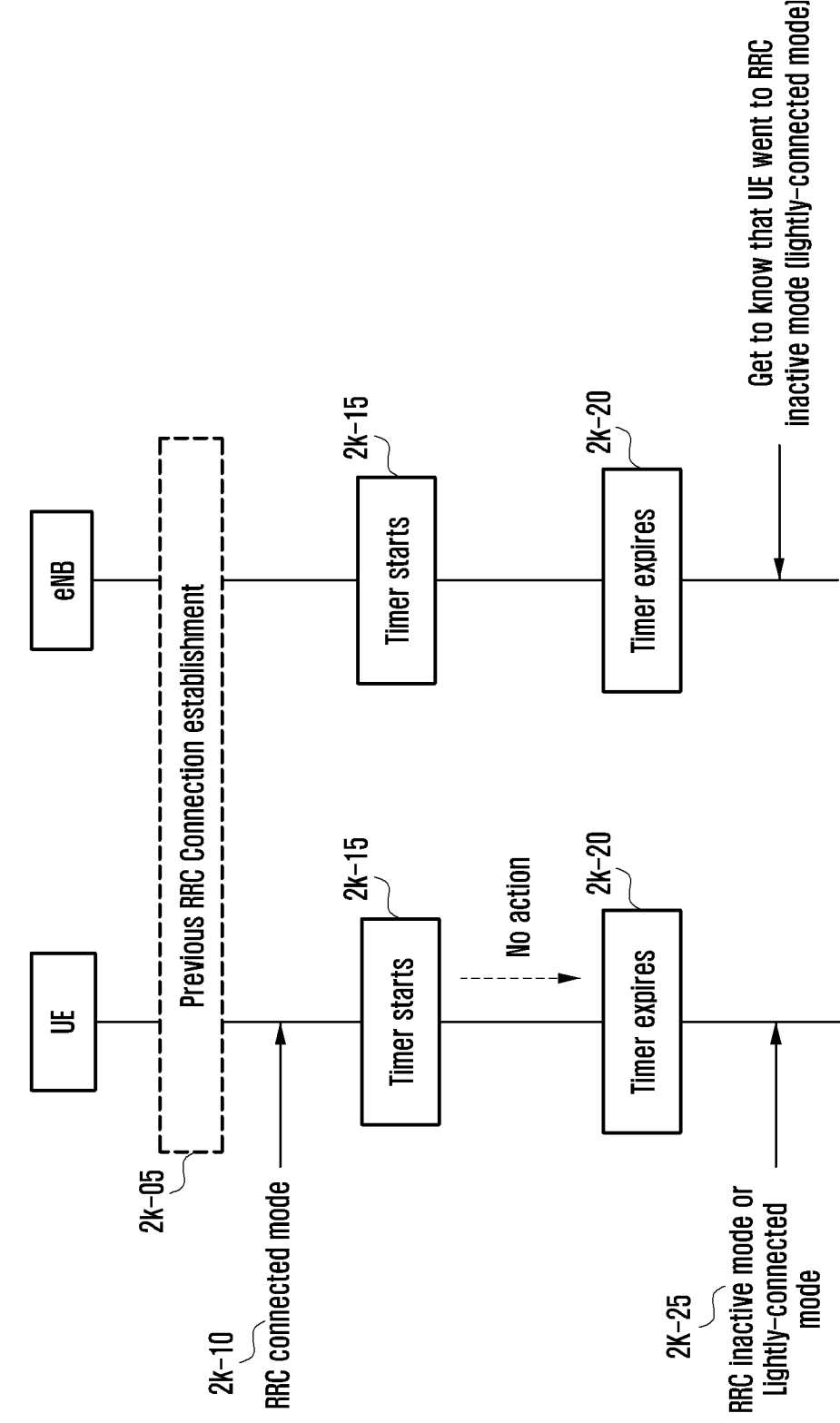
FIG. 2K is a flowchart of method for switching a terminal from an RRC connected mode to an RRC inactive mode, according to an embodiment of the present disclosure.

FIG. 2K is a flowchart of a method of a third embodiment for switching a terminal from an RRC connected mode to an RRC inactive mode, according to an embodiment the present disclosure.

Referring to FIG. 2K, a case where an eNB does not configure a DRX to a UE is considered. In such a scenario, the eNB may configure a specific timer value to the UE through an RRCConnectionSetup message or an RRCConnectionReconfiguration message in the previous RRC connection establishment at step 2k-05. The specific timer value is used for a timer used for the UE to switch the modes. The UE in the RRC connection mode (at step 2k-10) may start the timer after a specific operation (at step 2k-15). The specific operation as described above may be an operation in which the UE receives a signal from the eNB on the PDCCH or transmits data to an uplink, or an operation in which the UE receives data. If the specific operation does not occur until the timer expires (at step 2*k*-20), and the UE is switched to the RRC inactive mode (at step 2*k*-25). The eNB may determine whether the UE is switched to the RRC inactive mode by operating the timer in the same manner as the timer of the UE using the timer value configured by the eNB to the UE. The above-described procedure may be equally applied even when the UE is switched from the RRC connected mode to the RRC idle mode.

FIG. 2L is a flowchart of a method of a fourth embodiment for switching a terminal from an RRC inactive mode to an RRC idle mode, according to an embodiment of the present disclosure.

The eNB may configure a specific timer value to the UE through an RRCConnectionSetup message or an RRCConnectionReconfiguration message in the previous RRC connection establishment at step 2*l*-05. The specific timer value is used for a timer used for the UE to switch the modes. The UE in the RRC connection mode (at step 2*l*-10) may start the timer after a specific operation (at step 2*l*-15). The specific operation as described above may be an operation in which the UE receives a signal from the eNB on the PDCCH or transmits data to an uplink, an operation in which the UE receives data, or an operation in which the UE receives a paging message. If the specific operation does not occur until the timer expires (at step 2*l*-20), and the UE is switched to the RRC idle mode (at step 2*l*-25). The eNB may determine whether the UE is switched to the RRC idle mode by operating the timer in the same manner as the timer of the UE using the timer value configured by the eNB to the UE.

As described above, the eNB may configure one timer to the UE, and may make the UE use the third embodiment and the fourth embodiment when switching the respective modes. Further, the eNB may configure two different timers, and may make the UE use the third embodiment and the fourth embodiment when switching the respective modes.

Figure 2M:
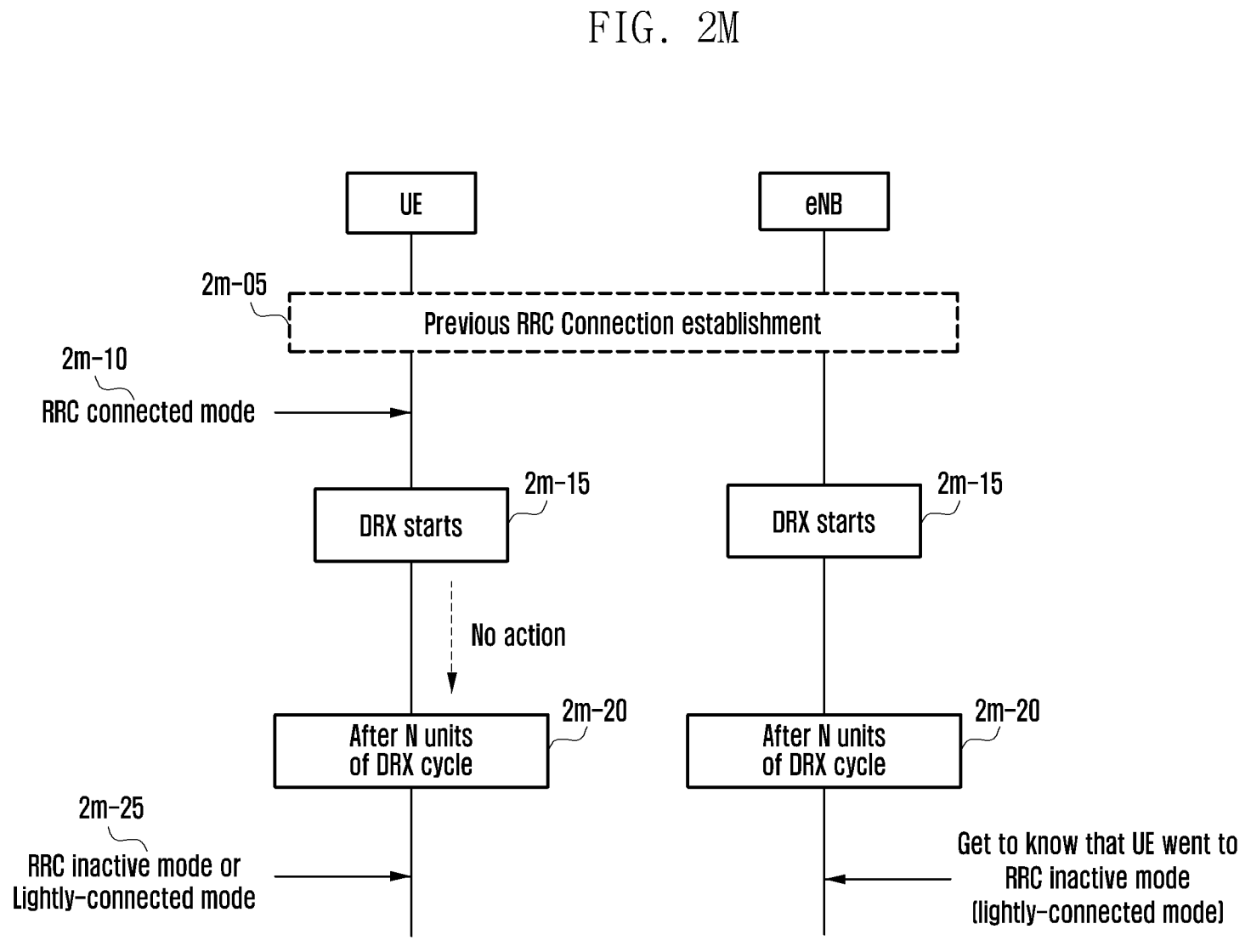

FIG. 2M is a flowchart of a method of a fifth embodiment for switching a terminal from an RRC connected mode to an RRC inactive mode, according to an embodiment of the present disclosure.

When an eNB configures a DRX to a UE, the eNB may configure a specific value to the UE through an RRCConnectionSetup message or an RRCConnectionReconfiguration message in the previous RRC connection establishment at step2*m*-05 (e.g., steps 2*f*-10, 2*f*-40, or 2*f*-75 of FIG. 2F). The specific value is used for the UE to switch the modes. The specific value may represent the number of times of DRX periods, or may be a DRX inactive timer value. The UE in the RRC connected mode (at step 2*m*-10) as described above may operate the DRX after transmitting or receiving data. If the specific value is configured as the number N of DRX periods to the UE in the previous RRC connection establishment procedure, the UE operates the DRX (at step 2*m*-15), and if the specific operation does not occur until the DRX period is completed N times (at step 2*m*-20), the UE is switched to the RRC inactive mode (at step 2*m*-25).

The specific value may be broadcasted from system information of each cell, and if the above-described value is not configured by the RRC message, the specific value broadcasted from the system information may be used as default. Thereafter, if the network configures a specific value to the UE through the RRC message (e.g., RRCConnectionReconfiguration message), the default value may be updated by the specific value. The specific operation as described above may be an operation in which the UE receives a signal from the eNB on the PDCCH or transmits data to an uplink or an operation in which the UE receives data.

The eNB may determine whether the UE is switched to the RRC inactive mode by checking the DRX operation in the same manner as that of the UE using the specific value configured by the eNB to the UE. If the specific value is configured as the DRX inactive timer value to the UE in the previous connection establishment procedure, the UE operates the DRX, and if the DRX inactive timer expires, the UE may be switched to the RRC inactive mode. In the same manner, the eNB can know that the UE has been switched to the RRC inactive mode in the next DRX period. The above-described procedure can be applied in the same manner even when the UE is switched from the RRC connected mode to the RRC idle mode.

Figure 2N:
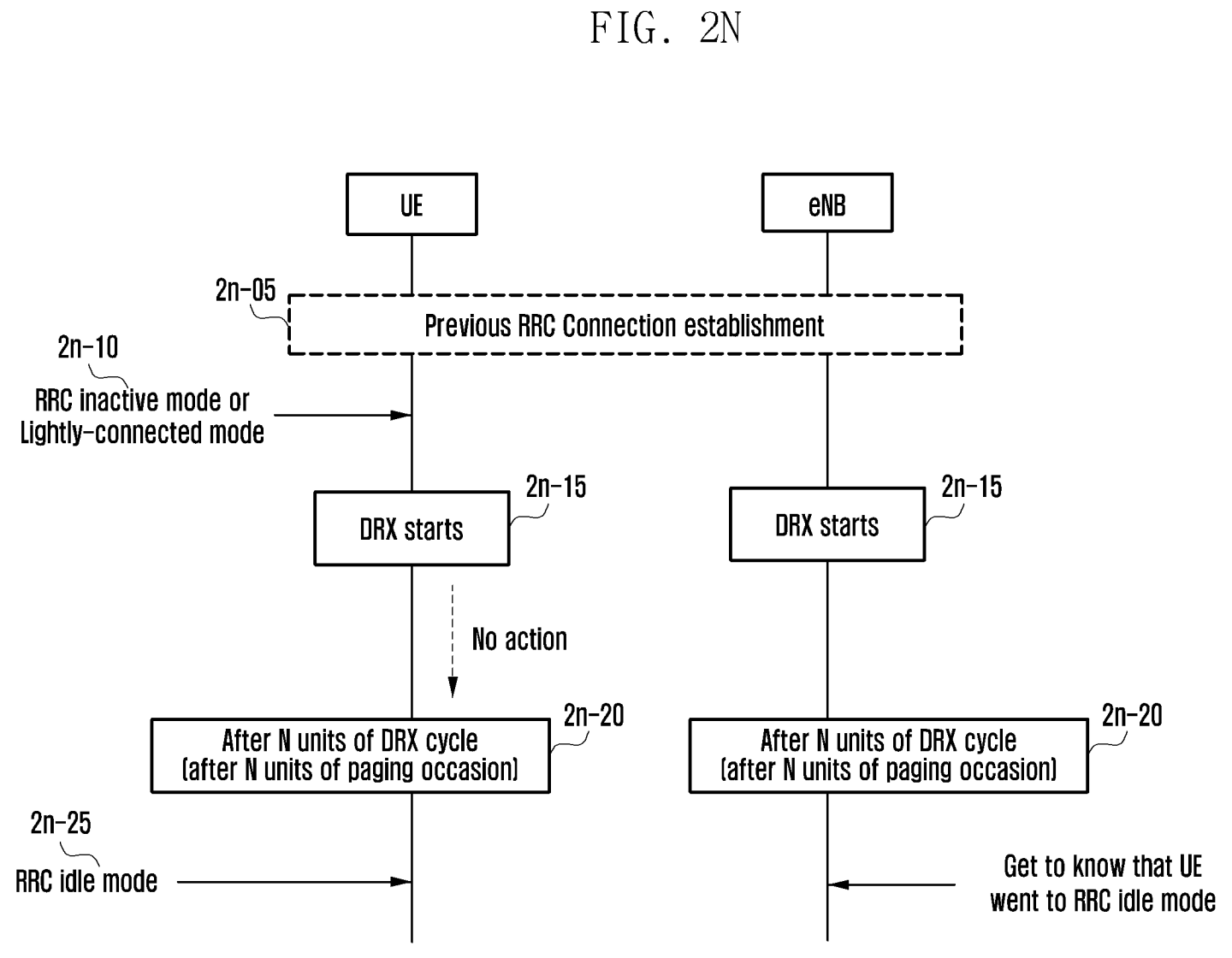

FIG. 2N is a flowchart of a method of a sixth embodiment for switching a terminal from an RRC inactive mode to an RRC idle mode, according to an embodiment of the present disclosure.

In an RRC inactive mode, UE identifies existence/non-existence of paging from an eNB through calculation of when the UE is awaken in a specific method. That is, the UE calculates a paging occasion, and goes back to an active state to identify a signal from the eNB whenever the paging occasion becomes possible. If there is no signal from the eNB, the UE goes back to the inactive state again. The eNB may configure a specific value to the UE through an RRCConnectionSetup message or an RRCConnectionReconfiguration message in the previous RRC connection establishment at step 2*n*-05 (e.g., steps 2*f*-10, 2*f*-40, or 2*f*-75 of FIG. 2F). The specific value is used for the UE to switch the modes. The specific value may represent the number of times of DRX periods.

The specific value may be broadcasted from the system information of each cell, and if the above-described value is not configured by the RRC message, the specific value broadcasted from the system information may be used as default. Thereafter, if the network configures a specific value to the UE through the RRC message (e.g., RRCConnectionReconfiguration message), the default value may be updated by the specific value. The DRX period means a period in which the paging occurs. The UE in the RRC connected mode (at step 2*n*-10) may operate the DRX after transmitting or receiving data. That is, it may be repeated that the UE calculates the paging, identifies the signal from the eNB in the active state only in case where the paging can occur, and goes back to the inactive state again. Through calculation of the paging, time measured from a time point when the paging can occur to a time point when the next paging can occur may be considered as one period.

If the specific value is configured as the number N of DRX periods to the UE in the previous RRC connection establishment procedure, the UE operates the DRX (at step 2*n*-15), and if the specific operation does not occur until the DRX period is completed N times (at step 2*n*-20) (i.e., the paging occasion time arrives N times), the UE may be switched to the RRC idle mode (at step 2*n*-25). The specific operation as described above may be an operation in which the UE receives a signal from the eNB on the PDCCH or transmits data to an uplink, or an operation in which the UE receives a paging message. The eNB may determine whether the UE is switched to the RRC idle mode by checking the DRX operation in the same manner as that of the UE using the specific value configured by the eNB to the UE.

The eNB may configure one specific value to the UE, and may make the UE use the fifth embodiment and the sixth embodiment when switching the respective modes. Further, the eNB may configure two different specific values, and may make the UE use the fifth embodiment and the sixth embodiment when switching the respective modes.

In the third, fourth, fifth, and sixth embodiments, when the eNB transmits a specific value to the UE through the RRCConnectionSetup message or the RRCConnectionRe-configuration message in the previous RRC connection establishment, it may designate the specific mode to which the UE is to be switched. The specific mode may be configured to the RRC connected mode, the RRC inactive mode, or the RRC idle mode. Accordingly, in the third, fourth, fifth, and sixth embodiments, if the specific mode is configured together with the specific value in the previous RRC connection establishment, the UE may be switched to the specific mode in case where the operation corresponding to the specific value is satisfied in accordance with the respective operations according to the third, fourth, fifth, and sixth embodiments. That is, it may be predetermined what mode the UE is to be switched to in the previous RRC connection establishment within the same operations according to the third, fourth, fifth, and sixth embodiments.

FIG. 2O is a diagram of a terminal, according to an embodiment of the present disclosure.

The UE may be switched from an RRC idle mode at 2o-01 to an RRC connected mode at 2o-03 through the procedure as described above with reference to FIG. 2F(2o-Further, the UE may be switched from the RRC connected mode at 2o-03 to the RRC idle mode at 2o-01 through application of the procedure as described above with reference to FIG. 2F (2o-05) or the first, third, or fifth embodiment. The UE may be switched from an RRC inactive mode at 2o-02 to the RRC connected mode at 2o-03 through the procedure as described above with reference to FIG. 2G (2o-10), and may be switched from the RRC connected mode at 2o-03 to the RRC inactive mode at 2o-02 through the procedure as described above with reference to FIG. 2G (2o-20) based on the first, third, or fifth embodiment. The UE may be switched from the RRC inactive mode at 2o-02 to the RRC idle mode at 2o-01 through the procedure as described above with reference to FIG. 2G (2o-25) based on the second, fourth, or sixth embodiment.

Figure 2P:
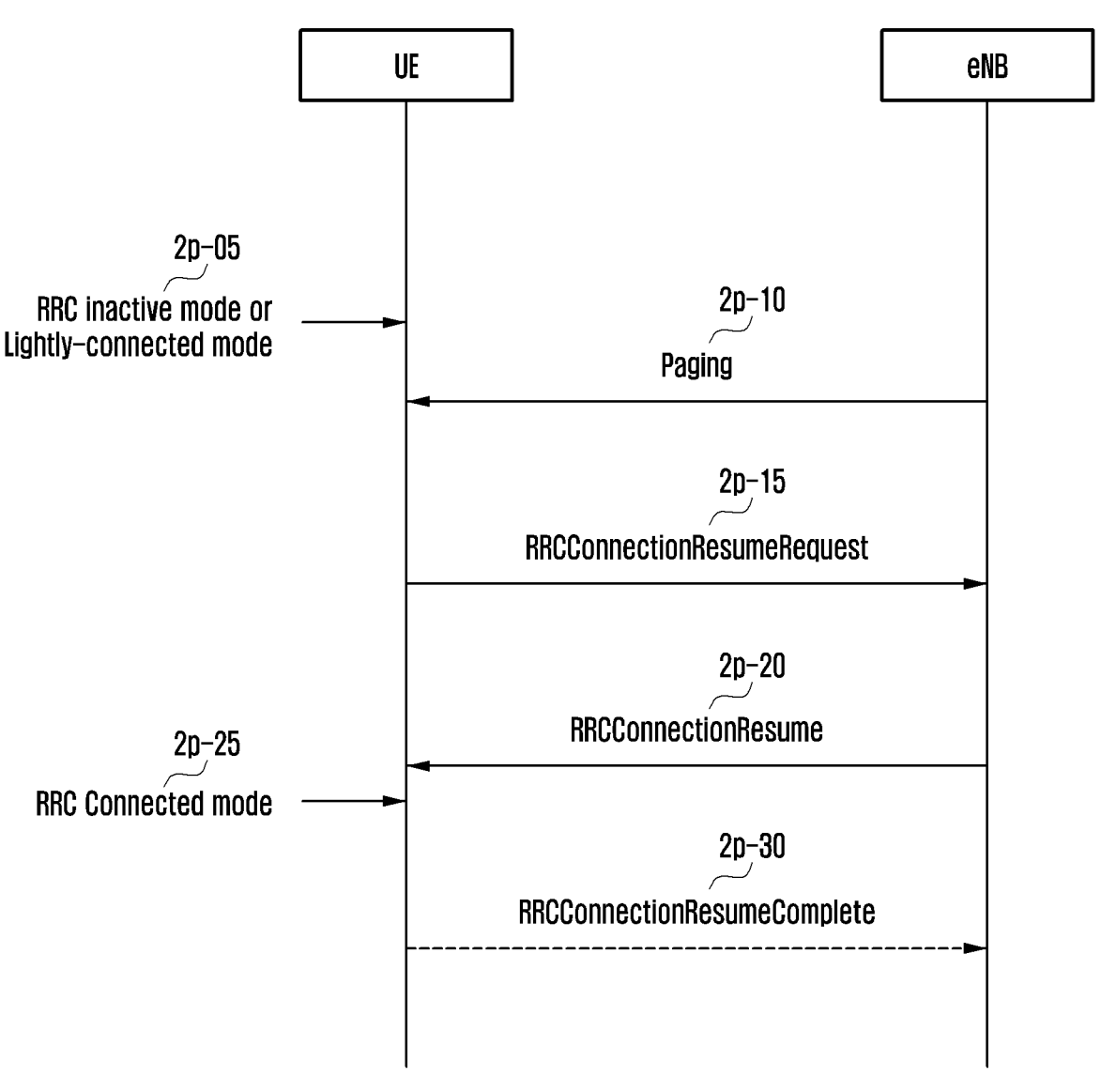
FIG. 2P is a flowchart of a method of a terminal in an RRC inactive mode shifted to an RRC connected mode if downlink data is generated in a network, according to an embodiment of the present disclosure.

FIG. 2P is a flowchart of a method of a terminal in an RRC inactive mode at step 2p-05 shifted to an RRC connected mode if downlink data is generated in a network, according to an embodiment of the present disclosure.

If downlink data for a certain UE is generated in the network, the network may transmit a paging message at step 2p-10 to the UE to notify the UE that the UE is required to be shifted to the RRC connected mode. The paging message may be transmitted from a CN or an anchor eNB. When the paging message transmitted from the CN, it may be featured to include an STMSI or an IMSI, whereas in case of the paging message transmitted from the anchor eNB, it may be featured to include a resume ID.

If the paging message includes the S-TMSI or IMSI when the UE receives the paging message, the UE may identify that the paging message has been transmitted from the CN, and may perform a procedure of shifting from an RRC idle mode state as described above with reference to FIG. 2F to an RRC connected mode (at steps 2f-05 to 2f-75). If the paging message received by the UE includes the resume ID, the UE may be shifted to the RRC connected mode in accordance with the RRC connection resume procedure as described above with reference to FIG. 2g by performing the steps 2p-15, 2p-20, 2p-25, and 2p-30. The step 2p-30 may be omitted for the purpose of reducing the signaling overhead.

Figure 2Q:
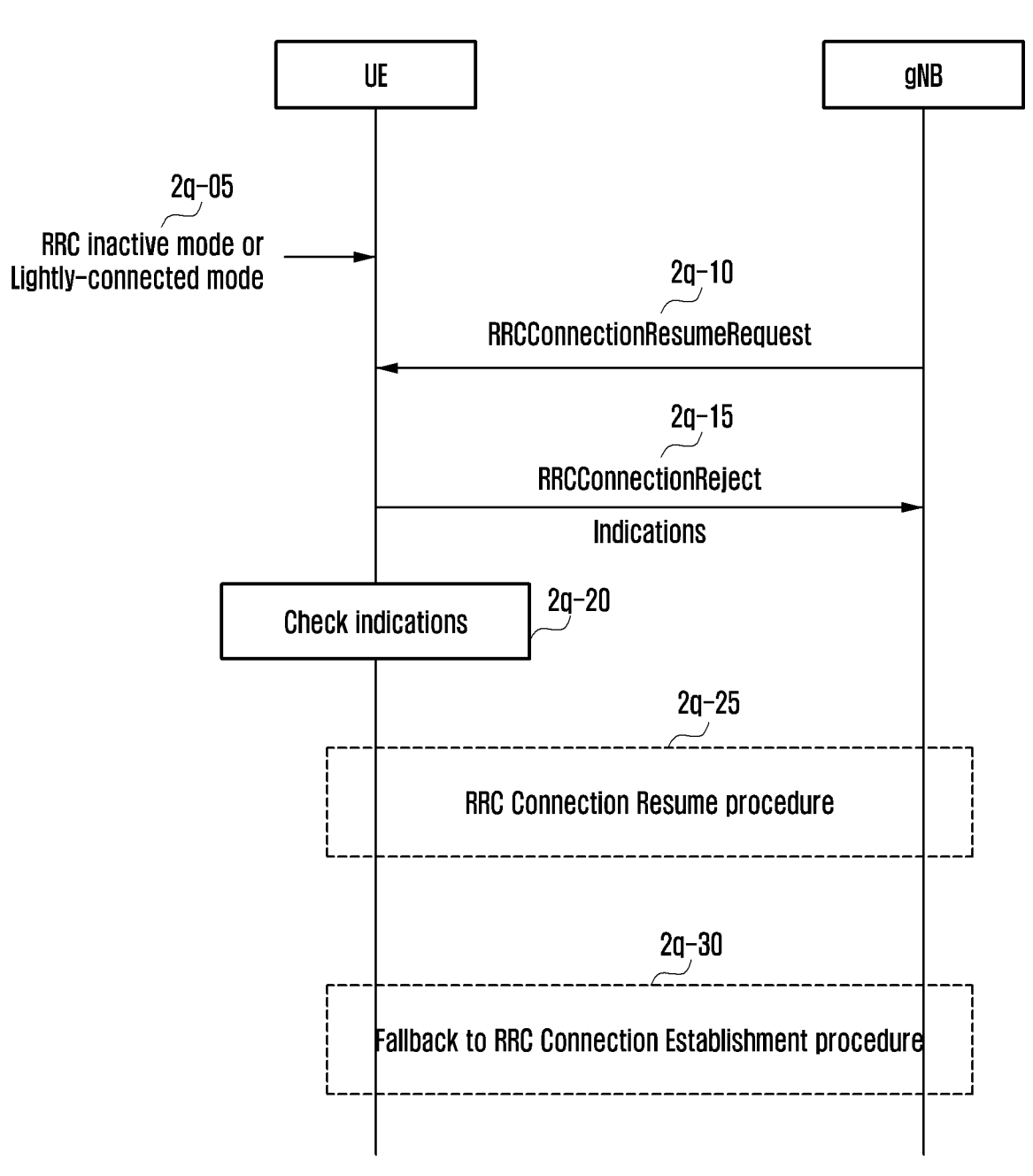
FIG. 2Q is a flowchart of a method of an access to a network in an RRC inactive mode rejected by the network, according to an embodiment of the present disclosure.

FIG. 2Q is a flowchart of a method for accessing to a network in an RRC inactive mode rejected by the network, according to an embodiment of the present disclosure.

Referring to FIG. 2Q, if uplink data occurs, if a tracking area or a RAN notification area is updated, or if a connection is set up for a specific cause, the UE in the RRC inactive mode at step 2q-05 may transmit an RRCConnectionRe-sumeRequest message to the eNB (at step 2q-10), and the eNB may transmit an RRCConnectionReject message to the UE for the specific cause (at step 2q-15). If the eNB desires that the UE is in the RRC inactive mode while maintaining the UE context in a state where transmission resources are insufficient or a big overhead occurs in the network, the eNB may indicate this using the indication. The UE may identify the indication of the eNB from the message (at step 2q-20), and may set a timer to the timer value included in the message. If the timer expires, as described above with reference to FIG. 2G, the UE may perform the RRC connection resume procedure again (at step 2q-25). However, if the UE context does not exist in the network or the RRC connection resume procedure is not supported any more, the eNB may indicate this using the indication of the RRCCo-nnectionReject message, and if the message is received, the UE may identify the indication, and may not perform the RRC connection resume procedure. After the specific timer expires, as described above with reference to FIG. 2F, the UE may fall back on the RRC connection setup procedure (at step 2q-30).

Figure 2R:
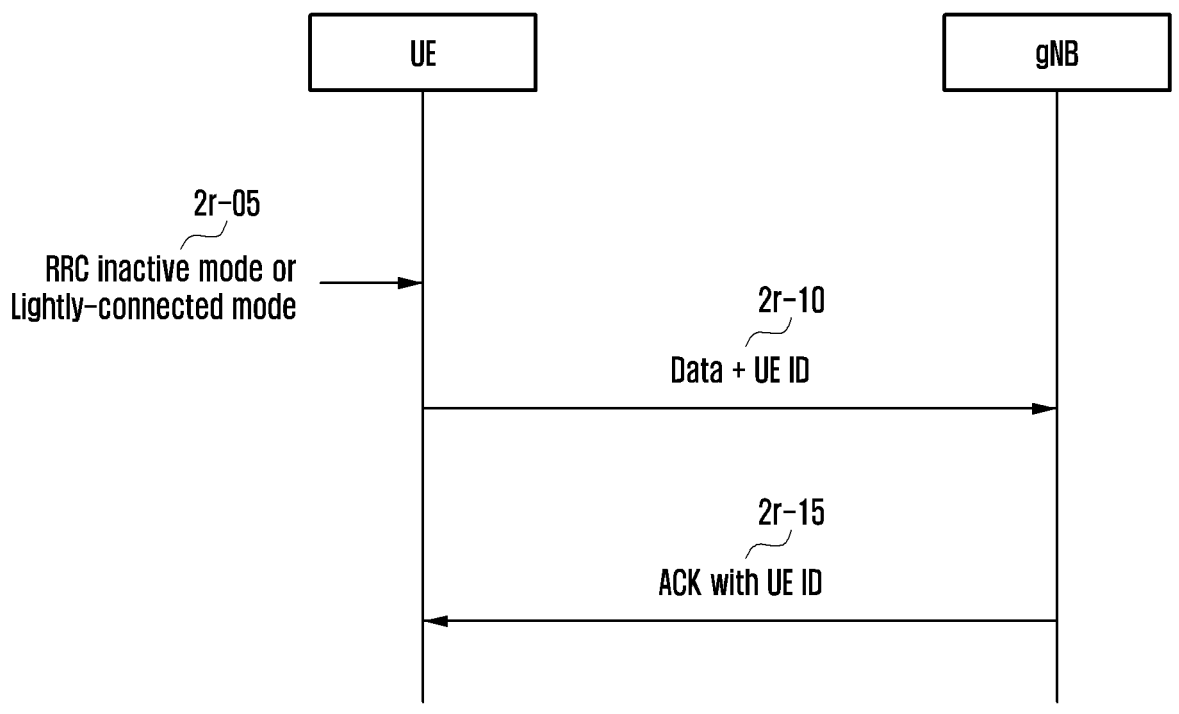
FIG. 2R is a flowchart of a method of a terminal in an RRC inactive mode not shifted to an RRC connected mode, but that transmits uplink data in the RRC inactive mode, according to an embodiment of the present disclosure.

FIG. 2R is a flowchart of a method of a terminal in an RRC inactive mode not shifted to an RRC connected mode, but transmits uplink data in the RRC inactive mode, accord-ing to an embodiment of the present disclosure.

Referring to FIG. 2R, the UE in the RRC inactive mode has a UE context, and data to be transmitted to an uplink may be generated. The UE context includes bearer setup information, such as an SRB or a DRB, and may also include setup information for a logical channel and security setup information. The UE may include the same PDCP device setup information as that used in the RRC connected state (e.g., PDCP COUNT value or PDCP sequence number). The UE may include the same RLC device setup information as that used in the RRC connected state. The UE in the RRC inactive mode may directly transmit uplink data through the network and a predetermined transmission resource without any random access procedure or connection setup procedure (at step 2r-05). The data as described above may include a UE identification (e.g., resume ID) so that the network/eNB can discriminate the UE during transmission of the data (at step 2r-If the UE has data having a size that is larger than the size of the pre-engaged transmission resource, the UE may include a buffer status report (BSR) in the data to be transmitted in order to be allocated with an additional transmission resource from the eNB. Further, the UE may include security setup information in the data to be trans-mitted.

If the data is received, the eNB identifies the identification of the UE, and transmits to the UE the UE identification together with an ACK notifying of safe receipt of the message (at step 2r-15). The transmission resource engaged between the UE and the network/eNB may not be allocated to one UE but may be allocated to and shared by several UEs. That is, the transmission resource may be occupied in a contention-based manner. Accordingly, the eNB may notify of contention resolution through transmission of the UE identification together with the ACK in the message. The message may include security setup information in the message to update the security setup of the UE. As described above, the ACK may be transmitted by an ARQ of an RLC device, an HARQ of a MAC device, the MAC CE, or the RRC message. That is, the ACK and the UE identification may be transmitted in one of the four methods in accordance with the implementation and the prescribed engagement.

The above-described procedure in which the UE in the RRC inactive mode is not shifted to the RRC connected mode, but immediately transmits the data may be determined by a specific threshold, or the eNB may make the UE immediately perform or not perform the procedure for immediately transmitting the data without the RRC connected mode shift procedure using the specific identification. That is, when the data having an amount that is smaller than the specific threshold value, the data may be directly transmitted without any procedure of shifting to the RRC connected mode as described above, whereas when the data having an amount that is larger than the specific threshold value, the data may be transmitted by shifting to the RRC connected mode through performing of the RRC connection resume procedure as described above. The specific threshold value or the identification may be set by the RRC connection setup message or the RRC connection reconfiguration message when the UE sets an initial connection as illustrated in FIG. 2G, or information on the threshold value or the indication may be broadcasted from the system information. The threshold value or the indication may be used as default, and the threshold value set by the eNB through the RRC message (or MAC CE) may be applied preferentially to the default value.

If the UE in the RRC inactive mode transmits the data in the RRC inactive mode without the procedure of shifting to the RRC connected mode as described above, the battery power consumption of the UE can be saved, and the signaling overhead of the network can be reduced.

Figure 2S:
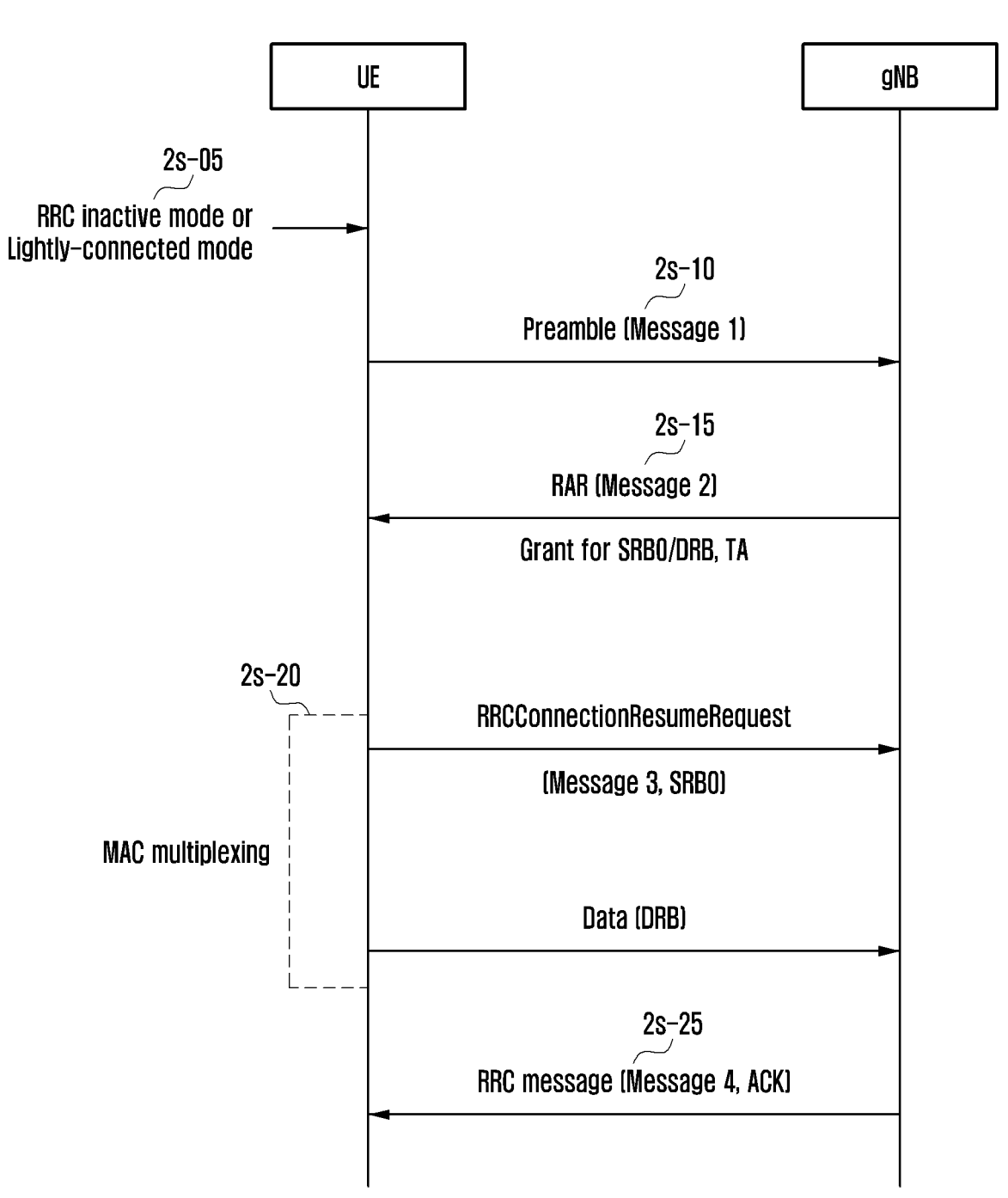
FIG. 2S is a flowchart of a method of a terminal in an RRC inactive mode not shifted to an RRC connected mode, but that transmits uplink data in the RRC inactive mode, according to an embodiment of the present disclosure.

FIG. 2S is a flowchart of a method of a terminal in an RRC inactive mode not shifted to an RRC connected mode, but transmits uplink data in the RRC inactive mode, according to an embodiment of the present disclosure.

If uplink data is generated, a UE at step 2s-05 in an RRC inactive mode may perform a random access procedure to set a connection to a network. Before transmitting the data in the RRC inactive mode, the UE may first transmit a preamble (at step 2s-10). As the preamble, one of preamble groups may be selected and transmitted. The preamble groups may be divided into several sub-groups (partitions), and the respective sub-groups may be divided in accordance with whether the UE intends to transmit a small amount of data in the RRC inactive mode, whether a large amount of transmission resource is requested, or the requested amount of transmission resource. That is, when the UE transmits the preamble belonging to a specific sub-group, the eNB may identify an intention of the UE to transmit a small amount of data in the RRC inactive state or to what intent the transmission resource is requested. The eNB that has received the preamble identifies the sub-group belonging to the preamble, and allocates timing advance (TA) and transmission resources to the UE so that the UE can match the timing in a random access response (RAR) so as to transmit the data in the RRC inactive mode (at step 2s-15).

If the RAR message is received, the UE reestablishes PDCP devices and RLC devices for SRBs/DRBs, and if there exists nexthopchainingcount (NCC) received when the UE is shifted from the RRC connected mode to the RRC inactive mode, the UE may calculate new security keys (KeNB) using the NCC, and the PDCP device may perform ciphering and integrity protection using the security keys. A MAC device and a PHY device are set based on the setup stored in the UE context. If the above-described procedure is completed, the UE generates an RRC connection resume request message (or MAC CE) to prepare transmission through the SRB (or DRB) and to prepare transmission through the DRB by processing the data. The MAC device multiplexes an RRC message to be transmitted through the SRB and data to be transmitted through the DRB to configure one MAC PDU, and transmits the MAC PDU in one TTI (at step 2s-20), After message 3 is transmitted as described above, HARQ ACK/NACK transmission may be supported. The message may include the BSR to indicate the amount of data remaining in the UE, and may include an indication indicating that the UE continuously remains in the RRC inactive mode. Further, the UE identification (resume ID) for discriminating the UE and a short MAC-I for integrity protection may be included in the message.

The eNB that has successfully received the RRC message and the data as described above may identify the UE identification (resume ID), perform retrieving of the UE context from an anchor eNB or a source eNB (eNB having the UE context), complete PDCP/RLC/MAC/PHY devices and security setup based on the UE context, notify of successful reception through transmission of the RRC message newly defined in response to the UE data and the message, or the existing RRC message (RRC connection suspend, RRC connection resume, RRC connection release, or RRC connection reject), and notify of contention resolution for the message 3. When indicating that the UE is in the inactive mode, the eNB may include an indication for this in the RRC connection resume message to be transmitted, and if it is desired to shift the UE to an idle mode, the eNB may transmit the RRC connection resume message. Further, in case of first suspending the transmission, the eNB may transmit an RRC connection suspend message, and when re-connection after interrupting the connection, the eNB may transmit the RRC connection reject message. When pre-engagement or setup, the eNB may transmit the message to the MAC CE (at step 2s-25). The ACK of the data may be performed by the ARQ of the RLC device.

If the UE in the RRC inactive mode transmits the data in the RRC inactive mode without shifting to the RRC connected mode, the battery power consumption of the UE can be saved, and the signaling overhead of the network can be reduced.

Figure 2T:
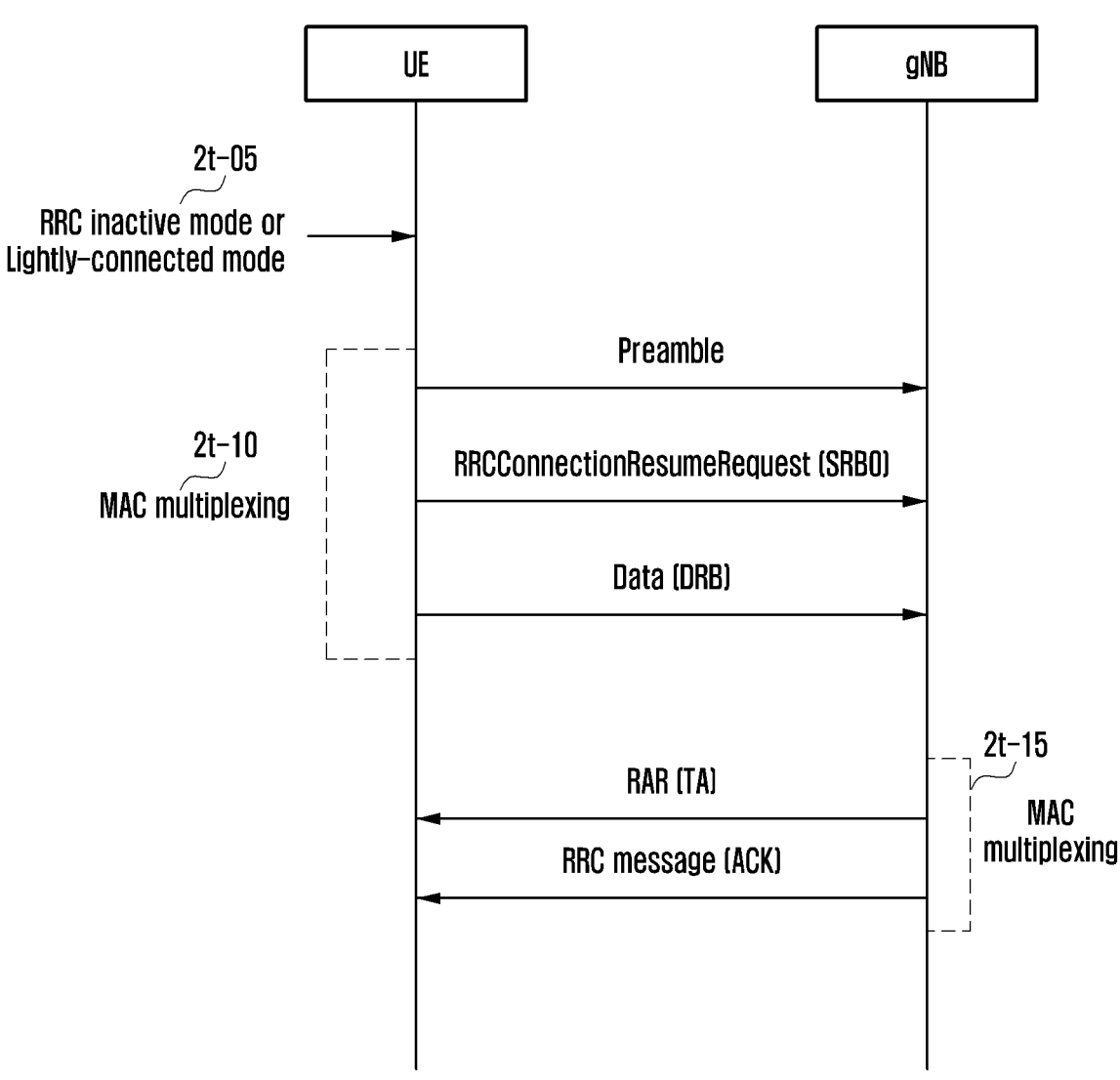
FIG. 2T is a flowchart of a method of a terminal in an RRC inactive mode not shifted to an RRC connected mode, but that transmits uplink data in the RRC inactive mode, according to an embodiment of the present disclosure.

FIG. 2T is a flowchart of a method of a terminal in an RRC inactive mode not shifted to an RRC connected mode, but transmits uplink data in the RRC inactive mode, according to an embodiment of the present disclosure.

If uplink data is generated, a UE at step 2t-05 in an RRC inactive mode may perform a random access procedure to set a connection to a network. The UE reestablishes PDCP devices and RLC devices for SRBs/DRBs using the stored UE context, and if there exists NCC received when the UE is shifted from the RRC connected mode to the RRC inactive mode, the UE may calculate new security keys (KeNB) using the NCC, and the PDCP device may perform ciphering and integrity protection using the security keys. A MAC device and a PHY device are set based on the setup stored in the UE context. After the above-described procedure, the UE may transmit a preamble, an RRC connection resume request message, and data at a time in the RRC inactive mode using a network and a pre-engaged contention based resource (at step 2t-10). That is, the MAC device multiplexes an RRC connection resume request message to be transmitted through the preamble and SRB0 and data to be transmitted through the DRB to configure one MAC PDU, and transmits the MAC PDU in one TTI at a time. If the number of resources to be transmitted by the UE is larger than the number of contention based resources, the MAC PDU may include the BSR in order to be allocated with an additional transmission resource, and may include the UE identification (resume ID) in order to identify the UE.

The eNB may identify the UE identification (resume ID), perform retrieving of the UE context from an anchor eNB or a source eNB (eNB having the UE context), complete PDCP/RLC/MAC/PHY devices and security setup based on the UE context, notify of successful reception through transmission of the RAR together with the RRC message newly defined in response to the UE data and the message, or the existing RRC message (RRC connection suspend, RRC connection resume, RRC connection release, or RRC connection reject), and notify of contention resolution at step 2*t*-15. When indicating that the UE is in the inactive mode, the eNB may include an indication for this in the RRC connection resume message to be transmitted, and if it is desired to shift the UE to an idle mode, the eNB may transmit the RRC connection resume message. When first suspending the transmission, the eNB may transmit an RRC connection suspend message, and when re-connection after interrupting the connection, the eNB may transmit the RRC connection reject message. When pre-engagement or setup, the eNB may transmit the message to the MAC CE. The ACK of the data may be performed by the ARQ of the RLC device. The MAC device of the eNB may multiplex the RAR, the RRC message, and the RLC ACK to configure one MAC PDU to be transmitted into one TTI.

If the UE in the RRC inactive mode transmits the data in the RRC inactive mode without shifting to the RRC connected mode, the battery power consumption of the UE can be saved, and the signaling overhead of the network can be reduced.

Figure 2U:
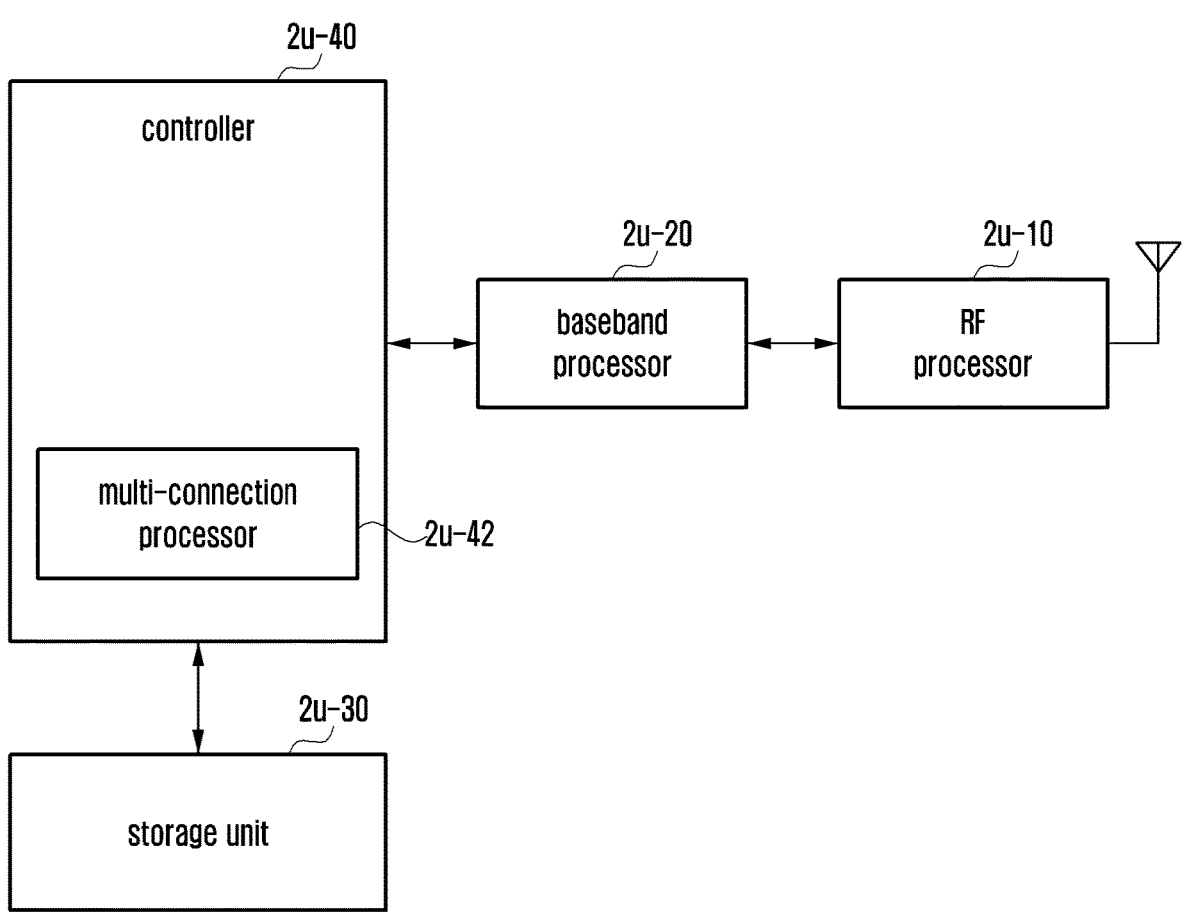
FIG. 2U is a of a terminal, according to an embodiment of the present disclosure.

FIG. 2U is a diagram of a terminal, according to an embodiment of the present disclosure.

The terminal includes an RF processor 2*u*-10, a baseband processor 2*u*-20, a storage unit 2*u*-30, and a controller 2*u*-40.

The RF processor 2*u*-10 performs transmitting and receiving a signal through a radio channel, such as signal band conversion and amplification. That is, the RF processor 2*u*-10 performs up-conversion of a baseband signal provided from the baseband processor 2*u*-20 into an RF-band signal to transmit the converted signal to an antenna, and performs down-conversion of the RF-band signal received through the antenna into a baseband signal. The RF processor 2*u*-10 may include a transmission filter, a reception filter, an amplifier, a mixer, an oscillator, a DAC, and an ADC. Although only one antenna is illustrated in the drawing, the terminal may be provided with a plurality of antennas. The RF processor 2*u*-10 may include a plurality of RF chains. The RF processor 2*u*-10 may perform beamforming, and for the beamforming, the RF processor 2*u*-10 may adjust phases and sizes of signals transmitted or received through the plurality of antennas or antenna elements. The RF processor may perform MIMO, and may receive several layers during performing of a MIMO operation. The RF processor 2*u*-10 may perform reception beam sweeping through proper configuration of the plurality of antennas or antenna elements under the control of the controller, or may control the direction and the beam width of the reception beam so that the reception beam is synchronized with the transmission beam.

The baseband processor 2*u*-20 performs conversion between a baseband signal and a bit string in accordance with the physical layer standard of the system. During data transmission, the baseband processor 2*u*-20 generates complex symbols by encoding and modulating a transmitted bit string. During data reception, the baseband processor 2*u*-20 restores a received bit string by demodulating and decoding the baseband signal provided from the RF processor 2*u*-10. For example, following an OFDM method, during data transmission, the baseband processor 2*u*-20 generates complex symbols by encoding and modulating a transmitted bit string, performs mapping of the complex symbols on subcarriers, and then configures OFDM symbols through IFFT operation and CP insertion. During data reception, the baseband processor 2*u*-20 divides the baseband signal provided from the RF processor 2*u*-10 in the unit of OFDM symbols, restores the signals mapped on the subcarriers through the FFT operation, and then restores the received bit string through demodulation and decoding.

The baseband processor 2*u*-20 and the RF processor 2*u*-10 may be called a transmitter, a receiver, a transceiver, or a communication unit. In order to support different radio connection technologies, at least one of the baseband processor 2*u*-20 and the RF processor 2*u*-10 may include a plurality of communication modules. In order to process signals of different frequency bands, at least one of the baseband processor 2*u*-20 and the RF processor 2*u*-10 may include different communication modules. The different radio connection technologies may include an LTE network and an NR network. The different frequency bands may include super high frequency (SHF) (e.g., 2.5 GHz or GHz) band and millimeter wave (mmWave) (e.g., 60 GHz) band.

The storage unit 2*u*-30 stores a basic program for an operation of the terminal, application programs, and data of setup information. The storage unit 2*u*-30 provides stored data in accordance with a request from the controller 2*u*-40.

The controller 2*u*-40 controls the terminal. The controller 2*u*-40 transmits and receives signals through the baseband processor 2*u*-20 and the RF processor 2*u*-10. Further, the controller 2*u*-40 records or reads data in or from the storage unit 2*u*-30. The controller 2*u*-40 may include at least one processor, and may include a communication processor for communication, and an AP for controlling an upper layer, such as an application program.

The controller 2*u*-40 may be configured to receive from a base station a paging message for switching the terminal in an RRC inactive mode to an RRC idle mode, to transmit an RRC message to the base station based on reception of the paging message, to receive an RRC connection release message from the base station, and to switch to the RRC idle mode based on the RRC connection release message.

Further, the base station may store a context of the terminal, and if the paging message is triggered by the base station, the paging message may include an identification for identifying the terminal in the RRC inactive mode. The RRC message may be an RRC connection resume request message.

If the paging message is transmitted from a core network node, the paging message may include at least one of an S-TMSI and an IMSI. The RRC message may be an RRC connection request message.

Figure 2V:
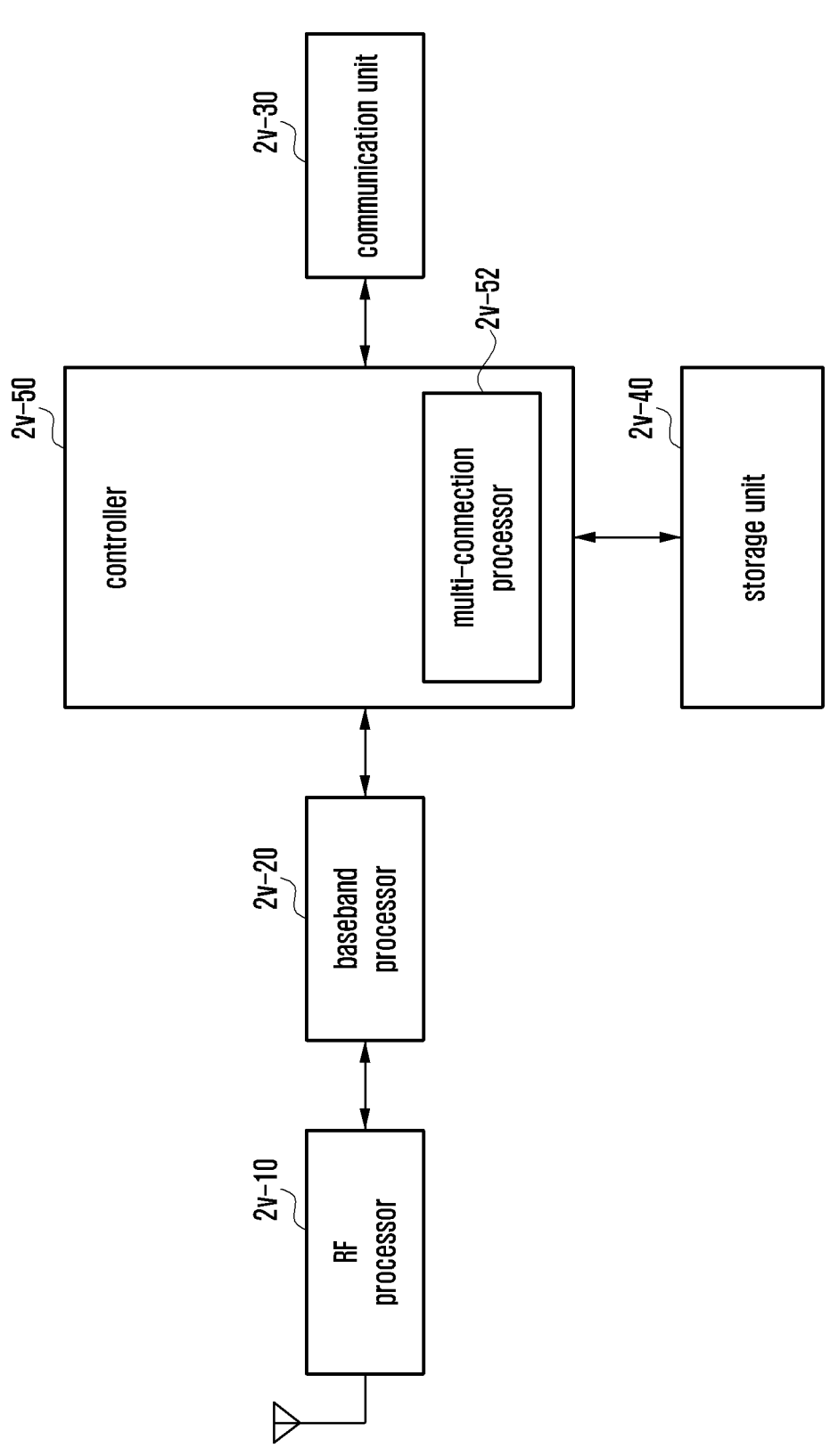
FIG. 2V is a diagram of a base station in a wireless communication system, according to an embodiment of the present disclosure.

FIG. 2V is a diagram of a base station in a wireless communication system, according to an embodiment of the present disclosure.

The base station includes an RF processor 2*v*-10, a baseband processor 2*v*-20, a backhaul communication unit 2*v*-30 (communication unit), a storage unit 2*v*-40, and a controller 2*v*-50.

The RF processor 2*v*-10 performs transmitting and receiving a signal through a radio channel, such as signal band conversion and amplification. The RF processor 2*v*-performs up-conversion of a baseband signal provided from the baseband processor 2v-20 into an RF-band signal to transmit the converted signal to an antenna, and performs down-conversion of the RF-band signal received through the antenna into a baseband signal. The RF processor 2v-10 may include a transmission filter, a reception filter, an amplifier, a mixer, an oscillator, a DAC, and an ADC. Although only one antenna is illustrated, the first connection node may be provided with a plurality of antennas. The RF processor 2v-10 may include a plurality of RF chains. The RF processor 2v-10 may perform beamforming, and for the beamforming, the RF processor 2v-10 may adjust phases and sizes of signals transmitted or received through the plurality of antennas or antenna elements. The RF processor may perform down MIMO operation through transmission of one or more layers.

The baseband processor 2v-20 performs conversion between a baseband signal and a bit string in accordance with the physical layer standard of the first radio connection technology. During data transmission, the baseband processor 2v-20 generates complex symbols by encoding and modulating a transmitted bit string. During data reception, the baseband processor 2v-20 restores a received bit string by demodulating and decoding the baseband signal provided from the RF processor 2v-10. When following an OFDM method, during data transmission, the baseband processor 2v-20 generates complex symbols by encoding and modulating a transmitted bit string, performs mapping of the complex symbols on subcarriers, and then configures OFDM symbols through the IFFT operation and CP insertion. During data reception, the baseband processor 2v-20 divides the baseband signal provided from the RF processor 2v-10 in the unit of OFDM symbols, restores the signals mapped on the subcarriers through the FFT operation, and then restores the received bit string through demodulation and decoding. The baseband processor 2v-20 and the RF processor 2v-10 may be called a transmitter, a receiver, a transceiver, or a wireless communication unit.

The communication unit 2v-30 provides an interface for performing communication with other nodes in the network.

The storage unit 2v-40 stores a basic program for an operation of the main base station, application programs, and data of setup information. The storage unit 2v-40 may store information on a bearer allocated to the connected terminal and the measurement result reported from the connected terminal. The storage unit 2v-40 may store information that becomes a basis of determination whether to provide or suspend a multi-connection to the terminal. The storage unit 2v-40 provides stored data in accordance with a request from the controller 2v-50.

The controller 2v-50 controls the main base station. The controller 2v-50 transmits and receives signals through the baseband processor 2v-20 and the RF processor 2v-10 or through the communication unit 2v-30. Further, the controller 2v-50 records or reads data in or from the storage unit 2v-40. The controller 2v-50 may include at least one processor. The controller 2v-50 may be configured to transmit to a terminal a paging message for switching the terminal in an RRC inactive mode to an RRC idle mode, to receive an RRC message from the terminal, and to transmit an RRC connection release message to the terminal based on the RRC message. The RRC connection release message may indicate switching of the terminal to the RRC idle mode.

The base station may store a context of the terminal, and if the paging message is triggered by the base station, the paging message may include an identification for identifying the terminal in the RRC inactive mode. The RRC message may be an RRC connection resume request message.

If the paging message is transmitted from a core network node, the paging message may include at least one of an S-TMSI and an IMSI. The RRC message may be an RRC connection request message.

Embodiment 3

Figure 3A:
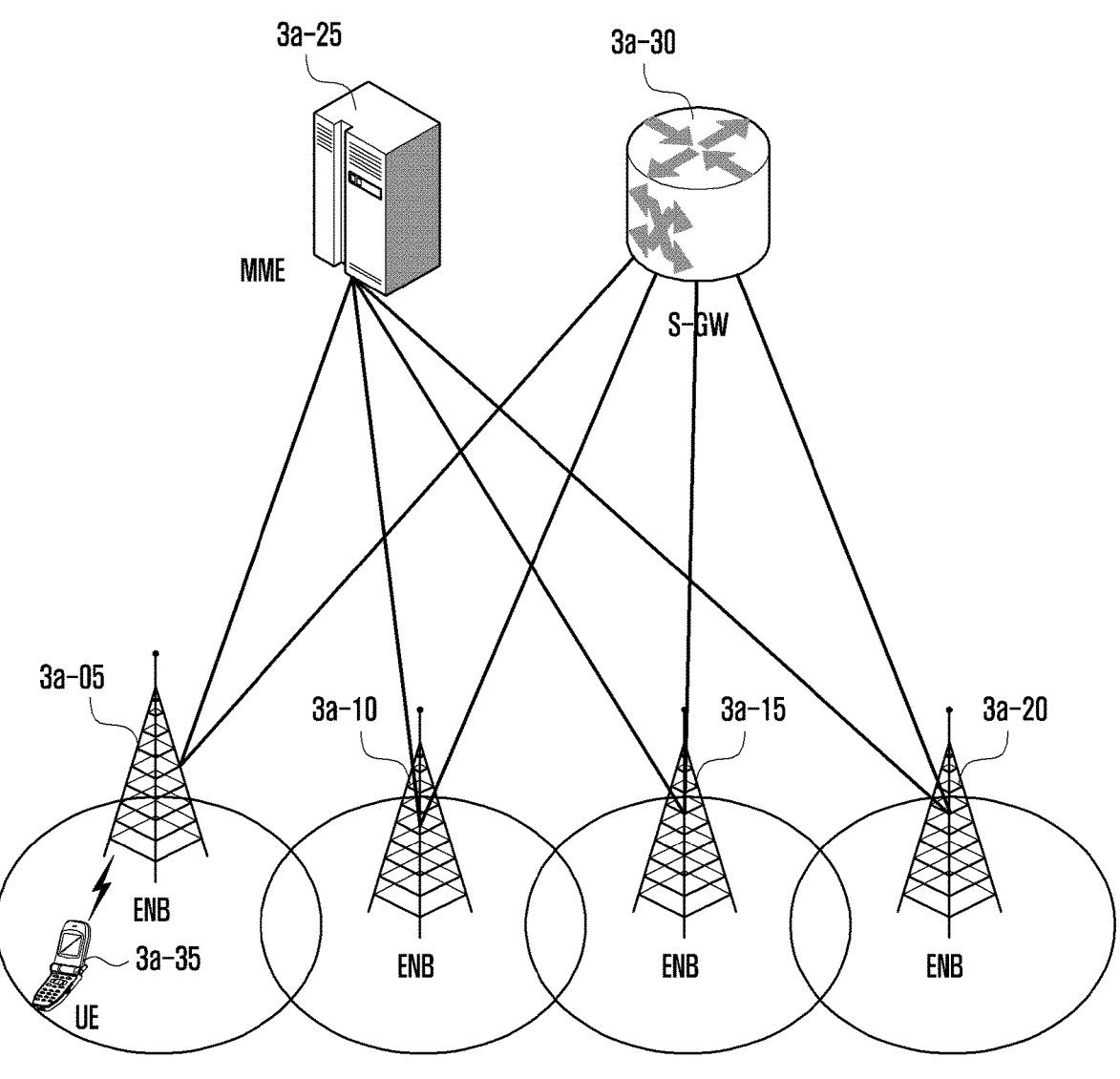
FIG. 3A is a diagram of an LTE system, according to an embodiment of the present disclosure.

FIG. 3A is a diagram of an LTE system, according to an embodiment of the present disclosure.

A RAN of an LTE system includes ENBs 3a-05, 3a-10, 3a-15, and 3a-20, an MME 3a-25, and an S-GW 3a-30. A UE 3a-35 accesses to an external network through the ENBs 3a-05, 3a-10, 3a-15, and 3a-20 and the S-GW 3a-30.

In FIG. 3A, the ENBs 3a-05, 3a-10, 3a-15, and 3a-20 correspond to an existing node B of a UMTS system. The ENB 3a-05 is connected to the UE 3a-35 on a radio channel, and plays a more complicated role than that of the existing node B. In the LTE system, since all user traffics including a real-time service, such as a VoIP through an internet protocol, are serviced on shared channels, devices performing scheduling through consolidation of state information, such as a buffer state, an available transmission power state, and a channel state of each UE, are necessary, and the ENBs 3a-05, 3a-10, 3a-15, and 3a-20 correspond to such scheduling devices. One ENB controls a plurality of cells. In order to implement a transmission speed of 100 Mbps, the LTE system uses OFDM in a bandwidth of 20 MHz as an RAT. The LTE system adopts an AMC scheme that determines a modulation scheme and a channel coding rate to match the channel state of the terminal. The S-GW 3a-30 is a device that provides a data bearer, and generates or removes the data bearer under the control of the MME 3a-25. The MME 3a-25 is a device that takes charge of not only mobility management of the UE 3a-35 but also various kinds of control functions, and is connected to the plurality of ENBs 3a-05, 3a-3a-15, and 3a-20.

Figure 3B:
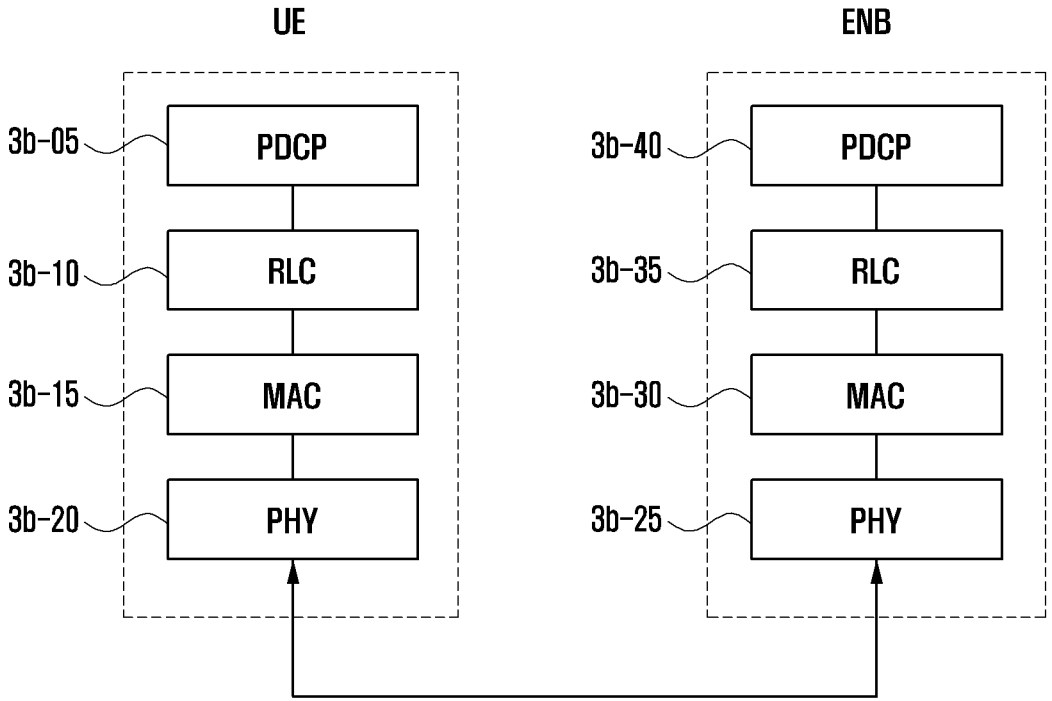
FIG. 3B is a diagram of a radio protocol structure in an LTE system, according to an embodiment of the present disclosure.

FIG. 3B is a diagram of a radio protocol structure in an existing LTE system, according to an embodiment of the present disclosure.

In a UE or an ENB, a radio protocol of an LTE system includes a PDCP 3b-05 or 3b-40, an RLC 3b-10 or 3b-35, and a MAC 3b-15 or 3b-30. The PDCP 3b-05 or 3b-40 takes charge of IP header compression/decompression operations. The main functions of the PDCP are summarized as follows:

Header compression and decompression: ROHC only;
Transfer of user data;
In-sequence delivery of upper layer PDUs at a PDCP reestablishment procedure for an RLC AM;
For split bearers in DC (only support for an RLC AM): PDCP PDU routing for transmission and PDCP PDU reordering for reception;
Duplicate detection of lower layer SDUs at a PDCP reestablishment procedure for an RLC AM;
Retransmission of PDCP SDUs at handover and, for split bearers in DC, of PDCP PDUs at a PDCP data-recovery procedure, for an RLC AM;
Ciphering and deciphering; and
Timer-based SDU discard in an uplink.

The RLC 3b-10 or 3b-35 reconfigures a PDCP PDU with a proper size and performs an ARQ operation and the like. The main functions of the RLC are summarized as follows.

Transfer of upper layer PDUs;
Error correction through an ARQ (only for AM data transfer);

Concatenation, segmentation, and reassembly of RLC SDUs (only for UM and AM data transfer);

Re-segmentation of RLC data PDUs (only for UM and AM data transfer);

Reordering of RLC data PDUs (only for UM and AM data transfer);

Duplicate detection (only for UM and AM data transfer);

Protocol error detection (only for AM data transfer);

RLC SDU discard (only for UM and AM transfer); and

RLC reestablishment.

The MAC 3*b*-15 or 3*b*-30 is connected to several RLC layer devices configured in one terminal, and performs multiplexing/demultiplexing of RLC PDUs into/from MAC PDU. The main functions of the MAC are summarized as follows:

Mapping between logical channels and transport channels;

Multiplexing/demultiplexing of MAC SDUs belonging to one or different logical channels into/from TB transferred to/from the physical layer on transport channels;

Scheduling information reporting;

Error correction through HARQ;

Priority handling between logical channels of one UE;

Priority handling between UEs by means of dynamic scheduling;

MBMS service identification;

Transport format selection; and padding.

The physical layer 3*b*-20 or 3*b*-25 performs channel coding and modulation of upper layer data to configure and transmit OFDM symbols on a radio channel, or performs demodulation and channel decoding of the OFDM symbols received on the radio channel to transfer the demodulated and channel-decoded symbols to an upper layer.

Figure 3C:
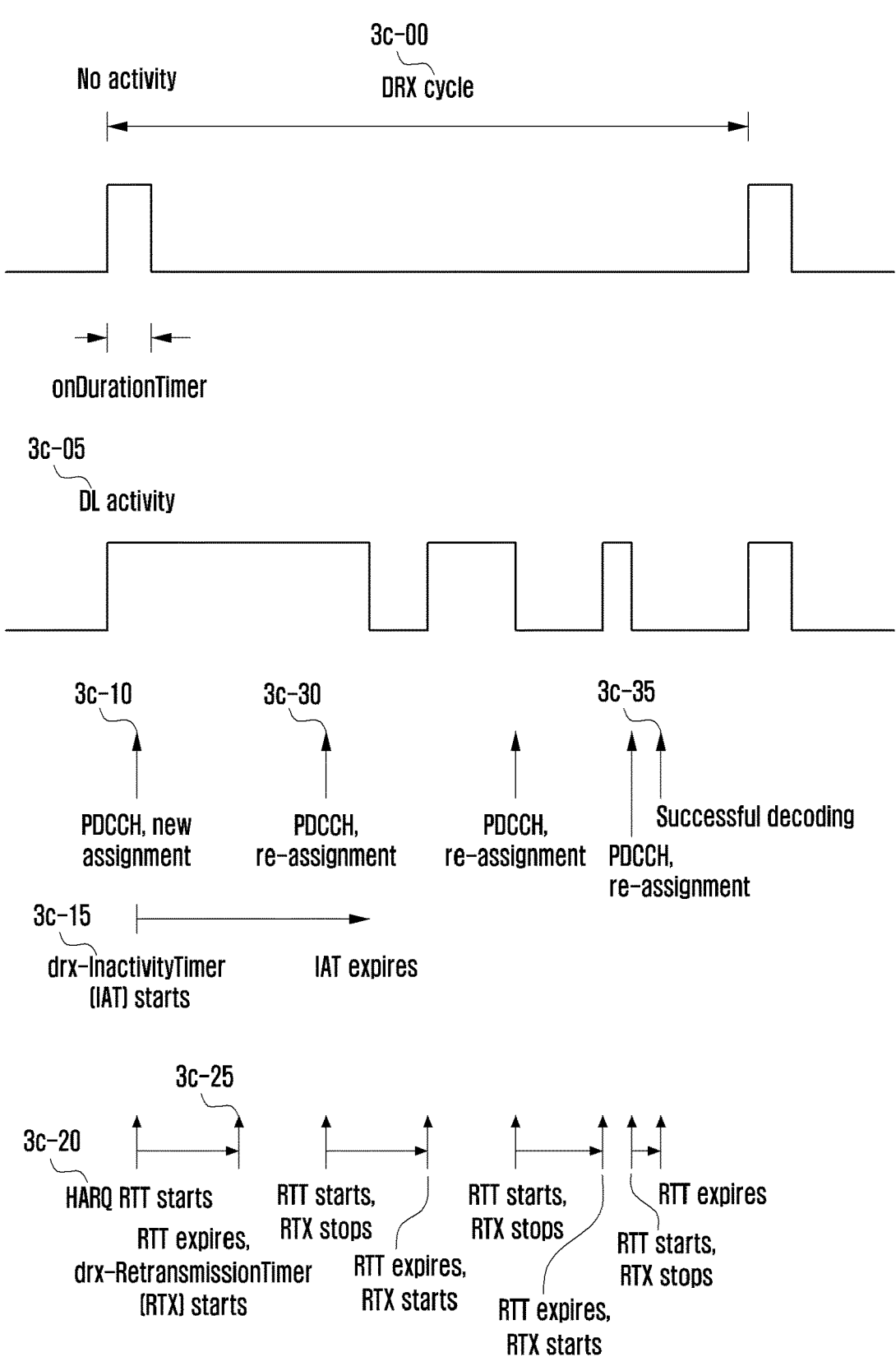
FIG. 3C is a diagram of a DRX operation of a connected mode in an LTE system, according to an embodiment of the present disclosure.

FIG. 3C is a diagram of a DRX operation, according to an embodiment of the present disclosure. The DRX is applied to minimize power consumption of the UE, and is a monitoring technology only in a predetermined PDCCH in order to obtain scheduling information. The DRX can be performed in both a standby mode and a connected mode, and the operating methods are somewhat different from each other. As described herein, in the connected mode, if the UE continuously monitors a PDCCH to acquire the scheduling information, it may cause great power consumption. The basic DRX operation has a DRX period at 3*c*-00, and the PDCCH is monitored only for an on-duration time at 3*c*-05. In the connected mode, the DRX period is configured to have a long DRX and a short DRX. The long DRX period is applied, and if needed, the eNB may trigger the short DRX period using a MAC CE. After a predetermined time elapses, the UE is changed from the short DRX period to the long DRX period. Initial scheduling information of a specific UE is provided only on the PDCCH. Accordingly, the UE periodically monitors only the PDCCH, and, thus, power consumption can be minimized.

If scheduling information on a new packet is received on the PDCCH for the on-duration time at 3*c*-05 (3*c*-10), the UE starts a DRX inactivity timer at 3*c*-15. The UE maintains in an active state for the DRX inactivity timer. That is, the UE continues the PDCCH monitoring. The UE also starts an HARQ RTT timer at 3*c*-20. The HARQ RTT timer is applied to prevent the UE from unnecessarily monitoring the PDCCH for the HARQ RTT, and during the timer operating time, the UE is not required to perform the PDCCH monitoring. However, while the PRX inactivity timer and the HARQ RTT timer operate simultaneously, the UE continues the PDCCH monitoring based on the DRX inactivity timer.

If the HARQ RTT timer expires, a DRX retransmission timer at 3*c*-25 starts. While the DRX retransmission timer operates, the UE should perform the PDCCH monitoring. During the DRX retransmission timer operating time, the scheduling information for the HARQ retransmission is received (at 3*c*-30). If the scheduling information is received, the UE immediately suspends the DRX retransmission timer, and starts the HARQ RTT timer again. The above-described operation continues until the packet is successfully received (at 3*c*-35).

Setup information related to the DRX operation in the connected mode is transferred to the UE through the RRC-ConnectionReconfiguration message. The on-duration timer, the DRX inactivity timer, and the DRX retransmission timer are defined by the number of PDCCH subframes. If a predetermined number of subframes that are defined as PDCCH subframes have passed after the timer starts, the timer expires. In FDD, all downlink subframes belong to PDCCH subframes, and in TDD, downlink subframes and special subframes correspond to them. In the TDD, downlink subframes, uplink subframes, and special subframes exist in the same frequency band. Among them, the downlink subframes and the special subframes are considered as the PDCCH subframes.

The eNB may configure two kinds of states longDRX and shortDRX. The eNB may use one of two states in consideration of power preference indication information and UE mobility record information typically reported from the UE, and the characteristic of the configured DRB. Shifting between the two states is performed by transmitting whether a specific timer has expired or a specific MAC CE to the UE.

In the existing LTE technology, only two kinds of DRX periods can be configured, and thus it is not possible to dynamically change the DRX period in accordance with various DRB characteristics, traffic patterns, and buffer states.

A DRX operation capable of dynamically changing the DRX period or drx-InactivityTimer in accordance with various DRB characteristics, traffic patterns, and buffer states is described herein. The DRX operation is featured to configure a default DRX period or default drx-Inactivity-Timer and to dynamically change the DRX period using the MAC CE. Also described herein is a scheme for the UE to maintain an active time through suspending of the configured DRX operation if the UE reports beam measurement, and in particular, new optimum beams.

Figure 3D:
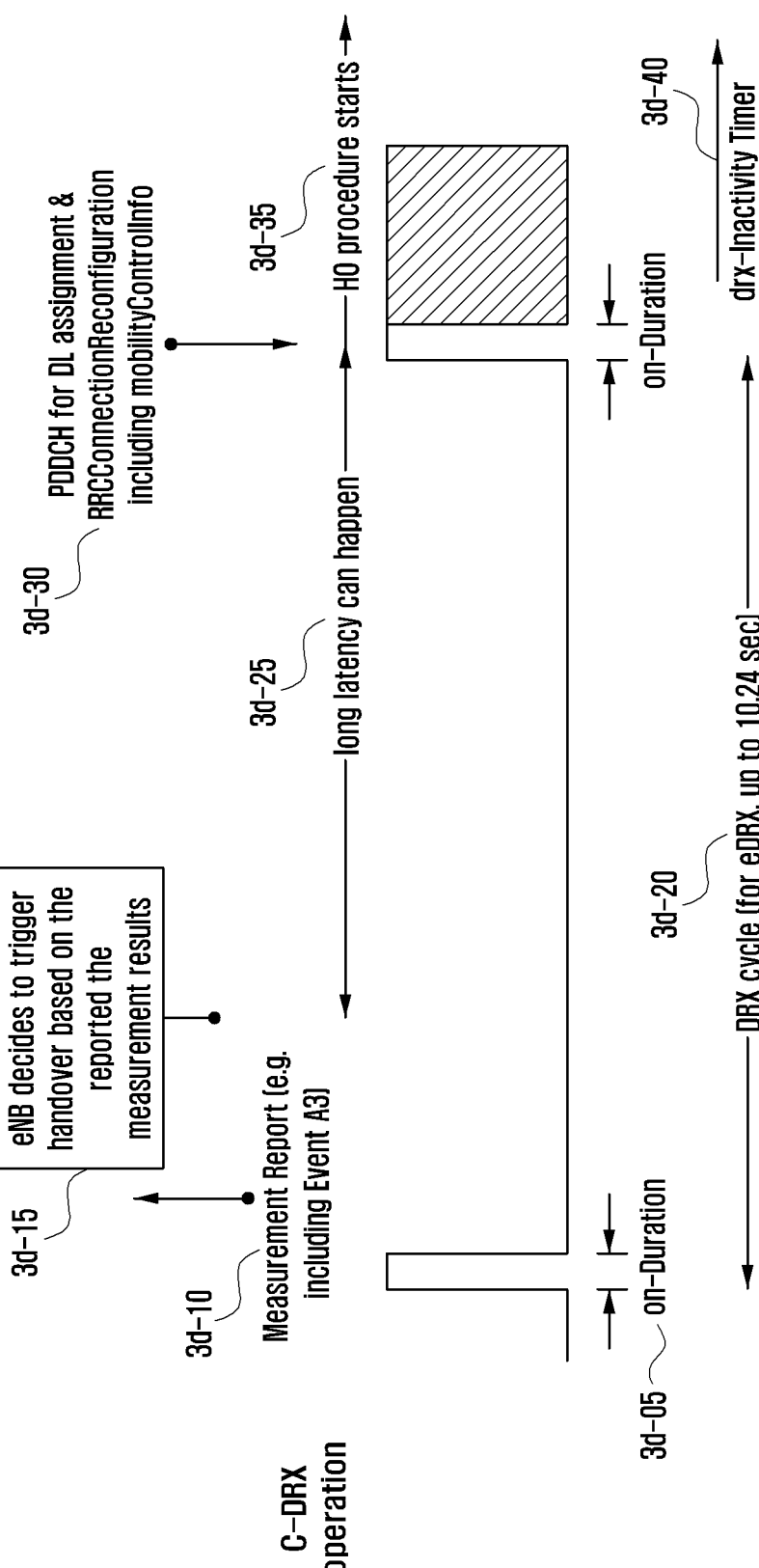
FIG. 3D is a diagram of a delay phenomenon due to a DRX while a handover is triggered in an LTE system, according to an embodiment of the present disclosure.

FIG. 3D is a diagram of a delay phenomenon due to a DRX while a handover is triggered in an LTE system, according to an embodiment of the present disclosure.

If an eNB configures a DRX operation to a UE in a connected mode, the UE monitors a PDCCH for an on-duration time period at 3*d*-05 for each configured DRX period. When applying an eDRX, the DRX period at 3*d*-20 can be configured up to 10.24 sec at maximum. Further, the eNB can configure cell measurement to the UE. The cell measurement is to support mobility of the UE. If a specific event occurs, the UE reports collected cell measurement information to the eNB (at 3*d*-10). Based on the LTE system, report events are as follows. Even the next-generation mobile communication system may have events corresponding to events applied to the LTE as below:

Event A1: Serving becomes better than absolute threshold;

Event A2: Serving becomes worse than absolute threshold;

Event A3: Neighbor becomes amount of offset better than a primary serving cell (PCell)/secondary serving cell (SCell);

Event A4: Neighbor becomes better than absolute threshold;

Event A5: PCell/SCell becomes worse than absolute threshold1 AND Neighbor becomes better than another absolute threshold2.

Event A6: Neighbor becomes amount of offset better than SCell.

Event C1: channel state information reference signal (CSI-RS) resource becomes better than absolute threshold;

Event C2: CSI-RS resource becomes amount of offset better than reference CSI-RS resource.

Event B1: Neighbor becomes better than absolute threshold;

Event B2: PCell becomes worse than absolute threshold1 and Neighbor becomes better than another absolute threshold2.

Event W1: wireless local area network (WLAN) becomes better than a threshold;

Event W2: All WLAN inside WLAN mobility set become worse than a threshold) and a WLAN outside WLAN mobility set becomes better than a threshold2; and Event W3: All WLAN inside WLAN mobility set become worse than a threshold.

Among the above events, event A3 may be data for the eNB to determine handover trigger. If the condition of the event A3 is satisfied and the UE reports cell measurement information (at 3*d*-10), the eNB triggers a handover based on the cell measurement report (at 3*d*-15). Although only the event A3 is mentioned, the eNB can use other report events in determining the handover. If the eNB determines the handover, it should configure this to the UE. Since the UE is performing the DRX, the eNB is unable to directly transfer this to the UE, and thus it waits until the next on-duration arrives (at 3*d*-If the on-duration arrives, the eNB transmits a message including a PDCCH including scheduling information and the handover setup information (at 3*d*-30). In the LTE, the message is an RRCConnectionReconfiguration. The UE that has received the message performs a handover operation (at 3*d*-35). In the DRX operation, since downlink scheduling has been performed during the on-duration, a drx-inactivity timer is operated (at 3*d*-40). Through the above-described process, the eNB may determine the handover, and may identify delay phenomenon occurrence due to the DRX driving until the eNB configures this to the UE (at 3*d*-25). In consideration of the UE moving rapidly to a neighboring cell, this may cause a handover failure. Further, in consideration of a long period of the eDRX, such failure probability may be increased.

Figure 3E:
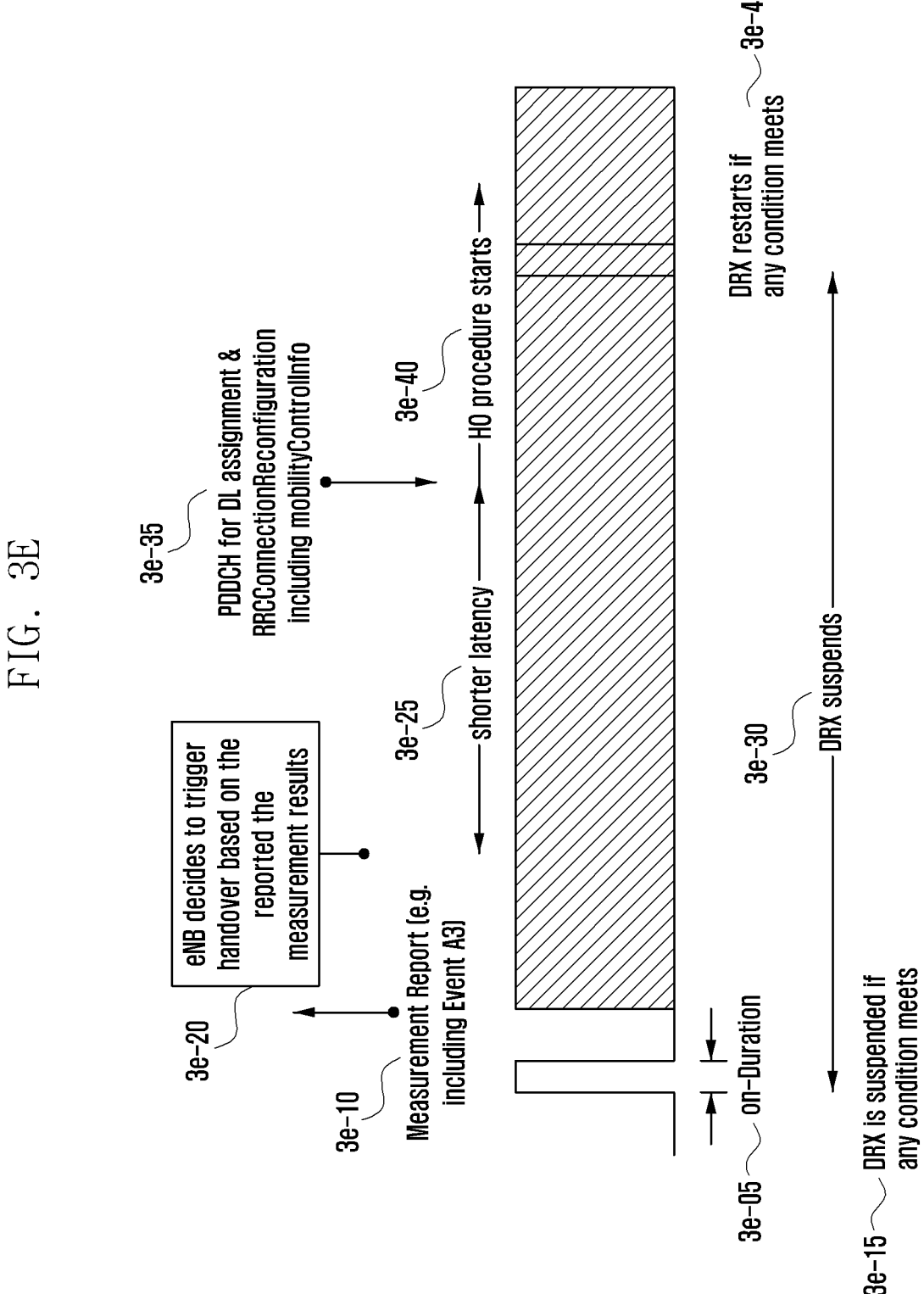
FIG. 3E is a flowchart of a method for temporarily suspending a DRX while a handover is triggered, according to an embodiment of the present disclosure.

FIG. 3E is a flowchart of a method for temporarily suspending a DRX while triggering a handover, according to an embodiment of the present disclosure.

A scheme for a UE to temporarily suspend a DRX driven by the UE if it is determined that it is influential to perform a handover in order to prevent a handover delay phenomenon due to the existing DRX operation. In particular, when performing temporal DRX suspend in accordance with a specific condition, the UE is featured to report this to an eNB through a new MAC CE. The basis on which the eNB determines whether to perform the handover with the cell measurement information reported by the UE in an actual network corresponds to network implementation, and it is not possible to accurately determine this only in consideration of the cell measurement information reported by the UE. The DRX driving state between the network and the UE may be wrongly understood. Accordingly, when performing the DRX suspend based on the cell measurement information reported by the UE, the DRX driving state may be prevented from being wrongly understood through accurate indication to the network using the MAC CE. If the triggered DRX suspend is not necessary, the network indicates to restart the DRX.

If the eNB configures the DRX operation to the UE in the connected mode, the UE monitors a PDCCH for an on-duration time period at step 3*e*-05 for each configured DRX period. Further, the eNB may configure the cell measurement to the UE. The UE reports the collected cell measurement information to the eNB periodically or when a specific event occurs (at step 3*e*-10). Since a report event has already been described based on an LTE system, even the next-generation mobile communication system may have an event corresponding to the event applied to the LTE. Among them, event A3 may be data for the eNB to determine the handover trigger. If the condition of the event A3 is satisfied and the UE reports the cell measurement information (at step 3*e*-10), the eNB triggers the handover based on the cell measurement report (at step 3*e*-20).

If it is determined that the cell measurement information can cause the eNB to trigger the handover when the UE reports the cell measurement information, the UE may include a new MAC CE together with the cell measurement information (at step 3*e*-10). The new MAC CE is used to notify that the UE temporarily suspends the DRX. Since the new MAC CE is for the purpose of notifying of the temporal DRX suspend, it is composed of only a subheader, and is featured not to have a payload portion corresponding to the subheader. Further, the contents of the DRX suspend operation may be included in the payload portion. For example, time information for the UE to temporarily suspend the DRX may be included therein. Although only the event A3 is mentioned as the determination basis for triggering the handover, the eNB may use other report events in determining the handover. The UE that has transmitted the message including the MAC CE to the eNB temporarily suspends the DRX being driven just after the message transmission or after a predetermined time elapses (at steps 3*e*-15 and 3*e*-30). The reason why the predetermined time is considered is that it is not possible to receive actual handover setup information just after the report transmission. Accordingly, the start of the DRX suspend may be adjusted on the dimension of saving the power consumption of the UE. If the eNB determines the handover (at step 3*e*-20), it should configure this to the UE. Since the UE has temporarily suspended the DRX, it can directly transfer the configuration to the UE (at step 3*e*-35), and, thus, it is not necessary to wait until the next on-duration arrives. The eNB transmits a control plane control message including the PDCCH including the scheduling information and the handover setup information simultaneously with determining the handover trigger (at step 3*e*-35). The UE that has received the message performs the handover operation (at step 3*e*-40). The handover delay time at step 3*e*-25 can be shortened. If the predetermined condition is satisfied, the DRX operation may restart (at step 3*e*-45).

Figure 3F:
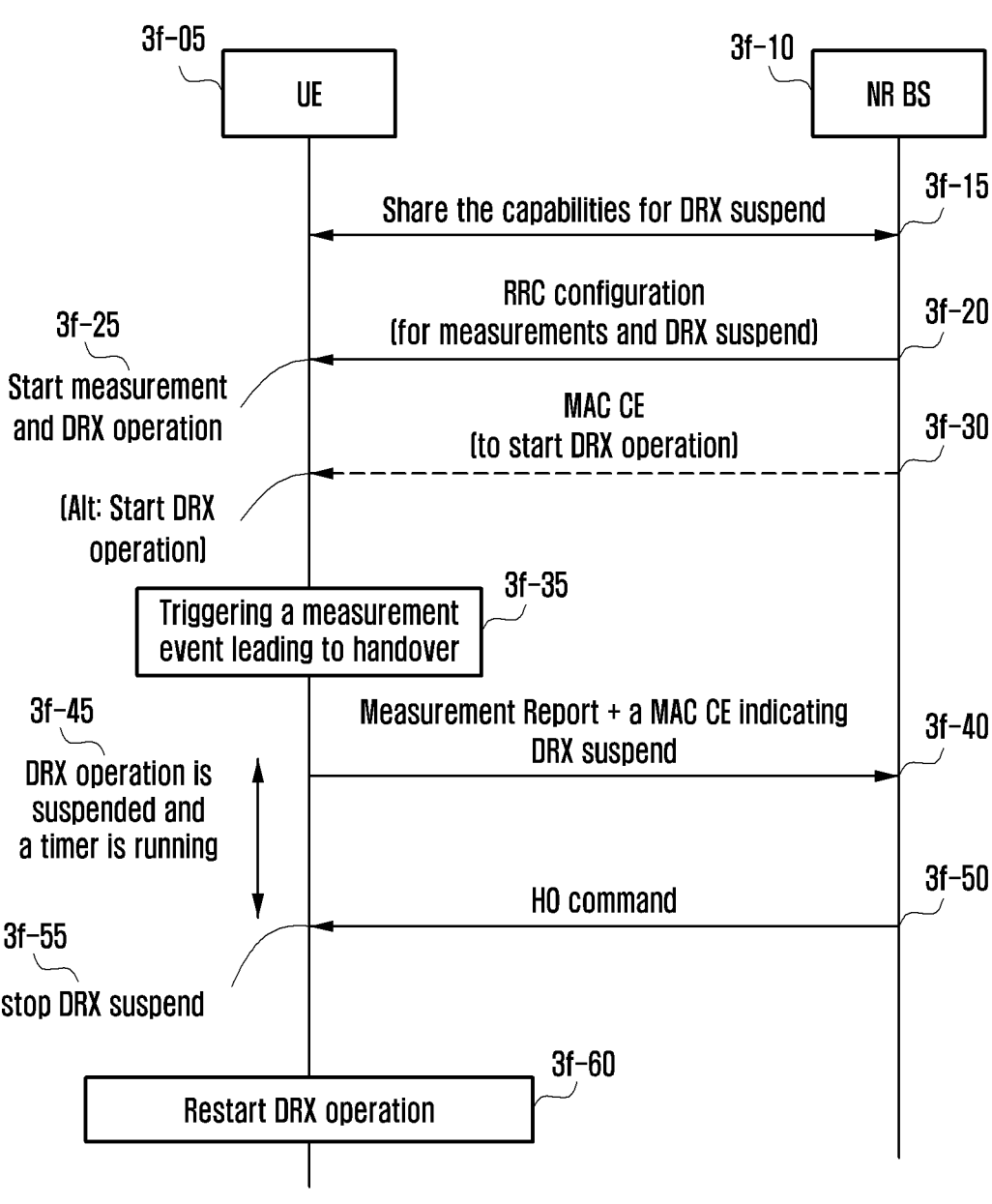
FIG. 3F is a flowchart of a signaling flow, according to an embodiment of the present disclosure.

FIG. 3F is a flowchart of a method between a UE and an eNB, according to an embodiment of the present disclosure.

The UE 3*f*-05 and the eNB 3*f*-10 identify whether they support DRX suspend functions with each other (at step 3*f*-15). The UE 3*f*-05 reports performance capabilities for its own DRX suspend functions to the eNB 3*f*-10 using a specific RRC message. Through system information being broadcasted, the eNB 3f-10 indicates that it can support the DRX suspend functions to UEs existing in its service area. The eNB 3f-10 transmits setup information related to cell measurement and DRX and DRX suspend setup information to the UE 3f-05 through the RRC message (at step 3f-20). The DRX suspend setup information include time information (timer value, e.g., a DRX suspend timer) in which the UE 3f-05 temporarily suspends the DRX driving. The UE 3f-05 that has received this immediately applies the setup information, and performs related cell measurement and DRX operation (at step 3f-25). The DRX operation may start after a specific MAC CE is received (at step 3f-30).

The UE 3f-05 periodically measures serving and neighboring cells received from the eNB 3f-10, and a report event indicating necessity of the handover is triggered (at step 3f-35). The UE 3f-05 reports this to the eNB 3f-10, and in this case, it includes the MAC CE indicating temporal suspend of the DRX being driven in accordance with the handover performance possibility in the report (at step 3f-40). The UE 3f-05 drives the configured DRX suspend timer (at step 3f-45). The UE 3f-05 temporarily suspends the DRX driving until the timer expires. If another condition is satisfied in addition to the timer expiration, the UE 3f-05 may resume the DRX driving. The UE may restart the DRX driving if the following conditions are satisfied:

When the DRX suspend timer configured by the eNB expires;

When a control plane control message indicating the handover is received from the eNB; and When its scheduling information (DL assignment or UL grant) is received.

The UE 3f-05 receives the control plane control message indicating the handover from the eNB 3f-10 (at step 3f-50). The UE 3f-05 releases the DRX suspend (at step 3f-55). The UE 3f-05 re-drives the DRX operation that has temporarily been suspended (at step 3f-60).

Figure 3G:
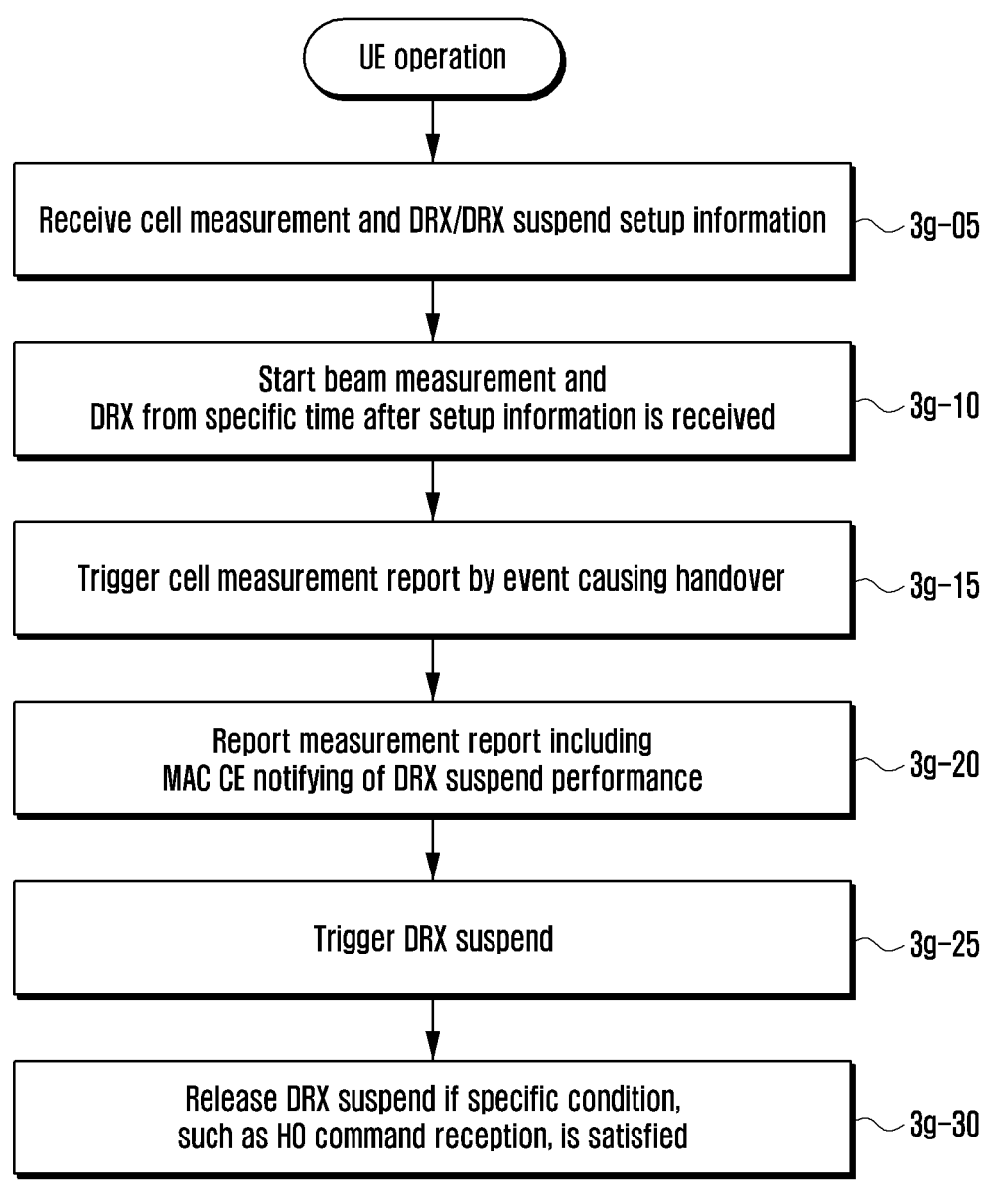
FIG. 3G is a flowchart of a method of a terminal, according to an embodiment of the present disclosure.

FIG. 3G is a flowchart of a method of a terminal, according to an embodiment of the present disclosure.

At step 3g-05, the UE receives setup information on the cell measurement and DRX and DRX suspend operations from the eNB. At step 3g-10, the UE starts the cell measurement and DRX operation just after receiving the setup information or at a specific time. At step 3g-15, the UE periodically performs cell measurement, and triggers a cell measurement report if a report event causing the handover occurs. At step 3g-20, the UE reports the collected cell measurement information to the eNB, and during the reporting, the UE includes the MAC CE notifying of the temporal suspend of the DRX being driven in the report. At step 3g-25, the UE temporarily suspends the DRX operation being driven, and maintains active time. At step 3g-30, the active time is maintained for a specific time or until a specific event occurs, and thereafter, the UE re-drives the DRX operation immediately or at a specific time.

Figure 3H:
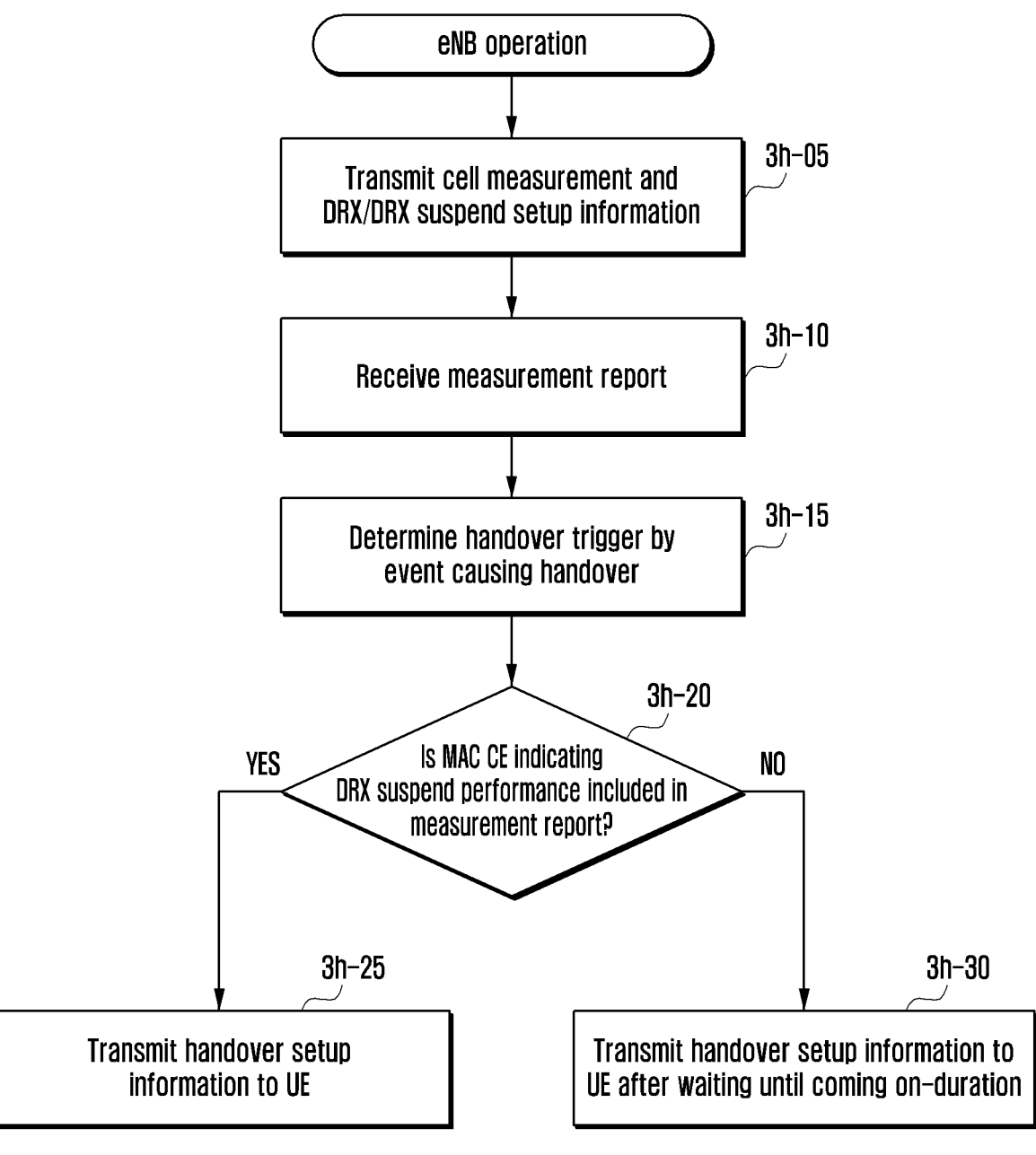
FIG. 3H is a flowchart of a method of a base station, according to an embodiment of the present disclosure.

FIG. 3H is a flowchart of a method of a base station, according to an embodiment of the present disclosure.

At step 3h-05, the eNB transmits setup information on the cell measurement and DRX and DRX suspend operations. At step 3h-10, the eNB receives a report of cell measurement information from the UE. At step 3h-15, the eNB triggers a handover based on the cell measurement information. At step 3h-20, the eNB determines whether the MAC CE notifying that the UE temporarily suspends the DRX being driven is included in the report. If the MAC CE is included, the eNB, at step 3h-25, transmits handover setup information to the UE without delay. Otherwise, at step 3h-30, the eNB transmits the handover setup information after waiting up to the arriving on-duration.

Figure 3I:
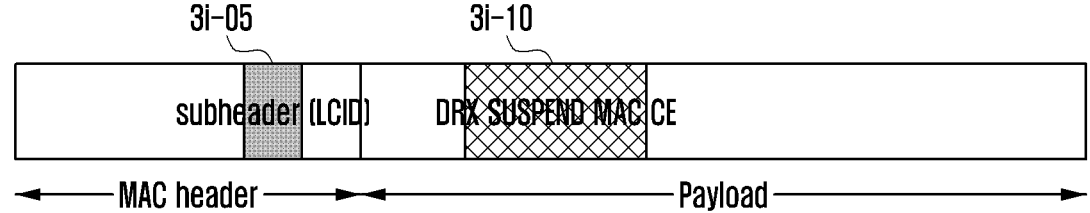
FIG. 3I is a diagram of a medium access control MAC control element (CE) indicating a temporal DRX suspend, according to an embodiment of the present disclosure.

FIG. 3I is a diagram of a MAC CE indicating a temporal DRX suspend, according to an embodiment of the present disclosure.

A new MAC CE for notifying of temporary suspend of the DRX driven by the UE is now herein described. The MAC CE is composed of only a subheader, and the subheader of the new MAC CE includes a specific logical channel identifier (LCID) at 3i-05 indicating this. Since the MAC CE does not have a payload portion, there is not an L field indicating the size of the payload portion in the subheader.

As an alternative, the MAC CE having the payload may be considered. In the payload portion, time information at 3i-10 for the UE to temporarily suspend the DRX being driven may be included. The information may coincide or may not coincide with the DRX suspend timer configured by the eNB.

Figure 3J:
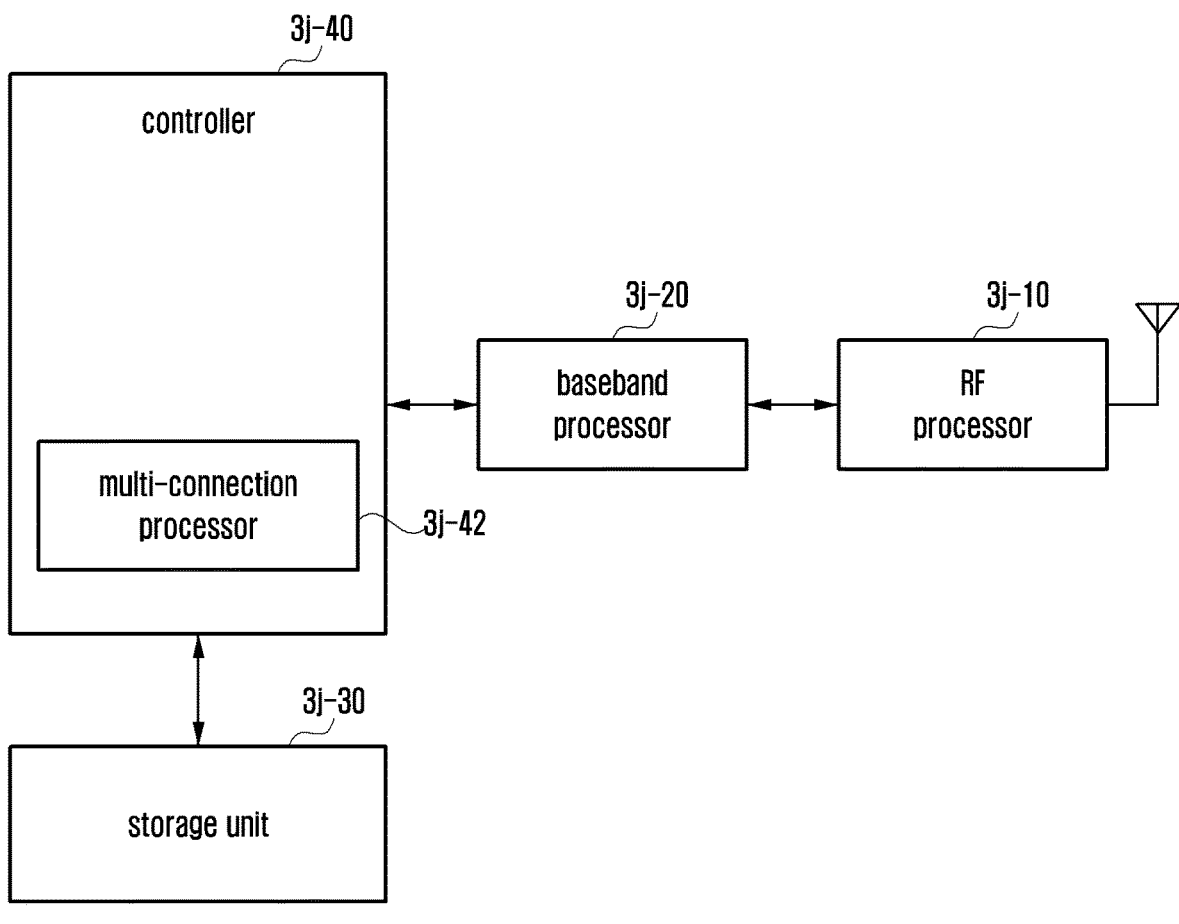
FIG. 3J is a diagram of a terminal, according to an embodiment of the present disclosure.

FIG. 3J is a diagram of a terminal, according to an embodiment of the present disclosure.

The terminal includes an RF processor 3j-10, a baseband processor 3j-20, a storage unit 3j-30, and a controller 3j-40.

The RF processor 3j-10 performs transmitting and receiving a signal through a radio channel, such as signal band conversion and amplification. The RF processor 3j-performs up-conversion of a baseband signal provided from the baseband processor 3j-20 into an RF-band signal to transmit the converted signal to an antenna, and performs down-conversion of the RF-band signal received through the antenna into a baseband signal. The RF processor 3j-10 may include a transmission filter, a reception filter, an amplifier, a mixer, an oscillator, a DAC, and an ADC. Although only one antenna is illustrated in FIG. 3J, the terminal may be provided with a plurality of antennas. The RF processor 3j-10 may include a plurality of RF chains. The RF processor 3j-10 may perform beamforming, and for the beamforming, the RF processor 3j-10 may adjust phases and sizes of signals transmitted or received through the plurality of antennas or antenna elements. The RF processor may perform MIMO, and may receive several layers during performing of a MIMO operation.

The baseband processor 3j-20 performs conversion between a baseband signal and a bit string in accordance with the physical layer standard of the system. During data transmission, the baseband processor 3j-20 generates complex symbols by encoding and modulating a transmitted bit string. During data reception, the baseband processor 3j-restores a received bit string by demodulating and decoding the baseband signal provided from the RF processor 3j-10. When following an OFDM method, during data transmission, the baseband processor 3j-20 generates complex symbols by encoding and modulating a transmitted bit string, performs mapping of the complex symbols on subcarriers, and then configures OFDM symbols through the IFFT operation and CP insertion. Further, during data reception, the baseband processor 3j-20 divides the baseband signal provided from the RF processor 3j-10 in the unit of OFDM symbols, restores the signals mapped on the subcarriers through the FFT operation, and then restores the received bit string through demodulation and decoding.

The baseband processor 3j-20 and the RF processor 3j-10 may be called a transmitter, a receiver, a transceiver, or a communication unit. In order to support different radio connection technologies, at least one of the baseband processor 3j-20 and the RF processor 3j-10 may include a plurality of communication modules. Further, in order to process signals of different frequency bands, at least one of the baseband processor 3*j*-20 and the RF processor 3*j*-10 may include different communication modules. For example, the different radio connection technologies may include a radio local area network (LAN) (e.g., IEEE 802.11) and a cellular network (e.g., LTE). Further, the different frequency bands may include SHF (e.g., 2.5 GHz or 5 GHz) band and millimeter wave (mmWave) (e.g., 60 GHz) band.

The storage unit 3*j*-30 stores a basic program for an operation of the terminal, application programs, and data of setup information. The storage unit 3*j*-30 may store therein information related to a second access node performing wireless communication using a second radio connection technology. The storage unit 3*j*-30 provides stored data in accordance with a request from the controller 3*j*-40.

The controller 3*j*-40 controls the terminal. The controller 3*j*-40 transmits and receives signals through the baseband processor 3*j*-20 and the RF processor 3*j*-10. The controller 3*j*-40 records or reads data in or from the storage unit 3*j*-30. The controller 3*j*-40 may include at least one processor, and may include a communication processor for communication and an AP for controlling an upper layer, such as an application program.

Figure 3K:
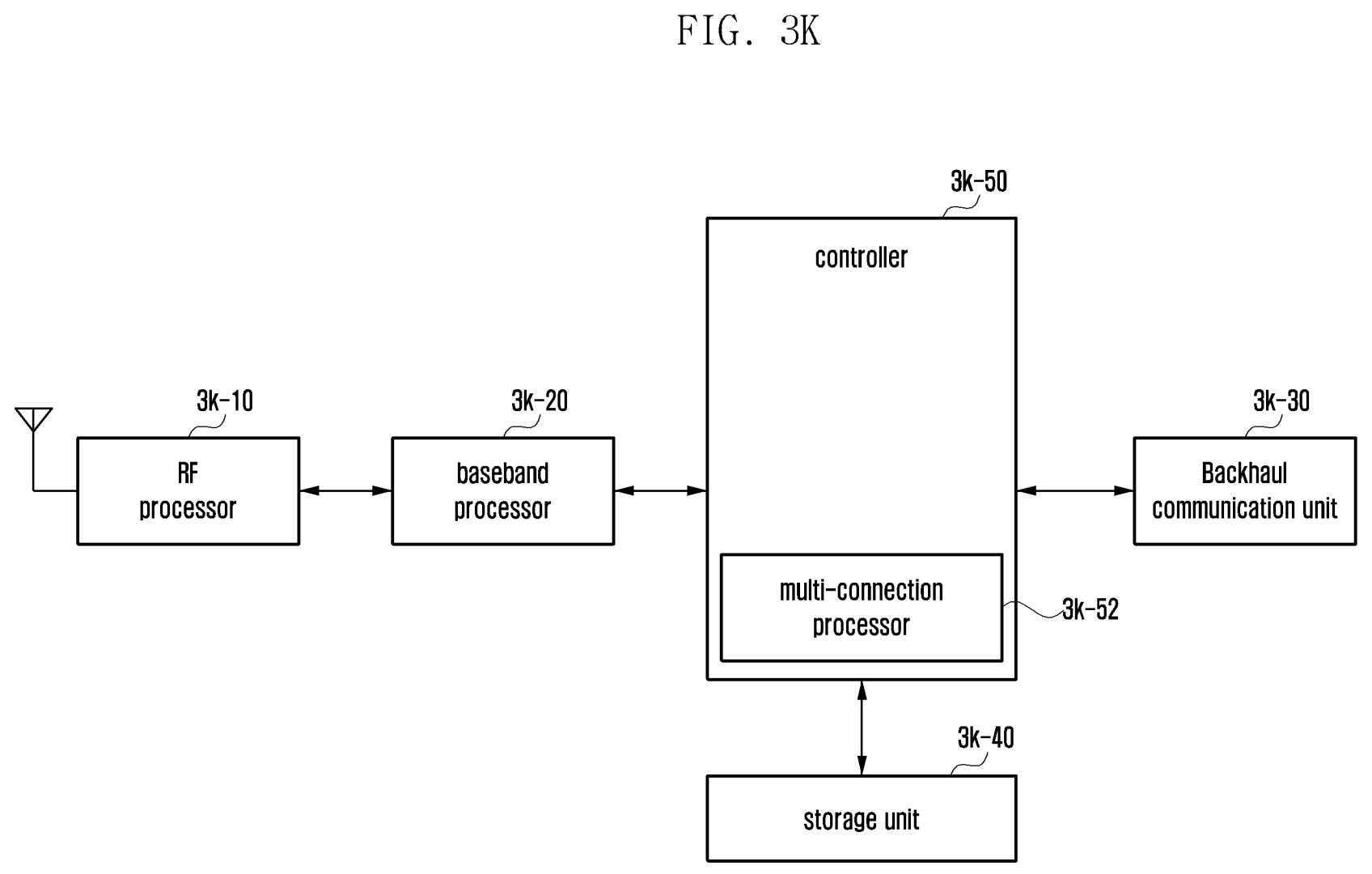

FIG. 3K is a diagram of a base station in a wireless communication system, according to an embodiment of the present disclosure.

The base station includes an RF processor 3*k*-10, a baseband processor 3*k*-20, a backhaul communication unit (communication unit) 3*k*-30, a storage unit 3*k*-40, and a controller 3*k*-50.

The RF processor 3*k*-10 performs transmitting and receiving a signal through a radio channel, such as signal band conversion and amplification. The RF processor 3*k*-performs up-conversion of a baseband signal provided from the baseband processor 3*k*-20 into an RF-band signal to transmit the converted signal to an antenna, and performs down-conversion of the RF-band signal received through the antenna into a baseband signal. The RF processor 3*k*-10 may include a transmission filter, a reception filter, an amplifier, a mixer, an oscillator, a DAC, and an ADC. Although only one antenna is illustrated, the first connection node may be provided with a plurality of antennas. The RF processor 3*k*-10 may include a plurality of RF chains. The RF processor 3*k*-10 may perform beamforming, and for the beamforming, the RF processor 3*k*-10 may adjust phases and sizes of signals transmitted or received through the plurality of antennas or antenna elements. The RF processor may perform down MIMO operation through transmission of one or more layers.

The baseband processor 3*k*-20 performs conversion between a baseband signal and a bit string in accordance with the physical layer standard of the first radio connection technology. During data transmission, the baseband processor 3*k*-20 generates complex symbols by encoding and modulating a transmitted bit string. During data reception, the baseband processor 3*k*-20 restores a received bit string by demodulating and decoding the baseband signal provided from the RF processor 3*k*-10. When following an OFDM method, during data transmission, the baseband processor 3*k*-20 generates complex symbols by encoding and modulating a transmitted bit string, performs mapping of the complex symbols on subcarriers, and then configures OFDM symbols through the IFFT operation and CP insertion. During data reception, the baseband processor 3*k*-20 divides the baseband signal provided from the RF processor 3*k*-10 in the unit of OFDM symbols, restores the signals mapped on the subcarriers through the FFT operation, and then restores the received bit string through demodulation and decoding. The baseband processor 3*k*-20 and the RF processor 3*k*-10 may be called a transmitter, a receiver, a transceiver, or a wireless communication unit.

The communication unit 3*k*-30 provides an interface for performing communication with other nodes in the network. The backhaul communication unit 3*k*-converts a bit string transmitted from the main eNB to another node, for example, an auxiliary eNB or a core network into a physical signal, and converts the physical signal received from the other node into the bit string.

The storage unit 3*k*-40 stores a basic program for an operation of the main base station, application programs, and data of setup information. The storage unit 3*k*-40 may store information on a bearer allocated to the connected terminal and the measurement result reported from the connected terminal. The storage unit 3*k*-40 may store information that becomes a basis of determination whether to provide or suspend a multi-connection to the terminal. The storage unit 3*k*-40 provides stored data in accordance with a request from the controller 3*k*-50.

The controller 3*k*-50 controls the main base station. The controller 3*k*-50 transmits and receives signals through the baseband processor 3*k*-20 and the RF processor 3*k*-10 or through the communication unit 3*k*-30. The controller 3*k*-50 records or reads data in or from the storage unit 3*k*-40. The controller 3*k*-50 may include at least one processor.

Embodiment 4

Figure 4A:
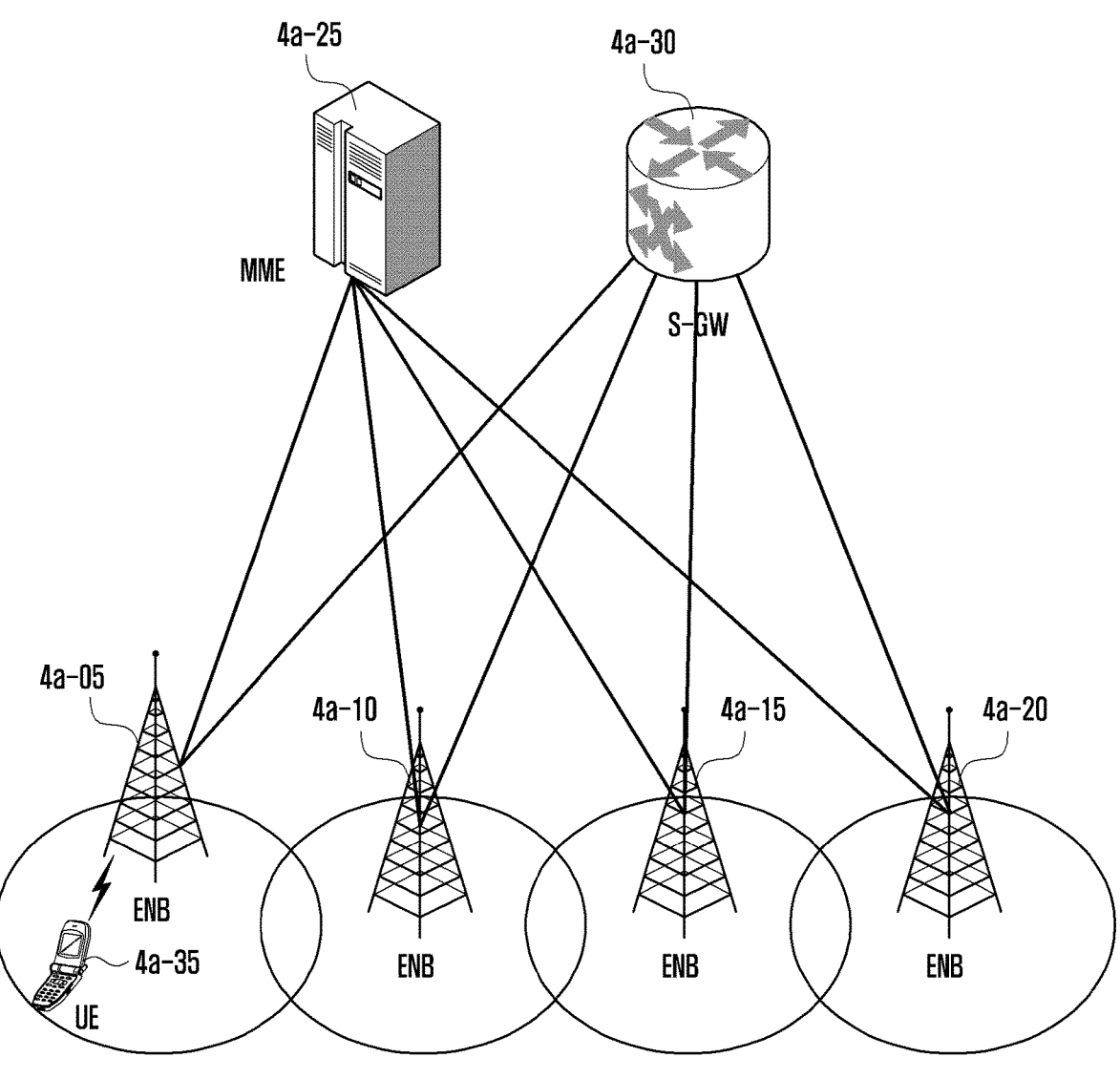
FIG. 4A is a diagram of an LTE system, according to an embodiment of the present disclosure.

FIG. 4A is a diagram of an LTE system, according to an embodiment of the present disclosure.

A wireless communication system includes ENBs 4*a*-05, 4*a*-10, 4*a*-15, and 4*a*-20, an MME 4*a*-25, and an S-GW 4*a*-30. A UE 4*a*-35 accesses to an external network through the ENBs 4*a*-05, 4*a*-10, 4*a*-15, and 4*a*-20 and the S-GW 4*a*-30.

The ENBs 4*a*-05, 4*a*-10, 4*a*-15, and 4*a*-20 are access nodes of a cellular network, and provide radio accesses to the UEs accessing the network. The ENBs 4*a*-05, 4*a*-10, 4*a*-15, and 4*a*-20 support connections between the UEs and a CN by performing scheduling through consolidation of state information, such as a buffer state, an available transmission power state, and a channel state of each UE, in order to service users' traffics. The MME 4*a*-25 takes charge of not only mobility management of the UE 4*a*-35 but also various kinds of control functions, and is connected to the plurality of eNBs 4*a*-05, 4*a*-4*a*-15, and 4*a*-20. The S-GW 4*a*-30 provides a data bearer. Further, the MME 4*a*-25 and the S-GW 4*a*-30 may further perform authentication of the UE 4*a*-35 and bearer management, and process packets arriving from the eNBs 4*a*-05, 4*a*-10, 4*a*-15, and 4*a*-20, or process packets to be transferred to the eNBs 4*a*-05, 4*a*-10, 4*a*-15, and 4*a*-20.

Figure 4B:
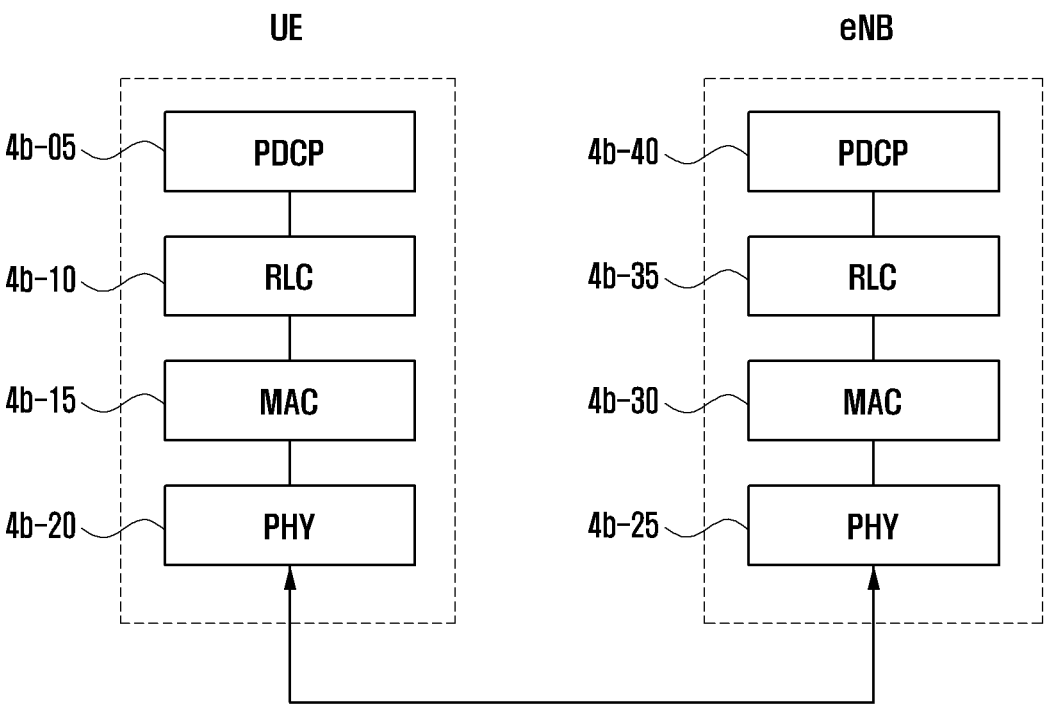
FIG. 4B is a diagram of a radio protocol structure of an LTE system, according to an embodiment of the present disclosure.

FIG. 4B is a diagram of a radio protocol structure in an LTE system, according to an embodiment of the present disclosure.

In a UE or an ENB, a radio protocol of an LTE system includes a PDCP 4*b*-05 or 4*b*-40, an RLC 4*b*-10 or 4*b*-35, and a MAC 4*b*-15 or 4*b*-30. The PDCP 4*b*-05 or 4*b*-40 takes charge of IP header compression/decompression operations. The main functions of the PDCP are summarized as follows:

Header compression and decompression: ROHC only;

Transfer of user data;

In-sequence delivery of upper layer PDUs at a PDCP reestablishment procedure for an RLC AM;

For split bearers in DC (only support for an RLC AM):
 PDCP PDU routing for transmission and PDCP PDU
 reordering for reception;
Duplicate detection of lower layer SDUs at a PDCP
 reestablishment procedure for an RLC AM;
Retransmission of PDCP SDUs at handover and, for split
 bearers in DC, of PDCP PDUs at a PDCP data-recovery
 procedure, for an RLC AM;
Ciphering and deciphering; and
Timer-based SDU discard in an uplink.

The RLC 4b-10 or 4b-35 reconfigures a PDCP PDU with
a proper size and performs an ARQ operation and the like.
The main functions of the RLC are summarized as follows:
Transfer of upper layer PDUs;
Error correction through an ARQ (only for AM data
 transfer);
Concatenation, segmentation, and reassembly of RLC
 SDUs (only for UM and AM data transfer);
Re-segmentation of RLC data PDUs (only for UM and
 AM data transfer);
Reordering of RLC data PDUs (only for UM and AM data
 transfer);
Duplicate detection (only for UM and AM data transfer);
Protocol error detection (only for AM data transfer);
RLC SDU discard (only for UM and AM transfer); and
RLC reestablishment.

The MAC 4b-15 or 4b-30 is connected to several RLC
layer devices configured in one terminal, and performs
multiplexing/demultiplexing of RLC PDUs into/from MAC
PDU. The main functions of the MAC are summarized as
follows:
Mapping between logical channels and transport chan-
 nels;
Multiplexing/demultiplexing of MAC SDUs belonging to
 one or different logical channels into/from transport
 blocks (TB) transferred to/from the physical layer on
 transport channels;
Scheduling information reporting;
HARQ function (error correction through HARQ);
Priority handling between logical channels of one UE;
Priority handling between UEs by means of dynamic
 scheduling;
MBMS service identification;
Transport format selection; and
padding.

The physical layer 4b-20 or 4b-25 performs channel
coding and modulation of upper layer data to configure and
transmit OFDM symbols on a radio channel, or performs
demodulation and channel decoding of the OFDM symbols
received on the radio channel to transfer the demodulated
and channel-decoded symbols to an upper layer.

Although not illustrated, RRC layers exist on upper
portions of PDCP layers of the UE and the eNB, and the
RRC layers may transmit/receive setup control messages
related to accesses and measurement for radio resource
control.

Figure 4C:
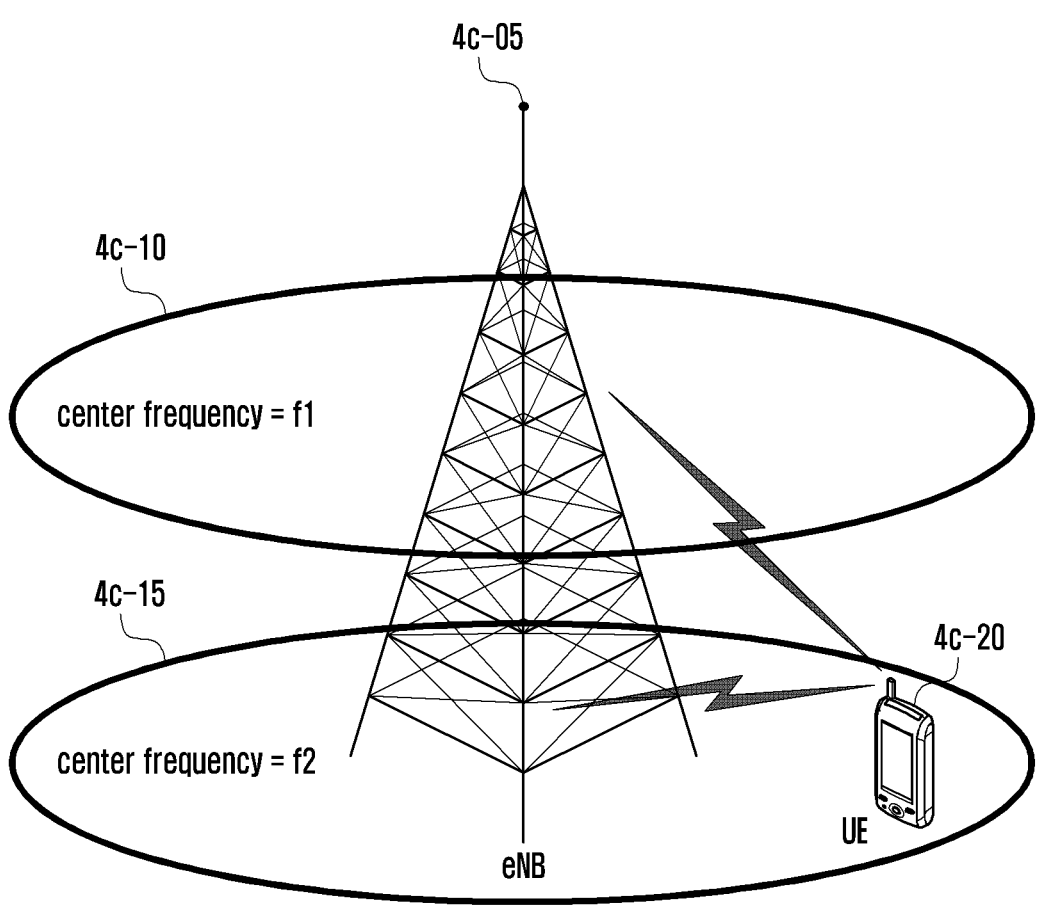
FIG. 4C is a diagram of a carrier aggregation of an LTE system, according to an embodiment of the present disclosure.

FIG. 4C is a diagram of carrier aggregation (CA) of an
LTE system, according to an embodiment of the present
disclosure.

Referring to FIG. 4C, one eNB 4c-05 transmits and
receives multi-carriers over several frequency bands. If a
carrier 4c-15 having a forward center frequency of f1 and a
carrier 4c-15 having a forward center frequency of f2 are
transmitted from the eNB 4c-05, in the related art, one eNB
transmits/receives data using one of the two carriers. How-
ever, the UE having a carrier aggregation capability can
simultaneously transmit/receive data through several carriers. The eNB 4c-05 allocates more carriers to a UE 4c-20
having the carrier aggregation capability, and, thus, the
transmission speed of the UE 4c-20 can be heightened.

As described above, aggregation of forward carriers and
backward carriers transmitted and received by one eNB is
referred to as intra-eNB CA. Traditionally, if it is assumed
that one forward carrier transmitted by one eNB and one
backward carrier received by the one eNB constitute one
cell, it may be understood that the CA is for the UE to
transmit/receive data simultaneously through several cells.
Through this, the maximum transmission speed is increased
in proportion to the number of carriers being aggregated.

Hereinafter, reception of data by the UE through a certain
forward carrier or transmission of data by the UE through a
certain backward carrier has the same meaning as transmis-
sion/reception of data using a control channel and a data
channel provided from a cell corresponding to the center
frequency and the frequency band featuring the carrier. The
CA will be particularly expressed as setup of a plurality of
serving cells, and with respect to the serving cell, the PCell,
SCell, or activated serving cell will be used. The PCell and
SCell are terms representing the kind of serving cell set in
the UE. There are some different points between PCell and
SCell, and for example, PCell always maintains an active
state, but SCell repeats an active state and inactive state in
accordance with the indication of the eNB. The terminal
mobility is controlled around PCell, and it may be under-
stood that SCell is an additional serving cell for data
transmission/reception. PCell and SCell are defined in the
LTE standards 36.331 or 36.321. The terms have the same
meanings as those used in an LTE mobile communication
system. The terms carrier, component carrier, and serving
cell are used interchangeably.

According to a normal intra-eNB CA, the UE transmits
not only HARQ feedback for PCell and channel state
information (CSI) but also HARQ feedback for SCell and
CSI through a physical uplink control channel (hereinafter,
PUCCH) of PCell. This is to apply the CA operation even
with respect to the UE of which uplink simultaneous trans-
mission is not possible. In LTE release-13 (Rel-13)
enhanced CA (eCA), an additional SCell having a PUCCH
is defined, and up to 32 carriers can be aggregated. The
PUCCH SCell is limited to a serving cell belonging to a mast
cell group (MCG). The MCG includes a set of serving cells
controlled by a master eNB (MeNB) controlling PCell, and
the SCG includes a set of serving cells controlled by an eNB
that is not an eNB controlling PCell, in other words, a
secondary eNB (SeNB), controlling only SCells. The eNB
notifies the UE whether a specific serving cell belongs to the
MCG or SCG in the process of setting the corresponding
serving cell. The eNB notifies the UE whether the respective
SCell belong to the PCell group or the PUCCH SCell group.

Figure 4D:
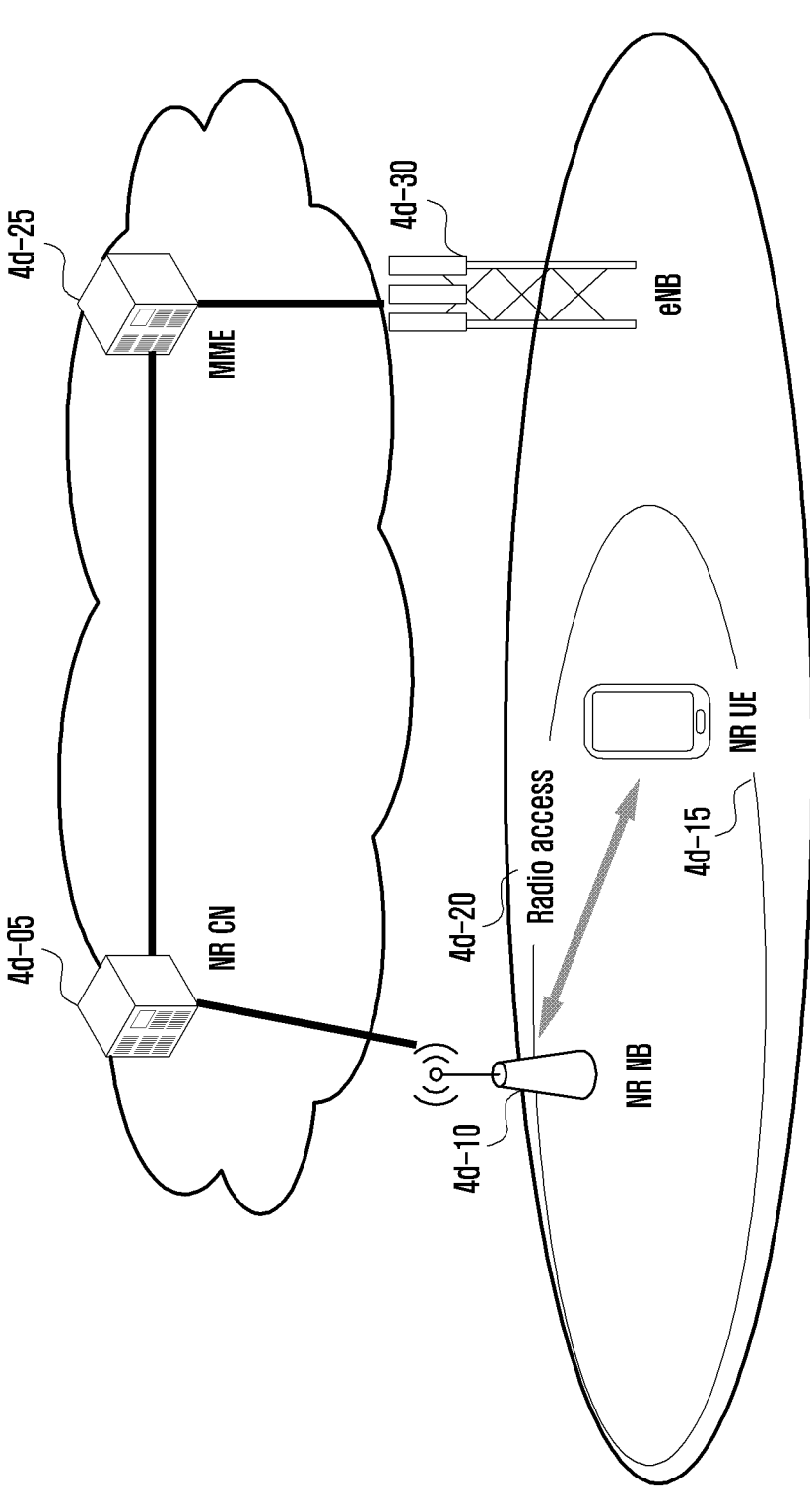
FIG. 4D is a diagram of a next-generation mobile communication system, according to an embodiment of the present disclosure.

FIG. 4D is a diagram of a next-generation mobile com-
munication system, according to an embodiment of the
present disclosure.

An RAN of a next-generation mobile communication
system includes an NR ENB 4d-10 and an NR CN 4d-05. An
NR UE 4d-15 accesses to an external network through the
NR gNB 4d-10 and the NR CN 4d-05.

The NR gNB 4d-10 corresponds to an ENB of the existing
LTE system. The NR gNB 4d-10 is connected to the NR UE
4d-15 on a radio channel, and, thus, it can provide a more
superior service than the service of the existing node B.
Since all user traffics are serviced on shared channels in the
next-generation mobile communication system, a device
that performs scheduling through consolidation of status
information, such as a buffer state of NR UEs 4d-15, an available transmission power state, and a channel state, is required, and the NR NB 4d-10 takes charge of this. One NR gNB 4d-10 generally controls a plurality of cells, and is composed of a central unit (CU) generalizing control and signaling and a distributed unit (DU) taking charge of signal transmission/reception. In order to implement ultrahigh-speed data transmission as compared with the existing LTE, the NR may have a bandwidth that is equal to or higher than the existing maximum bandwidth, and a beamforming technology may be additionally grafted in consideration of OFDM as an RAT. Further, an AMC scheme determining a modulation scheme and a channel coding rate to match the channel state of the NR UE 4d-15 is adopted. The NR CN 4d-05 performs functions of mobility support, bearer setup, and QoS configuration. The NR CN 4d-05 is a device that takes charge of not only a mobility management function of the NR UE 4d-15 but also various kinds of control functions, and is connected to a plurality of ENBs. The next-generation mobile communication system may interlock with the existing LTE system, and the NR CN 4d-05 is connected to an MME 4d-25 through a network interface. The MME 4d-25 is connected to an ENB 4d-30 that is the existing ENB.

Figure 4E:
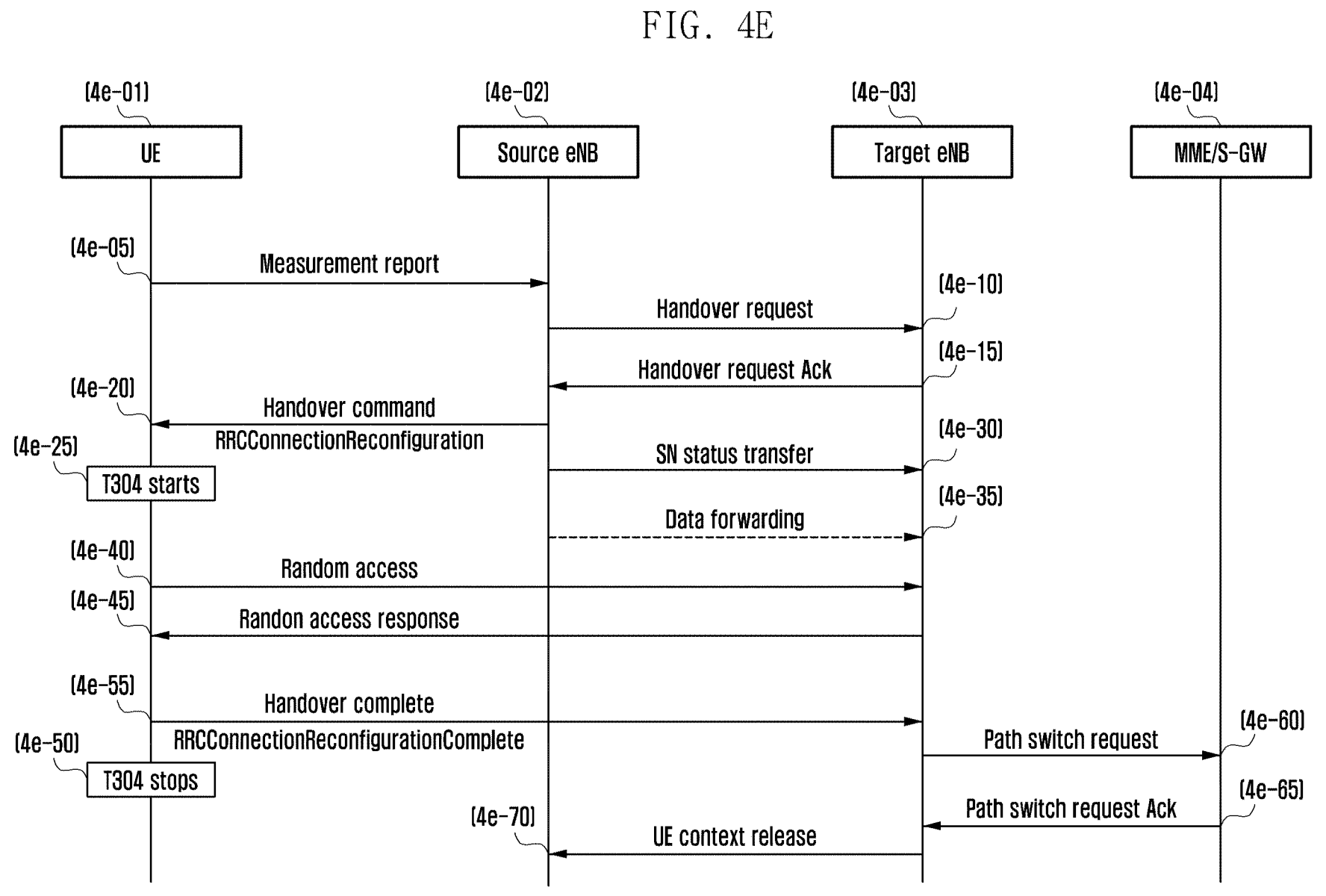

FIG. 4E is a flowchart of a method of a handover procedure of an LTE system, according to an embodiment of the present disclosure.

A UE 4e-01 in a connected mode state reports cell measurement information to a current serving eNB 4e-02 periodically or when a specific event is satisfied (at step 4e-05). The serving eNB/serving cell 4e-02 determines whether the UE 4e-01 proceeds with a handover to an adjacent cell based on the measurement information. The handover is a technology to change the serving cell providing a service to the UE in a connected mode state to another eNB. If the serving cell determines the handover, it requests the handover by transmitting a handover (HO) request message to a new or target eNB 4e-03 that will provide a service to the UE 4e-01, that is, the target eNB/target cell 4e-03 (at step 4e-10). If the target 4e-03 accepts the handover request, it transmits an HO request ACK message to the eNB 4e-02 (at step 4e-15). The eNB 4e-02 that has received the message transmits an HO command message to the UE 4e-01 (at step 4e-20).

Before receiving the HO command, the UE 4e-01 continuously receives a downlink channel physical downlink control channel/physical downlink shared channel/physical hybrid-ARQ indicator channel (PDCCH/PDSCH/PHICH) from the eNB 4e-02, and transmits an uplink channel physical uplink shared channel/physical uplink control channel (PUSCH/PUCCH). The eNB 4e-02 (serving cell) transfers the HO command message to the UE using the RRC connection reconfiguration message (at step 4e-20). If the message is received, the UE 4e-01 suspends data transmission/reception with the eNB 4e-02, and starts a T304 timer. The T304 timer causes the UE 4e-01 to retrieve to the original setup and to be shifted to the RRC idle state if the UE 4e-01 has not succeeded in handover with respect to the target eNB 4e-03 (target cell) for a specific time.

The eNB 4e-02 transfers an SN status for uplink/downlink data, and if there is the downlink data, it transfers the downlink data to the target eNB 4e-03 (at steps 4e-30 and 4e-35). The UE 4e-01 attempts a random access to the target eNB 4e-03 indicated from the eNB 4e-02 (at step 4e-40). The random access is to notify the target eNB 4e-03 that the UE 4e-01 moves through the handover and to match uplink synchronization. For the random access, the UE 4e-01 transmits to the target eNB 4e-03 preambles corresponding to a preamble ID provided from the eNB 4e-02 and a preamble ID randomly selected. If a specific number of preambles have passed after the preamble transmission, the UE 4e-01 monitors whether an RAR is transmitted from the target eNB 4e-03. The monitoring time period is called an RAR window.

If the RAR is received for the specific time period (at step 4e-45), the UE 4e-01 carries the handover complete message on an RRCConnectionReconfigurationComplete message to be transmitted to the target eNB 4e-03 (at step 4e-55). Thereafter, the UE 4e-01 transmits uplink channel PUSCH/PUCCH while continuously receiving downlink channel PDCCH/PDSCH/PHICH from the target eNB 4e-03. If an RAR is successfully received from the target eNB 4e-03, the UE 4e-01 ends the T304 timer (at step 4e-50). The target eNB 4e-03 requests a path switch to correct paths of bearers set to the serving eNB 4e-01 (at steps 4e-60 and 4e-65), and reports deletion of the UE context of the UE 4e-01 to the serving eNB 4e-02 (at step 4e-70). Accordingly, the UE 4e-01 attempts to receive data from the RAR window start time with respect to the target eNB 4e-03, and after receiving the RAR, the UE starts transmission of an RRCConnection-ReconfigurationComplete message to the target eNB 4e-03.

During the handover in the existing LTE, time interruption occurs while the random access procedure to the target eNB 4e-03, and zero mobility interruption time for removing the time interruption is a requirement in the NR. The handover in the existing LTE is classified into type 1 handover, and the present disclosure compares the type 1 handover with a proposed method (e.g., type 2 handover).

A target PCell to which the handover is to be performed is a serving cell set to the UE, and if the handover between the serving cells is performed, this is defined as type 2 handover. The type 2 handover may be defined as the change of PCell between serving cells. For the type 2 handover, the following conditions should be satisfied.

PUCCH connection setup of at least one serving cell excluding PCell should be performed; this is because an uplink control channel for HARQ feedback, scheduling request, and CSI transmission is necessary.

In general, the type 2 handover is composed of the following 4 stages.

1. Phase 0: Stage in which a UE is connected to PCell.
2. Phase 1 (Preparation stage): Stage in which an additional PUCCH saving cell is set.
3. Phase 2 (Execution stage): Stage in which type 2 handover is executed and PCell is changed to a target serving cell. Here, the serving cell is not PCell, but is a cell in which the PUCCH is set.
4. Phase 3 (Completion stage): Stage in which the previous PCell is released.

The type 2 handover includes a handover using a dual connectivity (DC) and RLC split bearer, a handover using DC and MAC split bearer, and an eCA-based handover. Hereinafter, an eCA-based handover procedure will be described in detail.

Figure 4F:
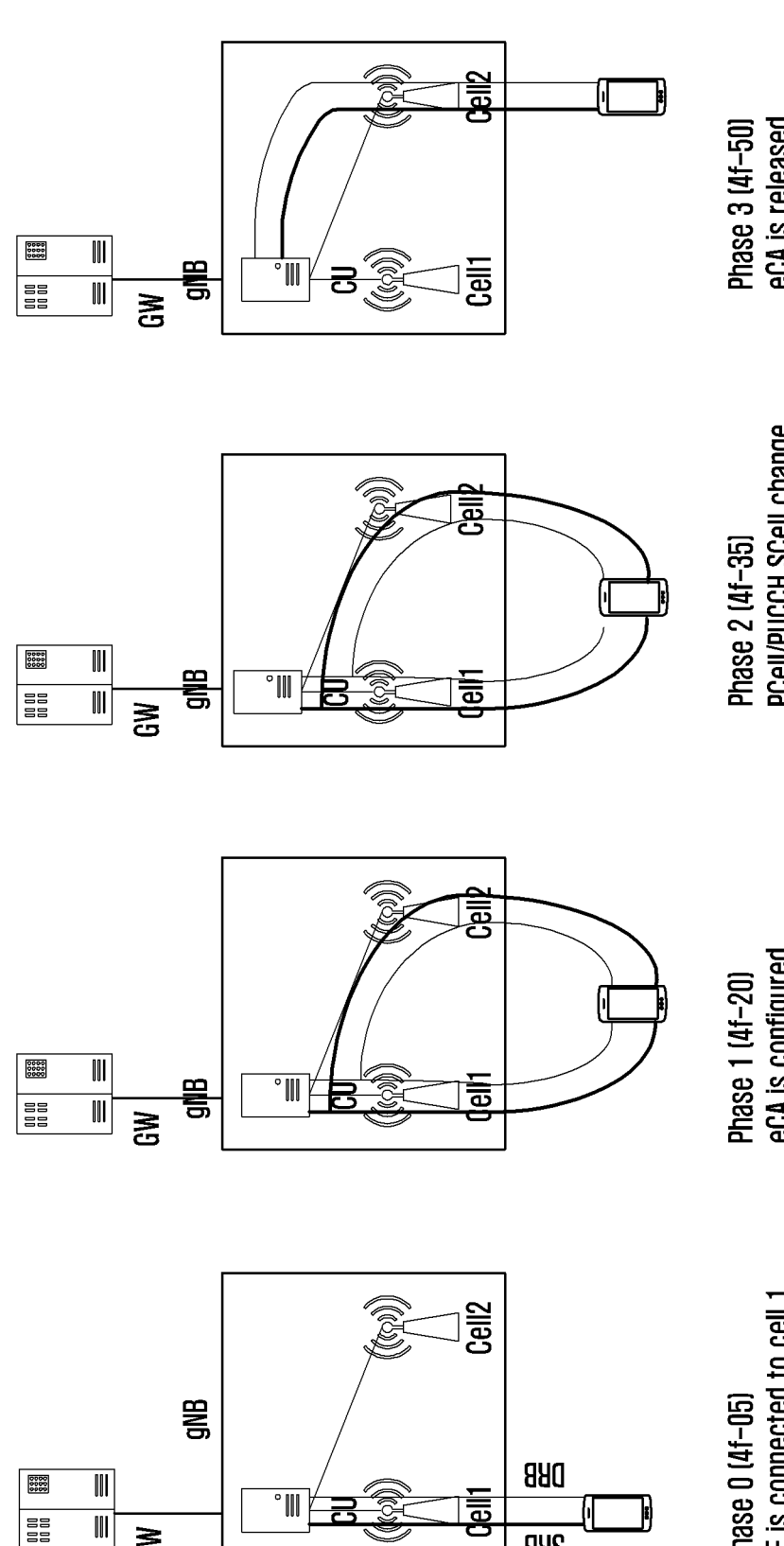
FIGS. 4FA and 4FB are diagrams of a handover operation using enhanced carrier aggregation (eCA) and a protocol structure, according to an embodiment of the present disclosure.

FIGS. 4FA and 4FB are diagrams of a handover operation using eCA and a protocol structure, according to an embodiment of the present disclosure.

Phase 0 corresponds to a stage in which the UE and a gNB are connected to each other in an NR system to perform basic data transmission/reception (at 4f-05). It is assumed that a source cell of the gNB is composed of one PCell and one SCell. In the above-described stage, the gNB configures an MCG bearer through which data is transmitted or received only with respect to the serving cell of the MeNB, and each PDCP device is connected to one RLC device, and the MAC and RLC devices are connected to each other using a logical channel (at 4f-10). The UE sets the PDCP, RLC, and MAC in accordance with the bear setup with the gNB, and receives a control signal and data through the PCell (Cell1). Further, the UE transmits HARQ feedback, scheduling request, and CSI to the PCell (Cell1) through the PUCCH, and performs data transmission/reception through the SCell (Cell2). The SCell repeats an active state and an inactive state in accordance with the indication of the eNB.

If it is determined that the gNB satisfies a specific condition and the eCA for the handover is required, the eCA is set in Phase 1 stage (at 4f-20). In the above-described stage, the gNB sets a PUCCH SCell group (target cell) composed of a PUCCH SCell (Cell3) and SCell (Cell4), and determines a handover to the corresponding target cell. Thereafter, the source cell of the gNB performs eCA with the target cell including additional PUCCH serving cells Cell3 and SCell (Cell4) (at 4f-25). At the above-described stage, the target PDCP setup and the RLC setup are not performed, and in this case, the PDCP and RLC reconfiguration operation is not necessary since handover operations are performed in the same gNB. As the eCA is performed, the UE sets a new MAC in which the existing setup of the source cell is extended to include the target cell with respect to the SRB and DRB (at 4f-30). The MAC reconfiguration may include HARQ setup, power headroom report (PHR) setup, primary time advance group (pTag), and second time advance group (sTag); this is because the eCA is used for the handover having no interference, and thus S-MAC for dividedly transferring the DRB corresponding to a specific EPC bearer ID is not reconfigured.

If the eNB receives an event corresponding to the handover from a measurement report value of the UE, e.g., the signal strength from the target cell becomes better than the signal strength from the source cell over a threshold value, and in this case, Phase 2 is set to change the roles of the PCell (Cell1) and the PUCCH SCell (Cell3) each other (4f-35). In the above-described stage, the existing bearer setup is not changed, but only the roles of the PCell and PUCCH SCell are changed with each other. Due to this, MAC and RRC signaling reconfiguration is performed (at 4f-40). In the same manner as the eNB setup, the existing protocol setup is maintained even in the UE, the roles of the PCell and PUCCH SCell are changed with each other, and the MAC is reconfigured (at 4f-45).

If the gNB receives an event related to the release of the eCA of the source cell from a measurement report value of the UE, e.g., if the signal strength from the source cell is reduced below the set threshold value, Phase 3 is set to release the eCA (at 4f-50). In this stage, the source eNB transmits an SCell release request signal including an SCell index for releasing the eCA connection to the UE, and performs MAC reconfiguration related to the SCell to be released (at 4f-55). The max reconfiguration may include HARQ setup, PHR setup, pTag, and sTag. In the same manner, even the UE reconfigures the MAC, and performs data transmission/reception in the newly set target cell (at 4f-60).

Figure 4G:
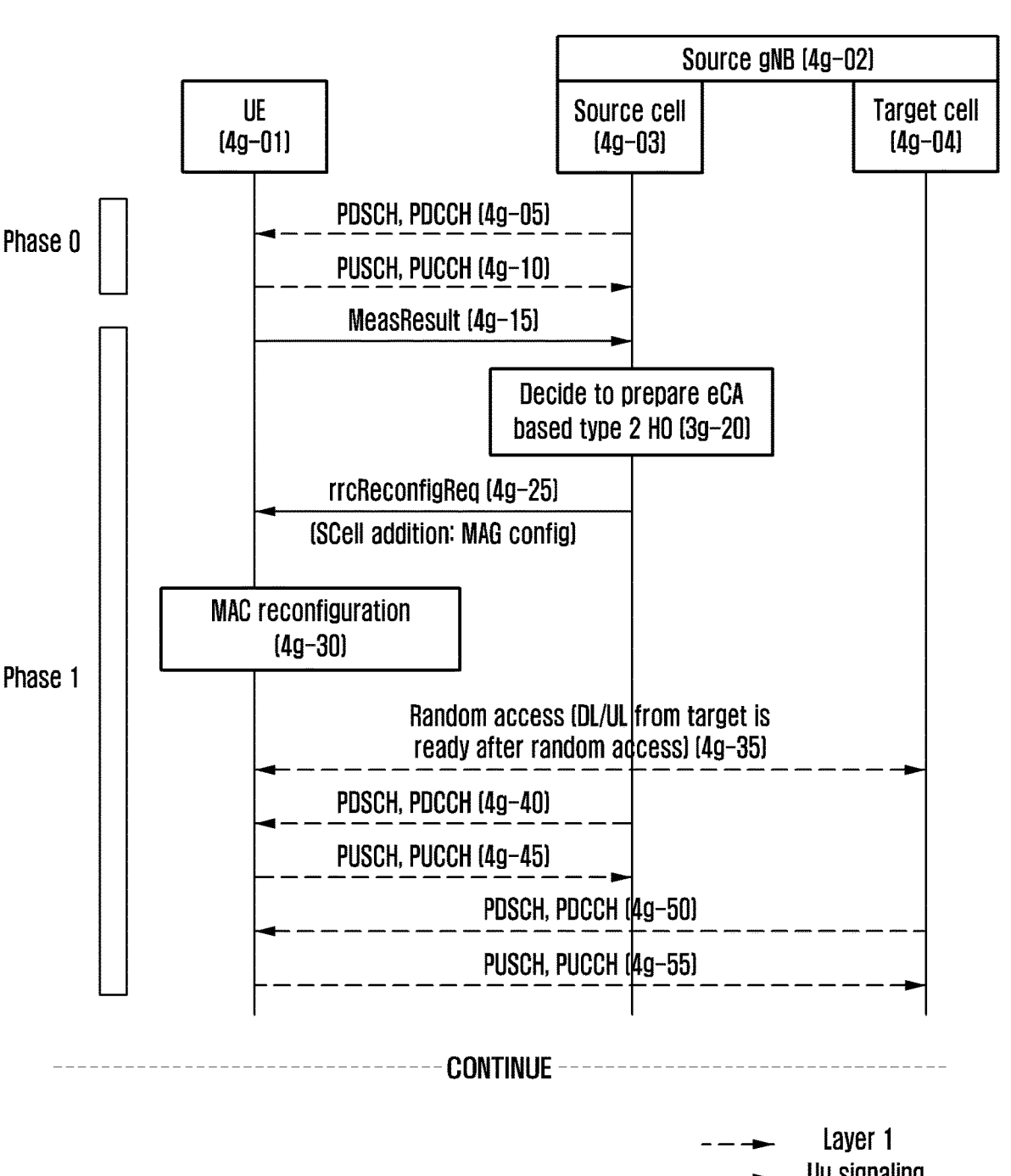
FIGS. 4GA and 4GB are diagrams of a handover procedure using eCA, according to an embodiment of the present disclosure.
Figure 4G:
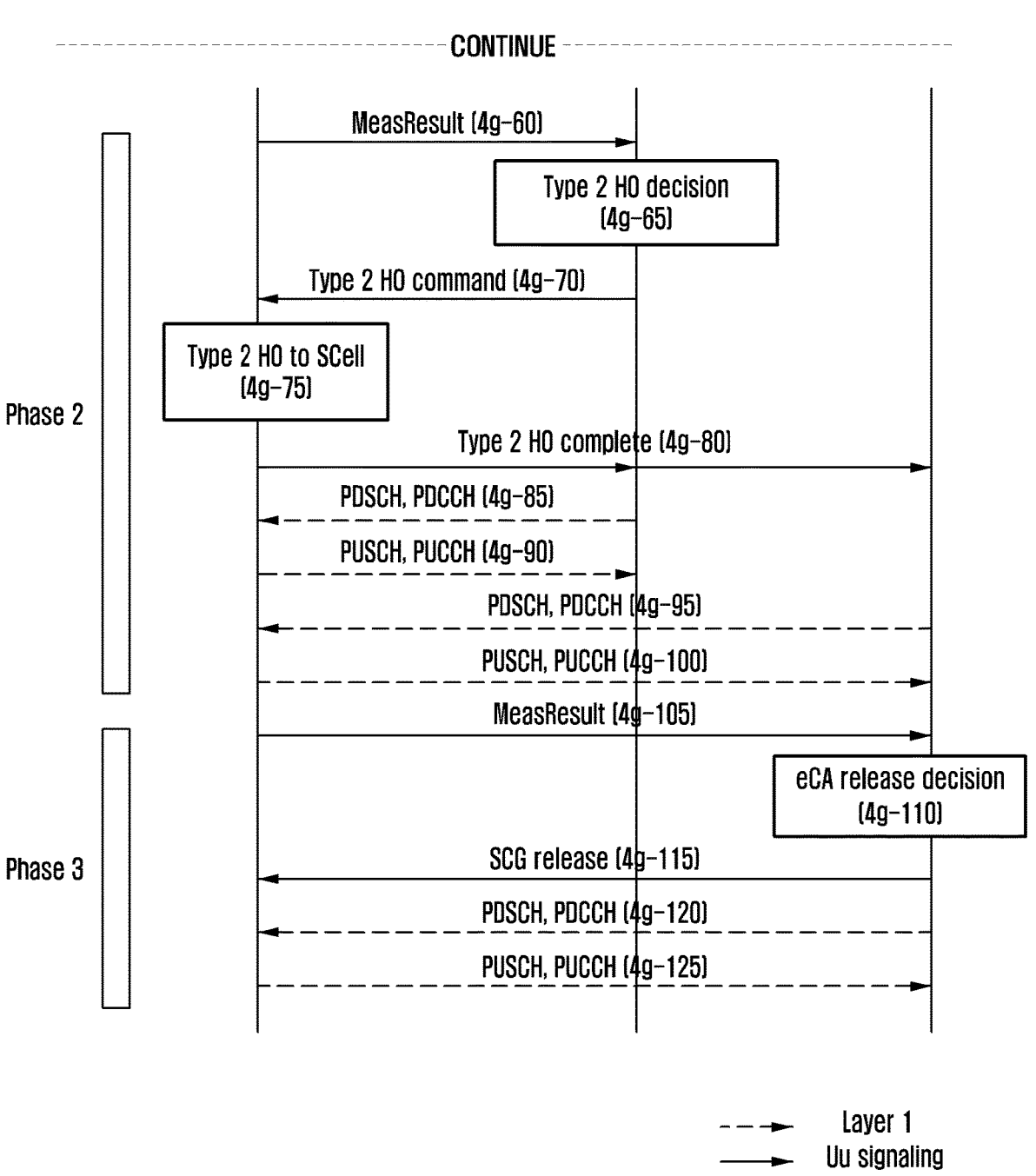

FIGS. 4GA and 4GB are diagrams of a handover procedure using eCA, according to an embodiment of the present disclosure.

First, a stage (Phase 0) is assumed, in which a UE 4g-01 receives (at step 4g-05) a downlink control signal and data and transmits (at step 4g-10) an uplink control signal and data in a state where the UE 4g-01 is connected to a source eNB 4g-02 and a source cell 4g-03. In this stage, it is possible to receive the downlink control signal through PCell included in the source eNB 4g-02 and to transmit the control signal through the uplink, and in accordance with the indication of the source eNB 4g-02, the UE 4g-01 performs an auxiliary data transmission/reception through SCell.

The UE 4g-01 measures neighboring cells periodically or in accordance with the setup of the source eNB 4g-02, and if a specific condition is satisfied, the UE 4g-01 transfers a measurement value for notifying the corresponding source cell 4g-03 that eCA for a handover in the same eNB 4g-02 is necessary, and starts Phase 1 stage (at step 4g-15). The measurement value measured by the UE 4g-01 may include an event for a case where the signal strength from the source cell 4g-03 becomes lowered and the signal strength from the target cell 4g-04 becomes heightened, and the source cell 4g-03 that has received this may recognize mobility of the UE 4g-01, and may prepare the handover in the same eNB 4g-02. That is, the source cell prepares eCA-based type-2 handover in the same eNB 4g-02, and performs eCA setup so as to perform the handover to the target cell 4g-04. If the source cell 4g-03 completes the eCA preparation stage, it transfers an rrcReconfigReq message to the UE 4g-01 (at step 4g-25). The message includes SCell setup information of the target cell 4g-04. That is, as the eCA is performed, the UE 4g-01 sets a new MAC in which the existing setup of the source cell 4g-03 is extended to include the target cell 4g-04 with respect to the SRB and DRB. The MAC reconfiguration may include HARQ setup, PHR setup, pTag, and sTag setup (at step 4g-Thereafter, the UE 4g-01 performs a random access procedure with the target cell 4g-04 (at step 4g-35), and performs uplink and downlink transmission/reception with the source cell 4g-03 and the target cell 4g-04 (at steps 4g-40 to 4g-55). Through the above-described Phase 1 stage (at steps 4g-15 to 4g-55), the UE 4g-01 is simultaneously connected to the source cell 4g-03 and the target cell 4g-04 to perform data transmission/reception, and in this process, time interference does not occur.

After the Phase 1 stage, if the measurement value of the UE 4g-01 includes an event indicating the handover of the target cell 4g-04 (at step 4g-60), the source cell 4g-03 determines the handover to the target cell 4g-04 (Phase 2 stage) (at step 4g-65). The measurement value may include an event for a case where the signal strength from the source cell 4g-03 becomes lowered and the signal strength from the target cell 4g-04 becomes heightened, and thus the events in an LTE for determining the handover may be reused, or a new event may be added. If the source cell 4g-03 receives the message, it does not change the existing bearer setup, but changes the roles of PCell and PUCCH SCell each other. Further, the source cell 4g-03 transfers type-2 handover command to the UE 4g-01 through an RRCConnectionReconfiguraiton (at step 4g-75). The RRC message implicitly or explicitly the setup indicating the change of the roles of PCell and PUCCH SCell each other included in the source cell 4g-03 and the target cell 4g-04. The UE 4g-01 performs the type-2 handover to the PUCCH SCell of the target cell 4g-04 (at step 4g-80), and transfers a type-2 handover complete RRC message to PCell of the source cell 4g-03 and the PUCCH Cell of the target cell 4g-04 (at step 4g-80).

As the UE 4g-01 performs the type-2 handover, it maintains the existing Layer 1 transmission/reception, and Layer 2 (MAC) cancels the existing set PHR, and controls the PH location of the PHR in accordance with the change of PCell and SCell. Further, through the change to the PUCCH SCell, the existing PCell (Cell1) suspends the RAR reception in PCell (Cell1) of the source cell 4g-03, sets TAG to sTAG, and releases the set SPS. The PUCCH SCell (Cell3) of the target cell 4g-04 starts the RAR reception, sets TAG to pTAG, and monitors SPS cell-radio network temporary identifier (C-RNTI). Further, it changes the bit location for activation/deactivation of the MAC CE in accordance with the set SCellIndex. Further, Layer 3 controls the radio link monitoring (RLM) determining the RLF in accordance with the change of PCell and PUCCH SCell. That is, as the existing PCell (Cell1) is changed to the PUCCH SCell, it suspends the RLM operation and paging reception, and the existing PUCCH SCell (Cell3) starts RLM and paging reception, and reads the SFN to use the same as a reference. In the same manner, even the report for the measurement value is controlled and reported in accordance with the change of PCell and SCell, and ServCellIndex is also controlled. For example, with respect to Cell1 (previous PCell), it is changed to a specific value x at index 0, and with respect to Cell3 (previous PUCCH SCell), it is changed to 0 at index y. The method for setting the ServCellIndex of the previous PCell may be one of the following methods.

Option 1: Type-2 handover command at step 4g-70 or RRC connection reconfiguration at step 4g-25 explicitly transfers SCellIndex.

Option 2: New PCell (Cell3) automatically allocates the used SCellIndex.

Thereafter, the UE 4g-01 maintains uplink and downlink transmission/reception with the source CELL 4g-03 and the target CELL 4g-04 (at steps 4g-85 to 4g-100). Through the above-described Phase 2 stage (at steps 4g-60 to 4g-100), the UE 4g-01 changes the roles of PCell of the source cell 4g-03 and PUCCH SCell of the target cell 4g-04 with each other, and is simultaneously connected to the two eNBs to perform data transmission/reception, and in this process, time interference does not occur.

After the Phase 2 stage, if the measurement value of the UE 4g-01 includes an event indicating the release of the source cell 4g-03 (at step 4g-105), the target cell 4g-04 determines the eCA release of the source cell (Phase 3 stage) (at step 4g-105). The measurement value may be performed when the UE 4g-01 determines that the signal strength from the source eNB 4g-02 becomes lower than a specific threshold value and is not suitable to perform the communication. Events in an LTE for this may be reused, or a new event may be added. The source eNB 4g-02 notifies the UE 4g-01 of the release of SCell through the RRC message (at step 4g-115). The SCell release as described above means eCA release of Cell1 and Cell2. Thereafter, the UE 4g-01 and the target cell 4g-04 maintains the uplink and downlink transmission/reception (at steps 4g-120 and 4g-125).

Figure 4H:
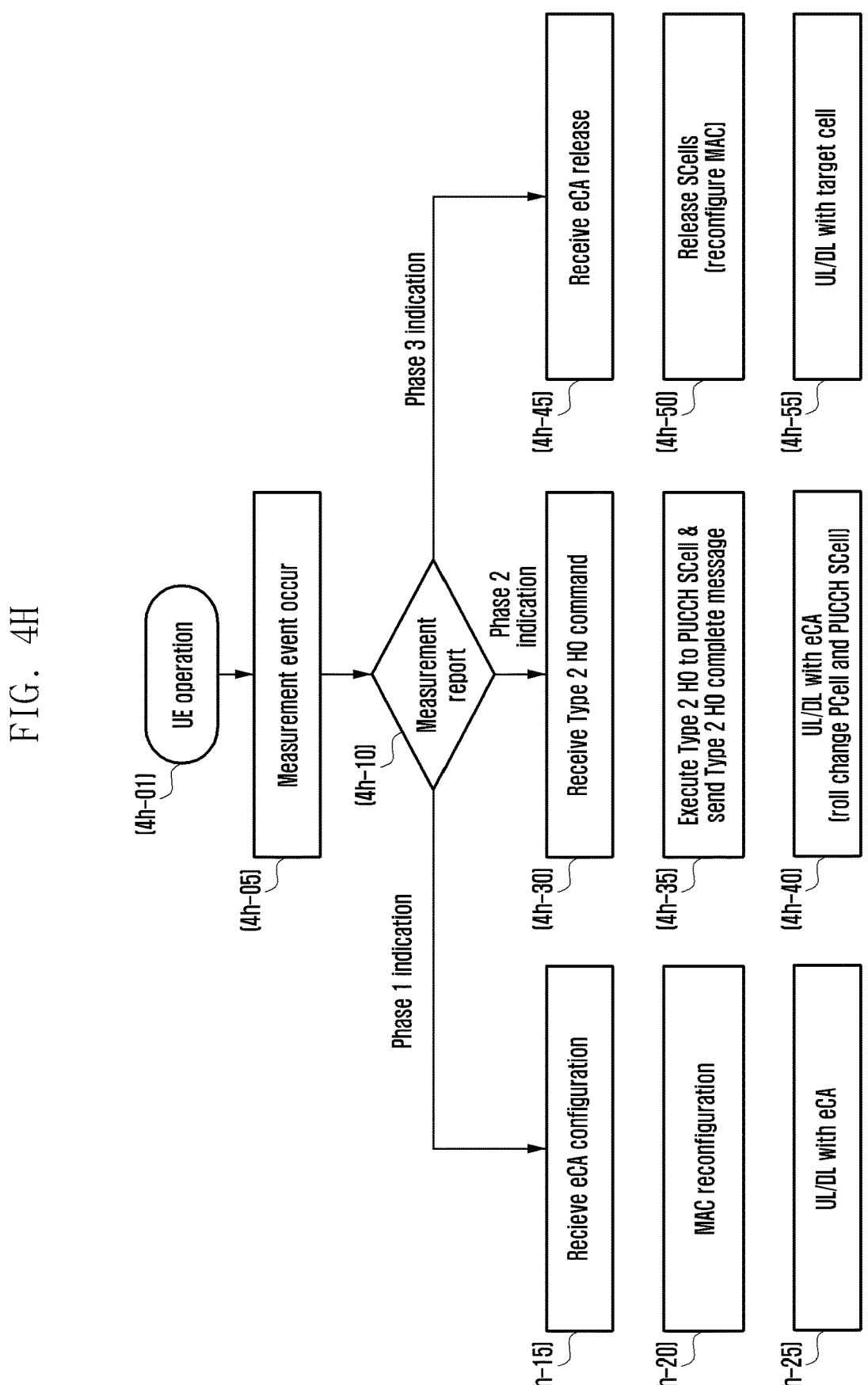
FIG. 4H is a flowchart of a method of the terminal performing type-2 handover procedure using eCA, according to an embodiment of the present disclosure.

FIG. 4H is a diagram of the terminal performing type-2 handover procedure using eCA, according to an embodiment of the present disclosure.

The UE performs uplink and downlink data transmission/reception (Phase 0) with the source cell connected to the UE, and if the measurement value is changed due to the movement (at step 4h-01 and 4h-05), it reports the measurement value including the event kind to the source cell. The subsequent operation is determined in accordance with the current state of the UE and the measurement value. A handover method using the eCA for the handover procedure in which time interference becomes 0 is proposed. If the measurement value corresponding to Phase 1 occurs in a state where the UE operates in Phase 0, it transfers the measurement value to the source cell (at step 4h-10). Thereafter, if the source cell determines necessity of multi-connection and transfers eCA setup information (at step 4h-15), the UE receives this to perform setup for the eCA. The UE reconfigure the MAC in accordance with the set SCell-Config (SCellToAddMod) (at step 4h-20). As the eCA setup is performed, the UE sets a new MAC in which the existing setup of the source cell is extended to include the target cell with respect to the SRB and DRB. The MAC reconfiguration may include HARQ setup, PHR setup, pTag, and sTag. Thereafter, the UE configures the eCA, and perform uplink and downlink data transmission/reception through the PCell group and the PUCCH SCell group (at step 4h-25)

Through the above-described stage, the UE operates in Phase 1 state, and if an event indicating necessity of the handover to the target cell, that is, an event to perform Phase 2, occurs (at step 4h-05), the UE reports the measurement value including the event kind to the eNB. Thereafter, the UE receives the RRC message indicating type-2 handover from the eNB to the target cell (at step 4h-30), and changes the roles and setup of PCell and PUCCH SCell for the type-2 handover (at step 4h-35). As the eCA-based type 2 handover is performed, the UE maintains the existing Layer 1 transmission/reception, and Layer 2 (MAC) cancels the existing set PHR, and controls the PH location of the PHR in accordance with the change of PCell and SCell. Further, through the change to the PUCCH SCell, the existing PCell (Cell1) suspends the RAR reception in PCell (Cell1) of the source cell, sets TAG to sTAG, and releases the set SPS. The PUCCH SCell (Cell3) of the target cell starts the RAR reception, sets TAG to pTAG, and monitors SPS C-RNTI. Further, it changes the bit location for activation/deactivation of the MAC CE in accordance with the set SCellIndex. Further, Layer 3 controls the RML determining the RLF in accordance with the change of PCell and PUCCH SCell. That is, as the existing PCell (Cell1) is changed to the PUCCH SCell, it suspends the RLM operation and paging reception, and the existing PUCCH SCell (Cell3) starts RLM and paging reception, and reads the SFN to use the same as a reference. In the same manner, even the report for the measurement value is controlled and reported in accordance with the change of PCell and SCell, and ServCellIndex is also controlled. For example, in case of PCell of the existing source cell, x designated by SCellIndex is used, and in case of PUCCH SCell of the existing target cell, the previous y index is not used, and the index is not allocated. After the change of the roles of PCell and PUCCH SCell as described above, the UE performs uplink and downlink data transmission/reception through the eCA (at step 4h-40).

Through the above-described stage, the UE operates in Phase 2 state, and if an event indicating necessity of the release of the source cell, that is, an event to perform Phase 3, occurs (at step 4h-05), the UE reports the measurement value including the event kind to the eNB (at step 4h-10). Thereafter, the UE receives the RRC message indicating the eCA of the source cell from the eNB (target cell) (at step 4h-45), and releases SCells (Cell1 and Cell2) related to the eCA of the existing PCell group (at step 4h-50). In the stage, the UE reconfigures the MAC according to the SCell release. Thereafter, the UE performs uplink and downlink data transmission/reception through the target cell.

The UE may perform different operations in accordance with the cell to which the UE itself belongs. In FIG. 4F, the eCA-based type-2 handover procedure composed of 4 Cells and the protocol structure have been described. In Table 2 below, the operations of the UE before and after it receives the type-2 handover command are summarized.

TABLE 2

| | Cell 1 | Cell 3 | Cell 2, 4 |
|---|---|---|---|
| Before receiving type 2 HO command | PCell | PUCCH SCell | SCell |
| After receiving type 2 HO command | PUCCH SCell | PCell | SCell |
| Layer 1 (Cell group) | UE continue the current operations on this cell; i.e. PUCCH/PUSCH tx PDCCH/PDSCH rx | UE continue the current operations on this cell; i.e. PUCCH/PUSCH tx PDCCH/PDSCH rx | UE continue the current operations on this cell; i.e. PUSCH tx (if uplink is configured) PDCCH/PDSCH rx |
| Layer 2 (MAC) | Cancel triggered PHR Change PH location in PHR (Type 2 PH location and type 1 PH location) stop RAR reception consider its TAG as sTAG release SPS Update the mapping of Activation/Deactivation MAC CE bit position (from no corresponding bit to b__x, x is SCellIndex) | Cancel triggered PHR Change PH location in PHR (Type 2 PH location and type 1 PH location) start RAR reception consider its TAG as pTAG start to monitor SPS C-RNTI Update the mapping of Activation/Deactivation MAC CE bit position (from b__y to no corresponding bit) | Continue the current operations |
| Layer 3 (RRC) | stop RLM Evaluated as SCell for measurement Stop paging reception Update ServCellIndex from 0 to x | start RLM Evaluated as PCell for measurement Start paging reception read SFN and take it for reference Update ServCellIndex from y to 0 | Continue the current operations |

UE behavior in each layer when type 2 HO command is received.

In the Layer 3 operation, the method for setting ServCellIndex of the previous PCell may be one of the following methods.

Option 1: Type-2 handover command at step 4g-70 or RRC connection reconfiguration at step 4g-25 explicitly transfers SCellIndex.

Option 2: New PCell (Cell2) automatically allocates the used SCellIndex.

The UE features can be summarized in comparison to type-1 handover. In Table 3 below, type-1 handover in the existing LTE and type-2 handover using eCA proposed in the present disclosure are summarized.

TABLE 3

| | Type 1 HO | Type 2 HO |
|---|---|---|
| Pre-step over the radio interface | None | PUCCH SCell group addition |
| Post-step over the radio interface | None | PUCCH SCell group release |
| Triggering RRC message | Type 1 HO command i.e. rrcConnectionReconfiguration with mobilityControlInfo (target cell id, target frequency, C-RNTI etc.) | Type 2 HO command i.e. rrcConnectionReconfiguration with type2HO indication |
| Cell id of target cell & ARFCN of target frequency | in mobilityControlInfo in HO command message (rrcConnectionReconfiguration with mobilityControlInfo) | In SCell addition message in pre-step |
| L1 | stop L1 operation with source start L1 operation with target | continue L1 operation with source and target |
| SCell | Deactivate SCells except primary SCell (PSCell) Do not change PSCell status | Do not change SCell status except PSCell |

63

A Type 1 HO and Type 2 HO.

Figure 4I:
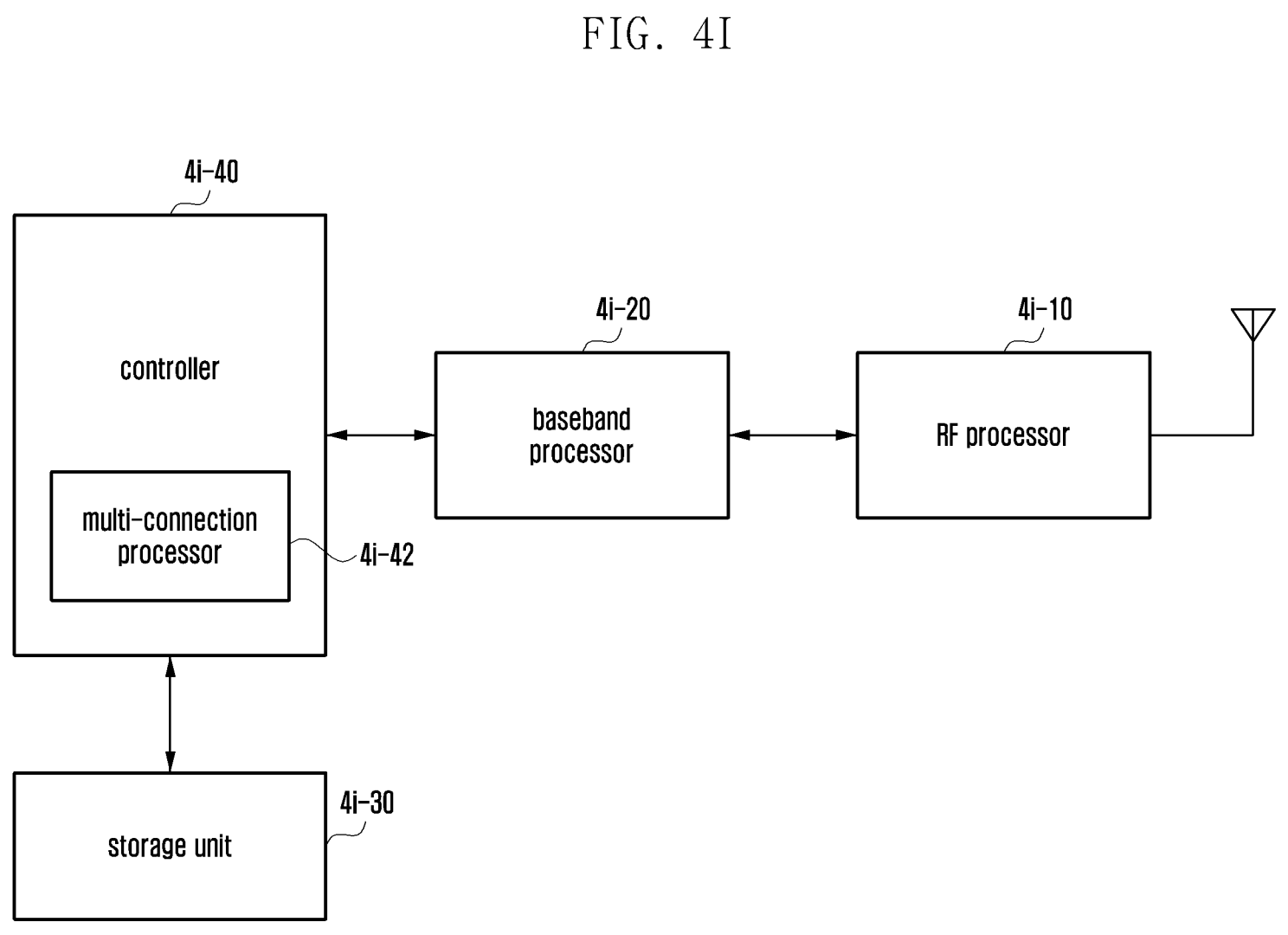

FIG. 4I is a diagram of a terminal, according to an embodiment of the present disclosure.

Referring to FIG. 4I, the terminal includes an RF processor 4i-10, a baseband processor 4i-20, a storage unit 4i-30, and a controller 4i-40.

The RF processor 4i-10 performs transmitting and receiving a signal through a radio channel, such as signal band conversion and amplification. That is, the RF processor 4i-10 performs up-conversion of a baseband signal provided from the baseband processor 4i-20 into an RF-band signal to transmit the converted signal to an antenna, and performs down-conversion of the RF-band signal received through the antenna into a baseband signal. The RF processor 4i-10 may include a transmission filter, a reception filter, an amplifier, a mixer, an oscillator, a DAC, and an ADC. Although only one antenna is illustrated in FIG. 4i, the terminal may be provided with a plurality of antennas. The RF processor 4i-10 may include a plurality of RF chains. The RF processor 4i-10 may perform beamforming, and for the beamforming, the RF processor 4i-10 may adjust phases and sizes of signals transmitted or received through the plurality of antennas or antenna elements. The RF processor may perform MIMO, and may receive several layers during performing of a MIMO operation.

The baseband processor 4i-20 performs conversion between a baseband signal and a bit string in accordance with the physical layer standard of the system. During data transmission, the baseband processor 4i-20 generates complex symbols by encoding and modulating a transmitted bit string. During data reception, the baseband processor 4i-restores a received bit string by demodulating and decoding the baseband signal provided from the RF processor 4i-10. When following an OFDM method, during data transmission, the baseband processor 4i-20 generates complex symbols by encoding and modulating a transmitted bit string, performs mapping of the complex symbols on subcarriers, and then configures OFDM symbols through the IFFT operation and CP insertion. During data reception, the baseband processor 4i-20 divides the baseband signal provided from the RF processor 4i-10 in the unit of OFDM symbols, restores the signals mapped on the subcarriers through the FFT operation, and then restores the received bit string through demodulation and decoding.

The baseband processor 4i-20 and the RF processor 4i-10 may be called a transmitter, a receiver, a transceiver, or a communication unit. In order to support different radio connection technologies, at least one of the baseband processor 4i-20 and the RF processor 4i-10 may include a plurality of communication modules. In order to process signals of different frequency bands, at least one of the baseband processor 4i-20 and the RF processor 4i-10 may include different communication modules. The different radio connection technologies may include a radio LAN (e.g., IEEE 802.11) and a cellular network (e.g., LTE). Further, the different frequency bands may include SHF (e.g., 2.5 GHz or 5 GHz) band and millimeter wave (mm-Wave) (e.g., 60 GHz) band.

The storage unit 4i-30 stores a basic program for an operation of the terminal, application programs, and data of setup information. In particular, the storage unit 4i-30 may store therein information related to a second access node performing wireless communication using a second radio connection technology. The storage unit 4i-30 provides stored data in accordance with a request from the controller 4i-40.

The controller 4i-40 controls the terminal. The controller 4i-40 transmits and receives signals through the baseband processor 4i-20 and the RF processor 4i-10. The controller 4i-40 records or reads data in or from the storage unit 4i-30. For this, the controller 4i-40 may include at least one processor, and may include a communication processor for communication and an AP for controlling an upper layer, such as an application program.

Figure 4J:
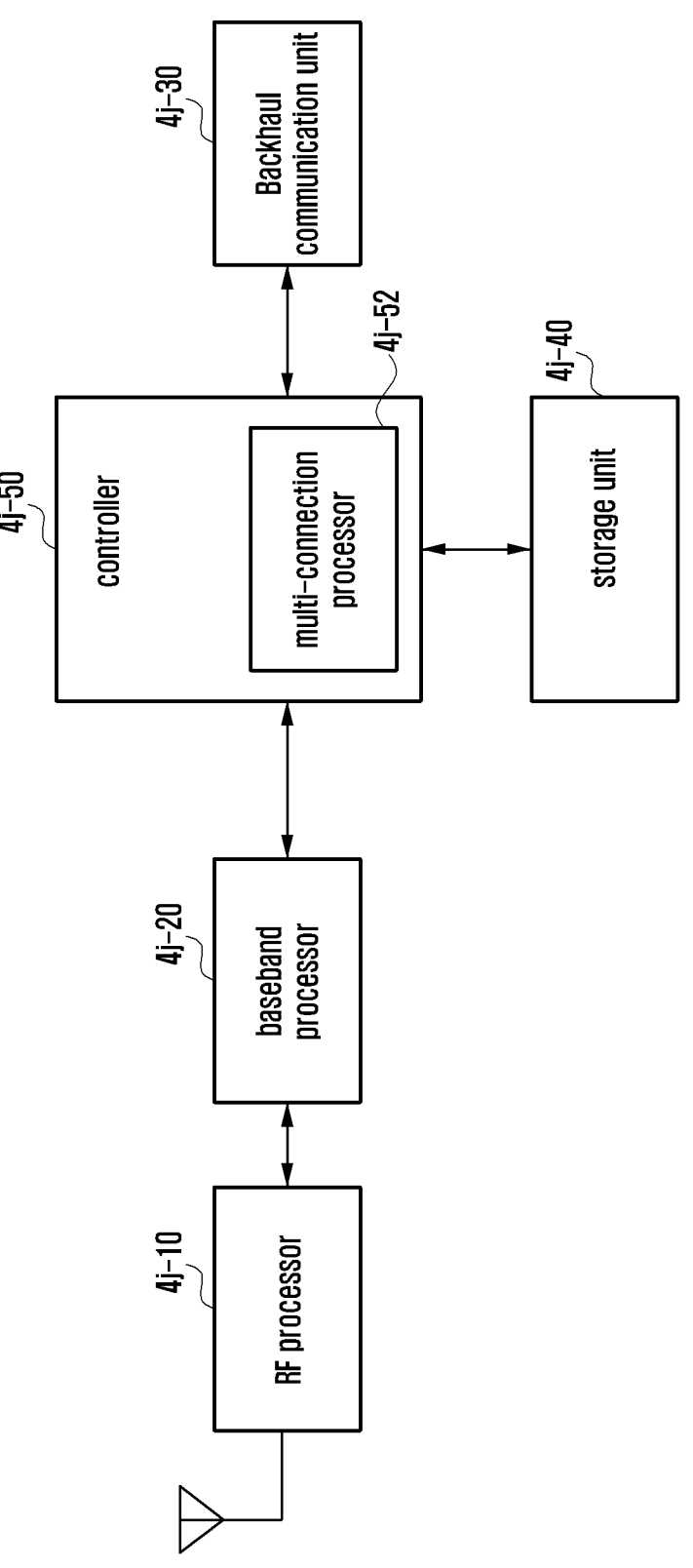
FIG. 4J is a diagram of an NR base station, according to an embodiment of the present disclosure.

FIG. 4J is a diagram of a base station in a wireless communication system, according to an embodiment of the present disclosure.

The base station includes an RF processor 4j-10, a baseband processor 4j-20, a backhaul communication unit (communication unit) 4j-30, a storage unit 4j-40, and a controller 4j-50.

The RF processor 4j-10 performs transmitting and receiving a signal through a radio channel, such as signal band conversion and amplification. That is, the RF processor 4j-10 performs up-conversion of a baseband signal provided from the baseband processor 4j-20 into an RF-band signal to transmit the converted signal to an antenna, and performs down-conversion of the RF-band signal received through the antenna into a baseband signal. The RF processor 4j-10 may include a transmission filter, a reception filter, an amplifier, a mixer, an oscillator, a DAC, and an ADC. Although only one antenna is illustrated in the drawing, the first connection node may be provided with a plurality of antennas. The RF processor 4j-10 may include a plurality of RF chains. The RF processor 4j-10 may perform beamforming, and for the beamforming, the RF processor 4j-10 may adjust phases and sizes of signals transmitted or received through the plurality of antennas or antenna elements. Further, the RF processor may perform down MIMO operation through transmission of one or more layers.

The baseband processor 4j-20 performs conversion between a baseband signal and a bit string in accordance with the physical layer standard of the first radio connection technology. During data transmission, the baseband processor 4j-20 generates complex symbols by encoding and modulating a transmitted bit string. During data reception, the baseband processor 4j-20 restores a received bit string by demodulating and decoding the baseband signal provided from the RF processor 4j-10. When following an OFDM method, during data transmission, the baseband processor 4j-20 generates complex symbols by encoding and modulating a transmitted bit string, performs mapping of the complex symbols on subcarriers, and then configures OFDM symbols through the IFFT operation and CP insertion. During data reception, the baseband processor 4j-20 divides the baseband signal provided from the RF processor 4j-10 in the unit of OFDM symbols, restores the signals mapped on the subcarriers through the FFT operation, and then restores the received bit string through demodulation and decoding. The baseband processor 4j-20 and the RF processor 4j-10 may be called a transmitter, a receiver, a transceiver, or a wireless communication unit.

The communication unit 4j-30 provides an interface for performing communication with other nodes in the network. That is, the communication unit 4j-30 converts a bit string transmitted from the main eNB to another node, for example, an auxiliary eNB or a core network into a physical signal, and converts the physical signal received from the other node into the bit string.

The storage unit 4j-40 stores t a basic program for an operation of the main base station, application programs, and data of setup information. In particular, the storage unit 4j-40 may store information on a bearer allocated to the connected terminal and the measurement result reported from the connected terminal. The storage unit 4*j*-40 may store information that becomes a basis of determination whether to provide or suspend a multi-connection to the terminal. Further, the storage unit 4*j*-40 provides stored data in accordance with a request from the controller 4*j*-50.

The controller 4*j*-50 controls the main base station. The controller 4*j*-50 transmits and receives signals through the baseband processor 4*j*-20 and the RF processor 4*j*-10 or through the backhaul communication unit 4*j*-30. The controller 4*j*-50 records or reads data in or from the storage unit 4*j*-40. For this, the controller 4*j*-50 may include at least one processor.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method performed by a terminal in a wireless communication system, the method comprising:
   receiving a first radio resource control (RRC) connection release message including a resume identity;
   receiving, from a base station, system information while an RRC connection is suspended based on the first RRC connection release message;
   in case that uplink data associated with a data radio bearer (DRB) occurs and the system information includes an indicator indicating that the terminal is allowed to transmit the uplink data during a random access procedure, transmitting, to the base station, a random access preamble for the uplink data, wherein the random access preamble is selected from a preamble group configured for transmitting the uplink data during the random access procedure;
   receiving, from the base station, a random access response including an uplink grant;
   resuming a signaling radio bearer (SRB) and the DRB;
   transmitting, to the base station, a medium access control (MAC) protocol data unit (PDU) based on the uplink grant, wherein the MAC PDU includes the uplink data and an RRC connection resume request message, and the RRC connection resume request message includes the resume identity; and
   receiving, from the base station, a second RRC connection release message as a response to the RRC connection resume request message.

2. The method of claim 1,
   wherein the second RRC connection release message is received in case that the a transmission of the uplink data is successful.

3. The method of claim 1,
   wherein the uplink data associated with the DRB is multiplexed with the RRC connection resume request message associated with the SRB in the MAC PDU.

4. The method of claim 1,
   wherein a key is derived based on a next hop chaining count included in the first RRC connection release message,
   wherein the uplink data is ciphered based on the key, and
   wherein the RRC connection resume request message further includes a short message authentication code-integrity (MAC-I).

5. The method of claim 1, wherein the uplink data is transmitted to the base station without transition to an RRC connected state.

6. A method performed by a base station in a wireless communication system, the method comprising:
   broadcasting system information including an indicator indicating that a terminal is allowed to transmit uplink data associated with a data radio bearer (DRB) during a random access procedure;
   receiving, from a terminal having the uplink data and having received the indicator, while a radio resource control (RRC) connection of the terminal is suspended based on a first radio resource control (RRC) connection release message including a resume identity, a random access preamble associated with the uplink data for the terminal, wherein the random access preamble is selected from a preamble group configured for transmitting the uplink data during the random access procedure;
   transmitting, to the terminal, a random access response including an uplink grant;
   receiving, from the terminal, a medium access control (MAC) protocol data unit (PDU) based on the uplink grant, wherein the MAC PDU includes the uplink data and an RRC connection resume request message, the RRC connection resume request message includes the resume identity, and a signaling radio bearer (SRB) and the DRB are resumed; and
   transmitting, to the terminal, a second RRC connection release message as a response to the RRC connection resume request message.

7. The method of claim 6,
   wherein the second RRC connection release message is transmitted in case that a reception of the uplink data is successful.

8. The method of claim 6,
   wherein the uplink data associated with the DRB is multiplexed with the RRC connection resume request message associated with the SRB in the MAC PDU.

9. The method of claim 6,
   wherein a key is derived based on a next hop chaining count included in the first RRC connection release message,
   wherein the uplink data is ciphered based on the key, and
   wherein the RRC connection resume request message further includes a short message authentication code-integrity (MAC-I).

10. The method of claim 6, wherein the uplink data is transmitted to the base station without transition to an RRC connected state.

11. A terminal in a wireless communication system, the terminal comprising:
   a transceiver; and
   a controller configured to:
      receive, via the transceiver, a first radio resource control (RRC) connection release message including a resume identity,
      receive, from a base station, system information while an RRC connection is suspended based on the first RRC connection release message,
      in case that uplink data associated with a data radio bearer (DRB) occurs and the system information includes an indicator indicating that the terminal is allowed to transmit the uplink data during a random access procedure, transmit, to the base station via the transceiver, a random access preamble for the uplink data, wherein the random access preamble is selected from a preamble group configured for transmitting the uplink data during the random access procedure, receive, from the base station via the transceiver, a random access response including an uplink grant, resume a signaling radio bearer (SRB) and the DRB, transmit, to the base station via the transceiver, a medium access control (MAC) protocol data unit (PDU) based on the uplink grant, wherein the MAC PDU includes the uplink data and an RRC connection resume request message, and the RRC connection resume request message includes the resume identity, and receive, from the base station via the transceiver, a second RRC connection release message as a response to the RRC connection resume request message.

12. The terminal of claim 11, wherein the second RRC connection release message is received in case that a transmission of the uplink data is successful.

13. The terminal of claim 11, wherein the uplink data associated with the DRB is multiplexed with the RRC connection resume request message associated with the SRB in the MAC PDU.

14. The terminal of claim 11, wherein a key is derived based on a next hop chaining count included in the first RRC connection release message, wherein the uplink data is ciphered based on the key, and wherein the RRC connection resume request message further includes a short message authentication code-integrity (MAC-I).

15. The terminal of claim 11, wherein the uplink data is transmitted to the base station without transition to an RRC connected state.

16. A base station in a wireless communication system, the base station comprising:

a transceiver; and a controller configured to:

broadcast, via the transceiver, system information including an indicator indicating that a terminal is allowed to transmit uplink data associated with a data radio bearer (DRB) during a random access procedure, receive, via the transceiver from a terminal having the uplink data and having received the indicator, while a radio resource control (RRC) connection of the terminal is suspended based on a first radio resource control (RRC) connection release message including a resume identity, a random access preamble associated with the uplink data for the terminal, wherein the random access preamble is selected from a preamble group configured for transmitting the uplink data during the random access procedure, transmit, to the terminal via the transceiver, a random access response including an uplink grant, receive, from the terminal via the transceiver, a medium access control (MAC) protocol data unit (PDU) based on the uplink grant, wherein the MAC PDU includes the uplink data and an RRC connection resume request message, the RRC connection resume request message includes the resume identity, and a signaling radio bearer (SRB) and the DRB are resumed, and transmit, to the terminal via the transceiver, a second RRC connection release message as a response to the RRC connection resume request message.

17. The base station of claim 16, wherein the second RRC connection release message is transmitted in case that a reception of the uplink data is successful.

18. The base station of claim 16, wherein the uplink data associated with the DRB is multiplexed with the RRC connection resume request message associated with the SRB in the MAC PDU.

19. The base station of claim 16, wherein a key is derived based on a next hop chaining count included in the first RRC connection release message, wherein the uplink data is ciphered based on the key, and wherein the RRC connection resume request message further includes a short message authentication code-integrity (MAC-I).

20. The base station of claim 16, wherein the uplink data is transmitted to the base station without transition to an RRC connected state.

* * * * *